(12) United States Patent
Huang et al.

(10) Patent No.: US 11,757,520 B2
(45) Date of Patent: Sep. 12, 2023

(54) POLARIZATION RECONFIGURABLE APPARATUS, COMMUNICATIONS DEVICE, AND POLARIZATION RECONFIGURATION METHOD

(71) Applicant: Huawei Technologies Co., Ltd., Shenzhen (CN)

(72) Inventors: Jingjing Huang, Shenzhen (CN); Jun Chen, Dongguan (CN); Peng Liu, Shenzhen (CN); Qianfu Cheng, Chengdu (CN); Guangjian Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 17/508,634

(22) Filed: Oct. 22, 2021

(65) Prior Publication Data
US 2022/0045740 A1    Feb. 10, 2022

Related U.S. Application Data

(63) Continuation of application No. PCT/CN2020/086514, filed on Apr. 23, 2020.

(30) Foreign Application Priority Data
Apr. 24, 2019  (CN) .......................... 201910332191.4

(51) Int. Cl.
*H04B 7/10*     (2017.01)
*H01Q 21/24*    (2006.01)
(Continued)

(52) U.S. Cl.
CPC ............. *H04B 7/10* (2013.01); *H01Q 21/245* (2013.01); *H01Q 25/001* (2013.01); *H04B 7/1555* (2013.01)

(58) Field of Classification Search
CPC ...... H04B 7/10; H04B 7/1555; H01Q 21/245; H01Q 25/001
See application file for complete search history.

(56) References Cited

U.S. PATENT DOCUMENTS 5,298,908 A    3/1994  Piele
7,660,598 B2   2/2010  Barnett et al.
(Continued)

FOREIGN PATENT DOCUMENTS

CN    101124747 A    2/2008
CN    104023340 A    9/2014
(Continued)

*Primary Examiner* — David B Lugo
(74) *Attorney, Agent, or Firm* — SLATER MATSIL, LLP

(57) ABSTRACT

A polarization reconfigurable apparatus, a communications device, and a polarization reconfiguration method, the apparatus including a signal generation unit, a signal adjustment unit, a digital-to-analog conversion unit, and a transmission unit that are sequentially connected. A signal transmitted by a first port in the transmission unit is orthogonal to a signal transmitted by a second port in the transmission unit. The signal generation unit is configured to generate a first signal. The signal adjustment unit is configured to determine a polarization mode of a to-be-transmitted signal, divide the first signal into two first signals, and adjust an amplitude and a phase of a $1^{st}$ first signal and an amplitude and a phase of a $2^{nd}$ first signal based on the determined polarization mode.

20 Claims, 44 Drawing Sheets

(51) Int. Cl.
  *H01Q 25/00*  (2006.01)
  *H04B 7/155*  (2006.01)

(56) References Cited

U.S. PATENT DOCUMENTS

| | | | |
|---|---|---|---|
| 8,401,134 B1 | 3/2013 | Steinbrecher | |
| 2005/0017897 A1* | 1/2005 | Monk | H01Q 1/281 |
| | | | 342/174 |
| 2013/0115886 A1* | 5/2013 | Khan | H01Q 21/061 |
| | | | 455/39 |
| 2013/0278241 A1 | 10/2013 | Chen et al. | |

FOREIGN PATENT DOCUMENTS

| | | |
|---|---|---|
| CN | 104360331 A | 2/2015 |
| CN | 105137433 A | 12/2015 |
| CN | 105139047 A | 12/2015 |
| CN | 106772311 A | 5/2017 |
| CN | 108682965 A | 10/2018 |
| EP | 0026085 A1 | 4/1981 |
| WO | 0231917 A3 | 4/2002 |

* cited by examiner

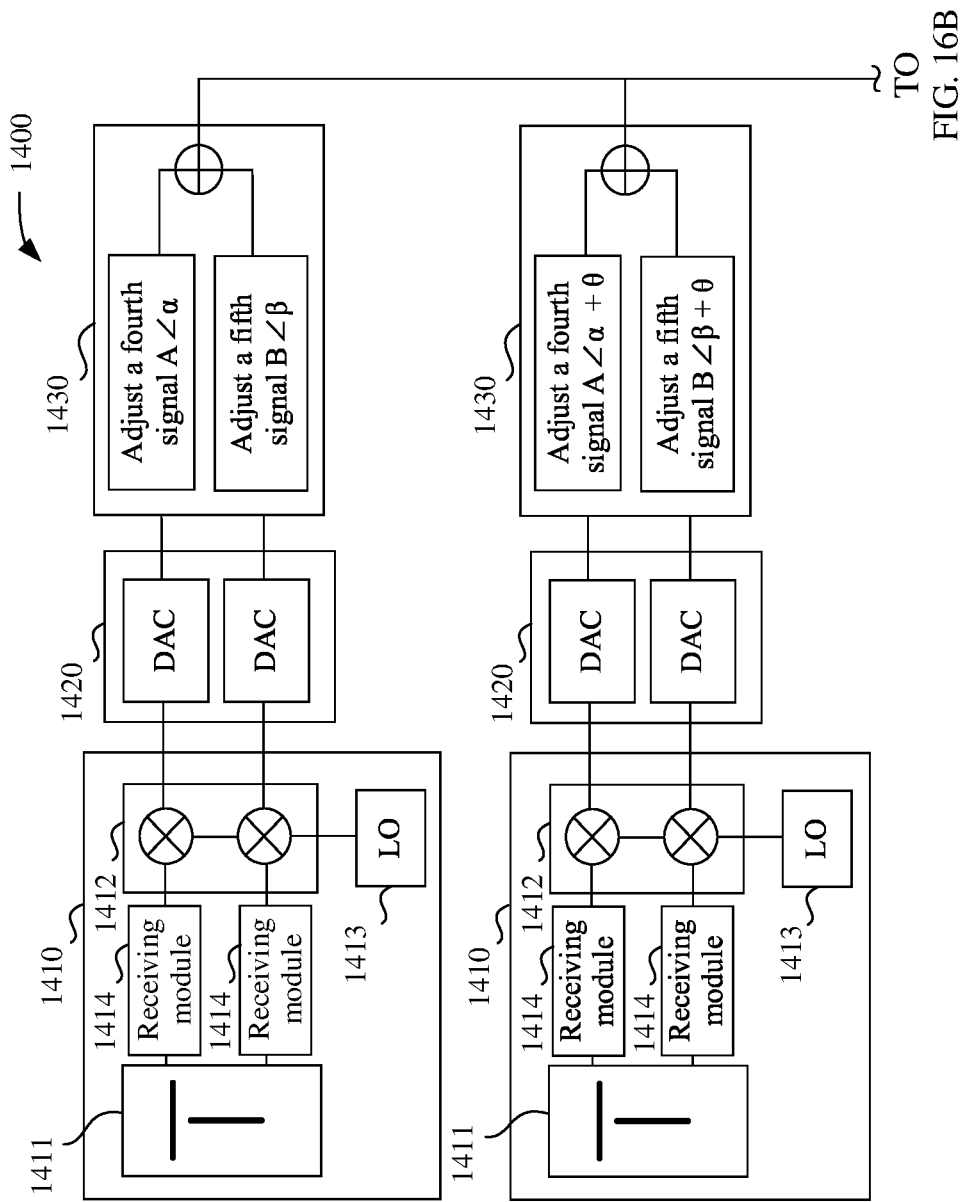

POLARIZATION RECONFIGURABLE APPARATUS, COMMUNICATIONS DEVICE, AND POLARIZATION RECONFIGURATION METHOD

CROSS-REFERENCE TO RELATED APPLICATIONS

This application is a continuation of International Application No. PCT/CN2020/086514, filed on Apr. 23, 2020, which claims priority to Chinese Patent Application No. 201910332191.4, filed on Apr. 24, 2019. The disclosures of the aforementioned applications are hereby incorporated by reference in their entireties.

TECHNICAL FIELD

This application relates to the field of wireless communications technologies, and in particular, to a polarization reconfigurable apparatus, a communications device, and a polarization reconfiguration method.

BACKGROUND

Polarization of an electromagnetic wave is a moving track of an end of an electric field vector in the electromagnetic wave in space. Control over polarization of electromagnetic waves is an important part of a study on space propagation of electromagnetic waves. The polarization property of electromagnetic waves is widely used in satellite communication, radar reception anti-jamming, aerospace, and other fields.

When a polarized electromagnetic wave is propagated in free space, scattering, refraction, diffraction, and the like occur due to complexity of a space environment, thereby changing a polarization direction of the electromagnetic wave and resulting in deflection of a polarization plane. This phenomenon is referred to as a depolarization effect. The depolarization effect causes a polarization mismatch between a transmit end and a receive end, thereby reducing a signal-to-noise ratio of a received signal and reducing reception efficiency.

SUMMARY

This application provides a polarization reconfigurable apparatus, a communications device, and a polarization reconfiguration method, to eliminate impact of a depolarization effect on transmission quality of an electromagnetic wave.

According to a first aspect, this application provides a polarization reconfigurable apparatus. The polarization reconfigurable apparatus includes a signal generation unit, a signal adjustment unit, a digital-to-analog conversion unit, and a transmission unit that are sequentially connected. The transmission unit includes a first port and a second port. A signal transmitted by the first port is orthogonal to a signal transmitted by the second port. The signal generation unit is configured to generate a first signal. The signal adjustment unit is configured to: determine a polarization mode of a to-be-transmitted signal, where the polarization mode includes linear polarization, circular polarization, and elliptical polarization, divide the first signal into two first signals, and adjust an amplitude and a phase of a $1^{st}$ first signal and an amplitude and a phase of a $2^{nd}$ first signal based on the determined polarization mode. The digital-to-analog conversion unit is configured to perform digital-to-analog conversion on an adjusted $1^{st}$ first signal to obtain a second signal, and perform digital-to-analog conversion on an adjusted $2^{nd}$ first signal to obtain a third signal. The transmission unit is configured to transmit the second signal by using the first port, and transmit the third signal by using the second port. The to-be-transmitted signal is obtained by combining the second signal and the third signal.

With the foregoing solution, the polarization reconfigurable apparatus may perform polarization reconfiguration based on the polarization mode of the to-be-transmitted signal in digital domain, and precision of amplitude and phase adjustment on a signal is relatively high, thereby improving polarization reconfiguration precision and flexibility. A problem that polarization modes of a transmit end and a receive end do not match due to a depolarization effect can be resolved, thereby improving signal reception efficiency and increasing a signal-to-noise ratio of a signal received by the receive end.

In a possible implementation, the polarization reconfigurable apparatus includes N transmission units, N digital-to-analog conversion units in a one-to-one correspondence with the N transmission units, and N signal adjustment units in a one-to-one correspondence with the N digital-to-analog conversion units, where N is an integer greater than or equal to 2. A phase difference between adjusted $1^{st}$ first signals obtained by any two adjacent signal adjustment units is θ, and a phase difference between adjusted $2^{nd}$ first signals obtained by any two adjacent signal adjustment units is θ, where θ is determined based on a beam direction of the to-be-transmitted signal.

With the foregoing solution, the polarization reconfigurable apparatus may adjust an amplitude and a phase of a signal by using 2N independent channels, and control the beam direction of the to-be-transmitted signal.

In a possible implementation, the transmission unit includes a dual-polarized antenna, and the dual-polarized antenna includes the first port and the second port. When N dual-polarized antennas in the N transmission units form a uniformly spaced linear array, θ satisfies the following formula:

$$\theta = k \times d \times \sin\varphi$$

where k is a wave number of a carrier used to carry the to-be-transmitted signal, d is a distance between two adjacent dual-polarized antennas, and φ is an included angle between the beam direction of the to-be-transmitted signal and a normal direction of the linear array.

In a possible implementation, when the polarization mode is linear polarization at an angle of $\gamma_1$, a ratio of an amplitude of the adjusted $1^{st}$ first signal to an amplitude of the adjusted $2^{nd}$ first signal is $|\tan\gamma_1|$, and a difference between a phase of the adjusted $1^{st}$ first signal and a phase of the adjusted $2^{nd}$ first signal is an integer multiple of 180°. $\gamma_1$ is an included angle between an electric field direction of the to-be-transmitted signal and a horizontal direction on a plane perpendicular to a propagation direction of the to-be-transmitted signal.

In a possible implementation, when the polarization mode is circular polarization, a ratio of an amplitude of the adjusted $1^{st}$ first signal to an amplitude of the adjusted $2^{nd}$ first signal is 1, and a difference between a phase of the adjusted $1^{st}$ first signal and a phase of the adjusted $2^{nd}$ first signal is an odd multiple of 90°.

In a possible implementation, when the polarization mode is elliptical polarization, a ratio of an amplitude of the adjusted $1^{st}$ first signal to an amplitude of the adjusted $2^{nd}$ first signal, and a difference between a phase of the adjusted $1^{st}$ first signal and a phase of the adjusted $2^{nd}$ first signal are determined based on $\gamma_2$ and a ratio of a major axis to a minor axis of an ellipse corresponding to the elliptical polarization mode.

$\gamma_2$ is an included angle between the major axis and a horizontal direction on a plane perpendicular to a propagation direction of the to-be-transmitted signal.

According to a second aspect, this application further provides a communications device. The communications device includes a memory, a processor, and a transceiver. The memory stores code instructions. The processor is configured to invoke the code instructions stored in the memory to perform the following operations: generating a first signal, determining a polarization mode of a to-be-transmitted signal, where the polarization mode includes linear polarization, circular polarization, and elliptical polarization, dividing the first signal into 2N first signals, where N is a positive integer, adjusting an amplitude and a phase of a $(2i-1)^{th}$ first signal and an amplitude and a phase of a $2i^{th}$ first signal based on the determined polarization mode, where i=1, ..., N, and performing digital-to-analog conversion on an adjusted $(2i-1)^{th}$ first signal to obtain a $(2i-1)^{th}$ second signal, and performing digital-to-analog conversion on an adjusted $2i^{th}$ first signal to obtain a $2i^{th}$ third signal.

With the foregoing solution, the communications device may perform polarization reconfiguration based on the polarization mode of the to-be-transmitted signal in digital domain, and precision of amplitude and phase adjustment on a signal is relatively high, thereby improving polarization reconfiguration precision and flexibility. A problem that polarization modes of a transmit end and a receive end do not match due to a depolarization effect can be resolved, thereby improving signal reception efficiency and increasing a signal-to-noise ratio of a signal received by the receive end.

In a possible implementation, the $(2i-1)^{th}$ second signal is transmitted by using a $(2i-1)^{th}$ port of the transceiver in the communications device, and the $2i^{th}$ third signal is transmitted by using a $2i^{th}$ port of the transceiver in the communications device. The signal transmitted by the $(2i-1)^{th}$ port is orthogonal to the signal transmitted by the $2i^{th}$ port.

In a possible implementation, when N is greater than 1, a phase difference between the adjusted $(2i-1)^{th}$ first signal and an adjusted $(2i+1)^{th}$ first signal is $\theta$, and a phase difference between the adjusted $2i^{th}$ first signal and an adjusted $(2i+2)^{th}$ first signal is $\theta$. $\theta$ is determined based on a beam direction of the to-be-transmitted signal.

With the foregoing solution, the communications device can further control the beam direction of the to-be-transmitted signal while implementing polarization reconfiguration.

In a possible implementation, in a scenario in which the transceiver in the communications device includes N dual-polarized antennas and an $i^{th}$ dual-polarized antenna includes the $(2i-1)^{th}$ port and the $2i^{th}$ port, when the N dual-polarized antennas form a uniformly spaced linear array, $\theta$ satisfies the following formula:

$$\theta = k \times d \times \sin \varphi$$

where k is a wave number of a carrier used to carry the to-be-transmitted signal, d is a distance between two adjacent dual-polarized antennas, and $\varphi$ is an included angle between the beam direction of the to-be-transmitted signal and a normal direction of the linear array.

In a possible implementation, when the polarization mode is linear polarization at an angle of $\gamma_1$, a ratio of an amplitude of an adjusted $1^{st}$ first signal to an amplitude of an adjusted $2^{nd}$ first signal is $|\tan \gamma_1|$, and a difference between a phase of the adjusted $1^{st}$ first signal and a phase of the adjusted $2^{nd}$ first signal is an integer multiple of 180°. $\gamma_1$ is an included angle between an electric field direction of the to-be-transmitted signal and a horizontal direction on a plane perpendicular to a propagation direction of the to-be-transmitted signal.

In a possible implementation, when the polarization mode is circular polarization, a ratio of an amplitude of the adjusted $(2i-1)^{th}$ first signal to an amplitude of the adjusted $2i^{th}$ first signal is 1, and a difference between a phase of the adjusted $(2i-1)^{th}$ first signal and a phase of the adjusted $2i^{th}$ first signal is an odd multiple of 90°.

In a possible implementation, when the polarization mode is elliptical polarization, a ratio of an amplitude of the adjusted $(2i-1)^{th}$ first signal to an amplitude of the adjusted $2i^{th}$ first signal, and a difference between a phase of the adjusted $(2i-1)^{th}$ first signal and a phase of the adjusted $2i^{th}$ first signal are determined based on $\gamma_2$ and a ratio of a major axis to a minor axis of an ellipse corresponding to the elliptical polarization mode. $\gamma_2$ is an included angle between the major axis and a horizontal direction on a plane perpendicular to a propagation direction of the to-be-transmitted signal.

According to a third aspect, an embodiment of this application further provides a polarization reconfiguration method, applied to a communications device. The communications device includes 2N ports, a signal transmitted by a $(2i-1)^{th}$ port is orthogonal to a signal transmitted by a $2i^{th}$ port, i=1, ..., N, and N is a positive integer. The method includes: generating a first signal, determining a polarization mode of a to-be-transmitted signal, where the polarization mode includes linear polarization, circular polarization, and elliptical polarization, dividing the first signal into 2N first signals, adjusting an amplitude and a phase of a $(2i-1)^{th}$ first signal and an amplitude and a phase of a $2i^{th}$ first signal based on the determined polarization mode, performing digital-to-analog conversion on an adjusted $(2i-1)^{th}$ first signal to obtain a $(2i-1)^{th}$ second signal, and performing digital-to-analog conversion on an adjusted $2i^{th}$ first signal to obtain a $2i^{th}$ third signal, and transmitting the $(2i-1)^{th}$ second signal by using the $(2i-1)^{th}$ port, and transmitting the $2i^{th}$ third signal by using the $2i^{th}$ port.

With the foregoing solution, the communications device may perform polarization reconfiguration based on the polarization mode of the to-be-transmitted signal in digital domain, and precision of amplitude and phase adjustment on a signal is relatively high, thereby improving polarization reconfiguration precision and flexibility. A problem that polarization modes of a transmit end and a receive end do not match due to a depolarization effect can be resolved, thereby improving signal reception efficiency and increasing a signal-to-noise ratio of a signal received by the receive end.

In a possible implementation, when N is greater than 1, a phase difference between the adjusted $(2i-1)^{th}$ first signal and the adjusted $2i^{th}$ first signal is $\theta$, where $\theta$ is determined based on a beam direction of the to-be-transmitted signal.

With the foregoing solution, the communications device can further control the beam direction of the to-be-transmitted signal while implementing polarization reconfiguration.

In a possible implementation, the communications device includes N dual-polarized antennas, and an $i^{th}$ dual-polarized antenna includes the $(2i-1)^{th}$ port and the $2i^{th}$ port.

When the N dual-polarized antennas form a uniformly spaced linear array, θ satisfies the following formula:

$$\theta = k \times d \times \sin \varphi$$

where k is a wave number of a carrier used to carry the to-be-transmitted signal, d is a distance between two adjacent dual-polarized antennas, and φ is an included angle between the beam direction of the to-be-transmitted signal and a normal direction of the linear array.

In a possible implementation, when the polarization mode is linear polarization at an angle of $\gamma_1$, a ratio of an amplitude of an adjusted $1^{st}$ first signal to an amplitude of an adjusted $2^{nd}$ first signal is |tan γ1|, and a difference between a phase of the adjusted $1^{st}$ first signal and a phase of the adjusted $2^{nd}$ first signal is an integer multiple of 180°. $\gamma_1$ is an included angle between an electric field direction of the to-be-transmitted signal and a horizontal direction on a plane perpendicular to a propagation direction of the to-be-transmitted signal.

In a possible implementation, when the polarization mode is circular polarization, a ratio of an amplitude of the adjusted $(2i-1)^{th}$ first signal to an amplitude of the adjusted $2i^{th}$ first signal is 1, and a difference between a phase of the adjusted $(2i-1)^{th}$ first signal and a phase of the adjusted $2i^{th}$ first signal is an odd multiple of 90°.

In a possible implementation, when the polarization mode is elliptical polarization, a ratio of an amplitude of the adjusted $(2i-1)^{th}$ first signal to an amplitude of the adjusted $2i^{th}$ first signal, and a difference between a phase of the adjusted $(2i-1)^{th}$ first signal and a phase of the adjusted $2i^{th}$ first signal are determined based on $\gamma_2$ and a ratio of a major axis to a minor axis of an ellipse corresponding to the elliptical polarization mode. $\gamma_2$ is an included angle between the major axis and a horizontal direction on a plane perpendicular to a propagation direction of the to-be-transmitted signal.

According to a fourth aspect, this application further provides a polarization reconfigurable apparatus. The polarization reconfigurable apparatus includes a signal generation unit, a signal adjustment unit, a digital-to-analog conversion unit, and a transmission unit that are sequentially connected. The transmission unit includes a first port and a second port. A signal transmitted by the first port is orthogonal to a signal received by the second port. The signal generation unit is configured to generate a first signal and a second signal. The signal adjustment unit is configured to: determine a polarization mode of each of two to-be-transmitted signals, where a polarization mode of a $1^{st}$ to-be-transmitted signal includes linear polarization, circular polarization, and elliptical polarization, and a polarization mode of a $2^{nd}$ to-be-transmitted signal includes linear polarization, circular polarization, and elliptical polarization, divide the first signal into two first signals, and divide the second signal into two second signals, separately adjust an amplitude and a phase of a $1^{st}$ first signal and an amplitude and a phase of a $2^{nd}$ first signal based on the polarization mode of the $1^{st}$ to-be-transmitted signal, separately adjust an amplitude and a phase of a $1^{st}$ second signal and an amplitude and a phase of a $2^{nd}$ second signal based on the polarization mode of the $2^{nd}$ to-be-transmitted signal, and combine an adjusted $1^{st}$ first signal and an adjusted $1^{st}$ second signal into a third signal, and combine an adjusted $2^{nd}$ first signal and an adjusted $2^{nd}$ second signal into a fourth signal. The digital-to-analog conversion unit is configured to perform digital-to-analog conversion on the third signal to obtain a fifth signal, and perform digital-to-analog conversion on the fourth signal to obtain a sixth signal. The transmission unit is configured to transmit the fifth signal by using the first port, and transmit the sixth signal by using the second port.

With the foregoing solution, the polarization reconfigurable apparatus may perform polarization reconfiguration based on a polarization mode of a received signal in digital domain, and precision of amplitude and phase adjustment on a signal is relatively high, thereby improving polarization reconfiguration precision and flexibility. A problem that polarization modes of a transmit end and a receive end do not match due to a depolarization effect can be resolved, thereby improving signal reception efficiency and increasing a signal-to-noise ratio of a signal received by the receive end.

In a possible implementation, when the apparatus includes one transmission unit, the polarization mode of the $1^{st}$ to-be-transmitted signal is orthogonal to the polarization mode of the $2^{nd}$ to-be-transmitted signal.

In a possible implementation, the polarization mode of the $1^{st}$ to-be-transmitted signal is vertical linear polarization, and the polarization mode of the $2^{nd}$ to-be-transmitted signal is horizontal linear polarization, or the polarization mode of the $1^{st}$ to-be-transmitted signal is horizontal linear polarization, and the polarization mode of the $2^{nd}$ to-be-transmitted signal is vertical linear polarization, or the polarization mode of the $1^{st}$ to-be-transmitted signal is +45° linear polarization, and the polarization mode of the $2^{nd}$ to-be-transmitted signal is −45° linear polarization, or the polarization mode of the $1^{st}$ to-be-transmitted signal is −45° linear polarization, and the polarization mode of the $2^{nd}$ to-be-transmitted signal is +45° linear polarization, or the polarization mode of the $1^{st}$ to-be-transmitted signal is left-handed circular polarization, and the polarization mode of the $2^{nd}$ to-be-transmitted signal is right-handed circular polarization, or the polarization mode of the $1^{st}$ to-be-transmitted signal is right-handed circular polarization, and the polarization mode of the $2^{nd}$ to-be-transmitted signal is left-handed circular polarization.

In a possible implementation, when the polarization mode of the $1^{st}$ to-be-transmitted signal is vertical linear polarization, an amplitude A1 of the adjusted $1^{st}$ first signal is 0 (a phase α1 of the adjusted $1^{st}$ first signal does not exist), and an amplitude B1 and a phase β1 of the adjusted $2^{nd}$ first signal may be any values, and when the polarization mode of the $2^{nd}$ to-be-transmitted signal is horizontal linear polarization, an amplitude A2 and a phase α2 of the adjusted $1^{st}$ second signal are any values, and an amplitude B2 of the adjusted $2^{nd}$ second signal is 0 (a phase β2 of the adjusted $2^{nd}$ second signal does not exist).

When the polarization mode of the $1^{st}$ to-be-transmitted signal is horizontal linear polarization, an amplitude A1 and a phase α1 of the adjusted $1^{st}$ first signal are any values, and an amplitude B1 of the adjusted $2^{nd}$ first signal is 0 (a phase β1 of the adjusted $2^{nd}$ first signal does not exist), and when the polarization mode of the $2^{nd}$ to-be-transmitted signal is vertical linear polarization, an amplitude A2 of the adjusted $1^{st}$ second signal is 0 (a phase α2 of the adjusted $1^{st}$ second signal does not exist), and an amplitude B2 and a phase β2 of the adjusted $2^{nd}$ second signal are any values.

When the polarization mode of the $1^{st}$ to-be-transmitted signal is +45° linear polarization, a ratio A1/B1 of an amplitude A1 of the adjusted $1^{st}$ first signal to an amplitude B1 of the adjusted $2^{nd}$ first signal is 1, and a difference α1−β1 between a phase α1 of the adjusted $1^{st}$ first signal and a phase β1 of the adjusted $2^{nd}$ first signal is an even multiple of 180°, and when the polarization mode of the $2^{nd}$ to-be-transmitted signal is −45° linear polarization, a ratio A2/B2 of an amplitude A2 of the adjusted $1^{st}$ second signal to an amplitude B2 of the adjusted $2^{nd}$ second signal is 1, and a difference α2–β2 between a phase α2 of the adjusted $1^{st}$ second signal and a phase β2 of the adjusted $2^{nd}$ second signal is an odd multiple of 180°.

When the polarization mode of the $1^{st}$ to-be-transmitted signal is −45° linear polarization, a ratio A1/B1 of an amplitude A1 of the adjusted $1^{st}$ first signal to an amplitude B1 of the adjusted $2^{nd}$ first signal is 1, and a difference α1–β1 between a phase α1 of the adjusted $1^{st}$ first signal and a phase β1 of the adjusted $2^{nd}$ first signal is an odd multiple of 180°, and when the polarization mode of the $2^{nd}$ to-be-transmitted signal is +45° linear polarization, a ratio A2/B2 of an amplitude A2 of the adjusted $1^{st}$ second signal to an amplitude B2 of the adjusted $2^{nd}$ second signal is 1, and a difference α2–β2 between a phase α2 of the adjusted $1^{st}$ second signal and a phase β2 of the adjusted $2^{nd}$ second signal is an even multiple of 180°.

When the polarization mode of the $1^{st}$ to-be-transmitted signal is left-handed circular polarization, a ratio A1/B1 of an amplitude A1 of the adjusted $1^{st}$ first signal to an amplitude B1 of the adjusted $2^{nd}$ first signal is 1, and a difference α1–β1 between a phase α1 of the adjusted $1^{st}$ first signal and a phase β1 of the adjusted $2^{nd}$ first signal is 90°, and when the polarization mode of the $2^{nd}$ to-be-transmitted signal is right-handed circular polarization, a ratio A2/B2 of an amplitude A2 of the adjusted $1^{st}$ second signal to an amplitude B2 of the adjusted $2^{nd}$ second signal is 1, and a difference α2–β2 between a phase α2 of the adjusted $1^{st}$ second signal and a phase β2 of the adjusted $2^{nd}$ second signal is −90°.

When the polarization mode of the $1^{st}$ to-be-transmitted signal is right-handed circular polarization, a ratio A1/B1 of an amplitude A1 of the adjusted $1^{st}$ first signal to an amplitude B1 of the adjusted $2^{nd}$ first signal is 1, and a difference α1–β1 between a phase α1 of the adjusted $1^{st}$ first signal and a phase β1 of the adjusted $2^{nd}$ first signal is −90°, and when the polarization mode of the $2^{nd}$ to-be-transmitted signal is left-handed circular polarization, a ratio A2/B2 of an amplitude A2 of the adjusted $1^{st}$ second signal to an amplitude B2 of the adjusted $2^{nd}$ second signal is 1, and a difference α2–β2 between a phase α2 of the adjusted $1^{st}$ second signal and a phase β2 of the adjusted $2^{nd}$ second signal is 90°.

In a possible implementation, when the polarization mode of the $1^{st}$ to-be-transmitted signal is horizontal linear polarization and the polarization mode of the $2^{nd}$ to-be-transmitted signal is vertical linear polarization, a ratio of an amplitude A1 of the adjusted $1^{st}$ first signal to an amplitude B1 of the adjusted $2^{nd}$ first signal, and a difference between a phase α1 of the adjusted $1^{st}$ first signal and a phase β1 of the adjusted $2^{nd}$ first signal satisfy the following conditions:

$$\frac{A_1}{B_1} = \frac{A_{VV}}{A_{HV}}$$

$$\alpha_1 - \beta_1 = \theta_{VV} - \theta_{HV} + n*180°$$

where $A_{VV}$ is an amplitude of a vertically linearly polarized reference signal received by a first port of a receive end, $\theta_{VV}$ is a phase of the vertically linearly polarized reference signal received by the first port of the receive end, $A_{HV}$ is an amplitude of a horizontally linearly polarized reference signal received by the first port of the receive end, $\theta_{HV}$ is a phase of the horizontally linearly polarized reference signal received by the first port of the receive end, n is an odd number, the first port of the receive end is configured to receive a vertically linearly polarized signal, the vertically linearly polarized reference signal and the horizontally linearly polarized reference signal are reference signals sent by the apparatus, and the receive end is configured to receive the $1^{st}$ to-be-transmitted signal and the $2^{nd}$ to-be-transmitted signal, and a ratio of an amplitude A2 of the adjusted $1^{st}$ second signal to an amplitude B2 of the adjusted $2^{nd}$ second signal, and a difference between a phase α2 of the adjusted $1^{st}$ second signal and a phase β2 of the adjusted $2^{nd}$ second signal satisfy the following conditions:

$$\frac{A_2}{B_2} = \frac{A_{VH}}{A_{HH}}$$

$$\alpha_2 - \beta_2 = \theta_{VH} - \theta_{HH} + m*180°$$

where $A_{VH}$ is an amplitude of a vertically linearly polarized reference signal received by a second port of the receive end, $\theta_{VH}$ is a phase of the vertically linearly polarized reference signal received by the second port of the receive end, $A_{HH}$ is an amplitude of a horizontally linearly polarized reference signal received by the second port of the receive end, $\theta_{HH}$ is a phase of the horizontally linearly polarized reference signal received by the second port of the receive end, m is an odd number, and the second port of the receive end is configured to receive a horizontally linearly polarized signal.

With the foregoing solution, in a scenario in which the polarization mode of the $1^{st}$ to-be-transmitted signal is horizontal linear polarization and the polarization mode of the $2^{nd}$ to-be-transmitted signal is vertical linear polarization, the polarization reconfigurable apparatus may pre-compensate for impact of a depolarization effect, so that the two signals received by the receive end are orthogonal, and cross-polarization interference and a depolarization effect are eliminated.

In a possible implementation, the polarization reconfigurable apparatus includes N transmission units, N digital-to-analog conversion units in a one-to-one correspondence with the N transmission units, and N signal adjustment units in a one-to-one correspondence with the N digital-to-analog conversion units, where N is an integer greater than or equal to 2.

A phase difference between adjusted $1^{st}$ first signals obtained by any two adjacent signal adjustment units is θ1, and a phase difference between adjusted $2^{nd}$ first signals obtained by any two adjacent signal adjustment units is θ1, where θ1 is determined based on a beam direction of the $1^{st}$ to-be-transmitted signal. A phase difference between adjusted $1^{st}$ second signals obtained by any two adjacent signal adjustment units is θ2, and a phase difference between adjusted $2^{nd}$ second signals obtained by any two adjacent signal adjustment units is θ2, where θ2 is determined based on a beam direction of the $2^{nd}$ to-be-transmitted signal.

With the foregoing solution, the polarization reconfigurable apparatus can further separately control the beam directions of the two signals with different polarization modes while implementing polarization reconfiguration for the two signals.

In a possible implementation, the transmission unit includes a dual-polarized antenna, and the dual-polarized antenna includes the first port and the second port. When N dual-polarized antennas in the N transmission units form a uniformly spaced linear array, θ1 and θ2 satisfy the following formulas:

$$\theta1 = k1 \times d \times \sin \varphi1$$

$$\theta2 = k2 \times d \times \sin \varphi2$$

where k1 is a wave number of a carrier that carries the $1^{st}$ to-be-transmitted signal, d is a distance between two adjacent dual-polarized antennas, φ1 is an included angle between the beam direction of the $1^{st}$ to-be-transmitted signal and a normal direction of the linear array, k2 is a wave number of a carrier that carries the $2^{nd}$ to-be-transmitted signal, and φ2 is an included angle between the beam direction of the $2^{nd}$ to-be-transmitted signal and the normal direction of the linear array.

According to a fifth aspect, this application provides a communications device. The communications device is a first communications device, and the first communications device includes a memory and a processor. The memory stores code instructions. The processor is configured to invoke the code instructions stored in the memory to perform the following operations: generating a first signal and a second signal, determining a polarization mode of each of two to-be-transmitted signals, where a polarization mode of a $1^{st}$ to-be-transmitted signal includes linear polarization, circular polarization, and elliptical polarization, and a polarization mode of a $2^{nd}$ to-be-transmitted signal includes linear polarization, circular polarization, and elliptical polarization, dividing the first signal into 2N first signals, and dividing the second signal into 2N second signals, where N is a positive integer, separately adjusting an amplitude and a phase of a $(2i-1)^{th}$ first signal and an amplitude and a phase of a $2i^{th}$ first signal based on the polarization mode of the $1^{st}$ to-be-transmitted signal, where i=1, . . . , N, separately adjusting an amplitude and a phase of a $(2i-1)^{th}$ second signal and an amplitude and a phase of a $2i^{th}$ second signal based on the polarization mode of the $2^{nd}$ to-be-transmitted signal, combining an adjusted $(2i-1)^{th}$ first signal and an adjusted $(2i-1)^{th}$ second signal into an $i^{th}$ third signal, and combining an adjusted $2i^{th}$ first signal and an adjusted $2i^{th}$ second signal into an $i^{th}$ fourth signal, and performing digital-to-analog conversion on the $i^{th}$ third signal to obtain an $i^{th}$ fifth signal, and performing digital-to-analog conversion on the $i^{th}$ fourth signal to obtain an $i^{th}$ sixth signal.

With the foregoing solution, the first communications device may perform polarization reconfiguration based on a polarization mode of a received signal in digital domain, and precision of amplitude and phase adjustment on a signal is relatively high, thereby improving polarization reconfiguration precision and flexibility. A problem that polarization modes of a transmit end and a receive end do not match due to a depolarization effect can be resolved, thereby improving signal reception efficiency and increasing a signal-to-noise ratio of a signal received by the receive end.

In a possible implementation, the $i^{th}$ fifth signal is transmitted by using a $(2i-1)^{th}$ port in the first communications device, and the $i^{th}$ sixth signal is transmitted by using a $2i^{th}$ port in the first communications device. The signal transmitted by the $(2i-1)^{th}$ port is orthogonal to the signal transmitted by the $2i^{th}$ port.

When N=1, the polarization mode of the $1^{st}$ to-be-transmitted signal is orthogonal to the polarization mode of the $2^{nd}$ to-be-transmitted signal.

In a possible implementation, when the polarization mode of the $1^{st}$ to-be-transmitted signal is horizontal linear polarization and the polarization mode of the $2^{nd}$ to-be-transmitted signal is vertical linear polarization, a ratio of an amplitude A1 of an adjusted $1^{st}$ first signal to an amplitude B1 of an adjusted $2^{nd}$ first signal, and a difference between a phase α1 of the adjusted $1^{st}$ first signal and a phase β1 of the adjusted $2^{nd}$ first signal satisfy the following conditions:

$$\frac{A_1}{B_1} = \frac{A_{VV}}{A_{HV}}$$

$$\alpha_1 - \beta_1 = \theta_{VV} - \theta_{HV} + n * 180°$$

where $A_{VV}$ is an amplitude of a vertically linearly polarized reference signal received by a first port of a second communications device, $\theta_{VV}$ is a phase of the vertically linearly polarized reference signal received by the first port of the second communications device, $A_{HV}$ is an amplitude of a horizontally linearly polarized reference signal received by the first port of the second communications device, $\theta_{HV}$ is a phase of the horizontally linearly polarized reference signal received by the first port of the second communications device, n is an odd number, the first port of the second communications device is configured to receive a vertically linearly polarized signal, the vertically linearly polarized reference signal and the horizontally linearly polarized reference signal are reference signals sent by the first communications device, and the second communications device is configured to receive the $1^{st}$ to-be-transmitted signal and the $2^{nd}$ to-be-transmitted signal, and a ratio of an amplitude A2 of an adjusted $1^{st}$ second signal to an amplitude B2 of an adjusted $2^{nd}$ second signal, and a difference between a phase α2 of the adjusted $1^{st}$ second signal and a phase β2 of the adjusted $2^{nd}$ second signal satisfy the following conditions:

$$\frac{A_2}{B_2} = \frac{A_{VH}}{A_{HH}}$$

$$\alpha_2 - \beta_2 = \theta_{VH} - \theta_{HH} + m * 180°$$

where $A_{VH}$ is an amplitude of a vertically linearly polarized reference signal received by a second port of the second communications device, $\theta_{VH}$ is a phase of the vertically linearly polarized reference signal received by the second port of the second communications device, $A_{HH}$ is an amplitude of a horizontally linearly polarized reference signal received by the second port of the second communications device, $\theta_{HH}$ is a phase of the horizontally linearly polarized reference signal received by the second port of the second communications device, m is an odd number, and the second port of the second communications device is configured to receive a horizontally linearly polarized signal.

With the foregoing solution, in a scenario in which the polarization mode of the $1^{st}$ to-be-transmitted signal is horizontal linear polarization and the polarization mode of the $2^{nd}$ to-be-transmitted signal is vertical linear polarization, the polarization reconfigurable apparatus may precompensate for impact of a depolarization effect, so that the two signals received by the receive end are orthogonal, and cross-polarization interference and a depolarization effect are eliminated.

In a possible implementation, when N is greater than 1, a phase difference between the adjusted $(2i-1)^{th}$ first signal and the adjusted $2i^{th}$ first signal is θ1, where θ1 is determined based on a beam direction of the $1^{st}$ to-be-transmitted signal, and a phase difference between the adjusted $(2i-1)^{th}$ second signal and the adjusted $2i^{th}$ second signal is θ2, where θ2 is determined based on a beam direction of the $2^{nd}$ to-be-transmitted signal.

In a possible implementation, in a scenario in which a transceiver of the first communications device includes a dual-polarized antenna and the dual-polarized antenna includes a first port and a second port, when N dual-polarized antennas in N transmission units form a uniformly spaced linear array, θ1 and θ2 satisfy the following formulas:

θ1=k1×d×sin φ1

θ2=k2×d×sin φ2 where k1 is a wave number of a carrier that carries the $1^{st}$ to-be-transmitted signal, d is a distance between two adjacent dual-polarized antennas, φ1 is an included angle between the beam direction of the $1^{st}$ to-be-transmitted signal and a normal direction of the linear array, k2 is a wave number of a carrier that carries the $2^{nd}$ to-be-transmitted signal, and φ2 is an included angle between the beam direction of the $2^{nd}$ to-be-transmitted signal and the normal direction of the linear array.

According to a sixth aspect, an embodiment of this application provides a polarization reconfiguration method, applied to a first communications device. The first communications device includes 2N ports, a signal transmitted by a $(2i-1)^{th}$ port is orthogonal to a signal transmitted by a $2i^{th}$ port, i=1, . . . , N, and N is a positive integer. The method includes: generating a first signal and a second signal, determining a polarization mode of each of two to-be-transmitted signals, where a polarization mode of a $1^{st}$ to-be-transmitted signal includes linear polarization, circular polarization, and elliptical polarization, and a polarization mode of a $2^{nd}$ to-be-transmitted signal includes linear polarization, circular polarization, and elliptical polarization, dividing the first signal into 2N first signals, and dividing the second signal into 2N second signals, separately adjusting an amplitude and a phase of a $(2i-1)^{th}$ first signal and an amplitude and a phase of a $2i^{th}$ first signal based on the polarization mode of the $1^{st}$ to-be-transmitted signal, separately adjusting an amplitude and a phase of a $(2i-1)^{th}$ second signal and an amplitude and a phase of a $2i^{th}$ second signal based on the polarization mode of the $2^{nd}$ to-be-transmitted signal, combining an adjusted $(2i-1)^{th}$ first signal and an adjusted $(2i-1)^{th}$ second signal into an $i^{th}$ third signal, and combining an adjusted $2i^{th}$ first signal and an adjusted $2i^{th}$ second signal into an $i^{th}$ fourth signal, performing digital-to-analog conversion on the $i^{th}$ third signal to obtain an $i^{th}$ fifth signal, and performing digital-to-analog conversion on the $i^{th}$ fourth signal to obtain an $i^{th}$ sixth signal, and transmitting the $i^{th}$ fifth signal by using the $(2i-1)^{th}$ port, and transmitting the $i^{th}$ sixth signal by using the $2i^{th}$ port.

With the foregoing solution, the first communications device may perform polarization reconfiguration based on a polarization mode of a received signal in digital domain, and precision of amplitude and phase adjustment on a signal is relatively high, thereby improving polarization reconfiguration precision and flexibility. A problem that polarization modes of a transmit end and a receive end do not match due to a depolarization effect can be resolved, thereby improving signal reception efficiency and increasing a signal-to-noise ratio of a signal received by the receive end.

In a possible implementation, when N=1, the polarization mode of the $1^{st}$ to-be-transmitted signal is orthogonal to the polarization mode of the $2^{nd}$ to-be-transmitted signal.

In a possible implementation, the polarization mode of the $1^{st}$ to-be-transmitted signal is vertical linear polarization, and the polarization mode of the $2^{nd}$ to-be-transmitted signal is horizontal linear polarization, or the polarization mode of the $1^{st}$ to-be-transmitted signal is horizontal linear polarization, and the polarization mode of the $2^{nd}$ to-be-transmitted signal is vertical linear polarization, or the polarization mode of the $1^{st}$ to-be-transmitted signal is +45° linear polarization, and the polarization mode of the $2^{nd}$ to-be-transmitted signal is −45° linear polarization, or the polarization mode of the $1^{st}$ to-be-transmitted signal is −45° linear polarization, and the polarization mode of the $2^{nd}$ to-be-transmitted signal is +45° linear polarization, or the polarization mode of the $1^{st}$ to-be-transmitted signal is left-handed circular polarization, and the polarization mode of the $2^{nd}$ to-be-transmitted signal is right-handed circular polarization, or the polarization mode of the $1^{st}$ to-be-transmitted signal is right-handed circular polarization, and the polarization mode of the $2^{nd}$ to-be-transmitted signal is left-handed circular polarization.

In a possible implementation, when the polarization mode of the $1^{st}$ to-be-transmitted signal is vertical linear polarization, an amplitude A1 of the adjusted $(2i-1)^{th}$ first signal is 0 (a phase α1 of an adjusted $1^{st}$ first signal does not exist), and an amplitude B1 and a phase β1 of the adjusted $2i^{th}$ first signal may be any values, and when the polarization mode of the $2^{nd}$ to-be-transmitted signal is horizontal linear polarization, an amplitude A2 and a phase α2 of the adjusted $(2i-1)^{th}$ second signal are any values, and an amplitude B2 of the adjusted $2i^{th}$ second signal is 0 (a phase β2 of an adjusted $2^{nd}$ second signal does not exist).

When the polarization mode of the $1^{st}$ to-be-transmitted signal is horizontal linear polarization, an amplitude A1 and a phase α1 of the adjusted $(2i-1)^{th}$ first signal are any values, and an amplitude B1 of the adjusted $2i^{th}$ first signal is 0 (a phase β1 of an adjusted $2^{nd}$ first signal does not exist), and when the polarization mode of the $2^{nd}$ to-be-transmitted signal is vertical linear polarization, an amplitude A2 of the adjusted $(2i-1)^{th}$ second signal is 0 (a phase α2 of an adjusted $1^{st}$ second signal does not exist), and an amplitude B2 and a phase β2 of the adjusted $2i^{th}$ second signal are any values.

When the polarization mode of the $1^{st}$ to-be-transmitted signal is +45° linear polarization, a ratio A1/B1 of an amplitude A1 of the adjusted $(2i-1)^{th}$ first signal to an amplitude B1 of the adjusted $2i^{th}$ first signal is 1, and a difference α1−β1 between a phase α1 of the adjusted $(2i-1)^{th}$ first signal and a phase β1 of the adjusted $2i^{th}$ first signal is an even multiple of 180°, and when the polarization mode of the $2^{nd}$ to-be-transmitted signal is −45° linear polarization, a ratio A2/B2 of an amplitude A2 of the adjusted $(2i-1)^{th}$ second signal to an amplitude B2 of the adjusted $2i^{th}$ second signal is 1, and a difference α2−β2 between a phase α2 of the adjusted $(2i-1)^{th}$ second signal and a phase β2 of the adjusted $2i^{th}$ second signal is an odd multiple of 180°.

When the polarization mode of the $1^{st}$ to-be-transmitted signal is −45° linear polarization, a ratio A1/B1 of an amplitude A1 of the adjusted $(2i-1)^{th}$ first signal to an amplitude B1 of the adjusted $2i^{th}$ first signal is 1, and a difference α1−β1 between a phase α1 of the adjusted $(2i-1)^{th}$ first signal and a phase β1 of the adjusted $2i^{th}$ first signal is an odd multiple of 180°, and when the polarization mode of the $2^{nd}$ to-be-transmitted signal is +45° linear polarization, a ratio A2/B2 of an amplitude A2 of the adjusted $(2i-1)^{th}$ second signal to an amplitude B2 of the adjusted $2i^{th}$ second signal is 1, and a difference α2−β2 between a phase α2 of the adjusted $(2i-1)^{th}$ second signal and a phase β2 of the adjusted $2i^{th}$ second signal is an even multiple of 180°.

When the polarization mode of the $1^{st}$ to-be-transmitted signal is left-handed circular polarization, a ratio A1/B1 of an amplitude A1 of the adjusted $(2i-1)^{th}$ first signal to an amplitude B1 of the adjusted $2i^{th}$ first signal is 1, and a difference α1–β1 between a phase α1 of the adjusted $(2i-1)^{th}$ first signal and a phase β1 of the adjusted $2i^{th}$ first signal is 90°, and when the polarization mode of the $2^{nd}$ to-be-transmitted signal is right-handed circular polarization, a ratio A2/B2 of an amplitude A2 of the adjusted $(2i-1)^{th}$ second signal to an amplitude B2 of the adjusted $2i^{th}$ second signal is 1, and a difference α2–β2 between a phase α2 of the adjusted $(2i-1)^{th}$ second signal and a phase β2 of the adjusted $2i^{th}$ second signal is –90°.

When the polarization mode of the $1^{st}$ to-be-transmitted signal is right-handed circular polarization, a ratio A1/B1 of an amplitude A1 of the adjusted $(2i-1)^{th}$ first signal to an amplitude B1 of the adjusted $2i^{th}$ first signal is 1, and a difference α1–β1 between a phase α1 of the adjusted $(2i-1)^{th}$ first signal and a phase β1 of the adjusted $2i^{th}$ first signal is –90°, and when the polarization mode of the $2^{nd}$ to-be-transmitted signal is left-handed circular polarization, a ratio A2/B2 of an amplitude A2 of the adjusted $(2i-1)^{th}$ second signal to an amplitude B2 of the adjusted $2i^{th}$ second signal is 1, and a difference α2–β2 between a phase α2 of the adjusted $(2i-1)^{th}$ second signal and a phase β2 of the adjusted $2i^{th}$ second signal is 90°.

In a possible implementation, when the polarization mode of the $1^{st}$ to-be-transmitted signal is horizontal linear polarization and the polarization mode of the $2^{nd}$ to-be-transmitted signal is vertical linear polarization, a ratio of an amplitude A1 of the adjusted $1^{st}$ first signal to an amplitude B1 of the adjusted $2^{nd}$ first signal, and a difference between a phase α1 the adjusted $1^{st}$ first signal and a phase β1 of the adjusted $2^{nd}$ first signal satisfy the following conditions:

$$\frac{A_1}{B_1} = \frac{A_{VV}}{A_{HV}}$$

$$\alpha_1 - \beta_1 = \theta_{VV} - \theta_{HV} + n*180°$$

where $A_{VV}$ is an amplitude of a vertically linearly polarized reference signal received by a first port of a second communications device, $\theta_{VV}$ is a phase of the vertically linearly polarized reference signal received by the first port of the second communications device, $A_{HV}$ is an amplitude of a horizontally linearly polarized reference signal received by the first port of the second communications device, $\theta_{HV}$ is a phase of the horizontally linearly polarized reference signal received by the first port of the second communications device, n is an odd number, the first port of the second communications device is configured to receive a vertically linearly polarized signal, the vertically linearly polarized reference signal and the horizontally linearly polarized reference signal are reference signals sent by the first communications device, and the second communications device is configured to receive the $1^{st}$ to-be-transmitted signal and the $2^{nd}$ to-be-transmitted signal, and a ratio of an amplitude A2 of the adjusted $1^{st}$ second signal to an amplitude B2 of the adjusted $2^{nd}$ second signal, and a difference between a phase φ2 of the adjusted $1^{st}$ second signal and a phase β2 of the adjusted $2^{nd}$ second signal satisfy the following conditions:

$$\frac{A_2}{B_2} = \frac{A_{VH}}{A_{HH}}$$

$$\alpha_2 - \beta_2 = \theta_{VH} - \theta_{HH} + m*180°$$

where $A_{VH}$ is an amplitude of a vertically linearly polarized reference signal received by a second port of the second communications device, $\theta_{VH}$ is a phase of the vertically linearly polarized reference signal received by the second port of the second communications device, $A_{HH}$ is an amplitude of a horizontally linearly polarized reference signal received by the second port of the second communications device, $\theta_{HH}$ is a phase of the horizontally linearly polarized reference signal received by the second port of the second communications device, m is an odd number, and the second port of the second communications device is configured to receive a horizontally linearly polarized signal.

With the foregoing solution, in a scenario in which the polarization mode of the $1^{st}$ to-be-transmitted signal is horizontal linear polarization and the polarization mode of the $2^{nd}$ to-be-transmitted signal is vertical linear polarization, the first wireless device may pre-compensate for impact of a depolarization effect, so that the two signals received by the second communications device are orthogonal, and cross-polarization interference and a depolarization effect are eliminated. The foregoing solution is especially suitable for a scenario in which downlink transmission is mainly performed in wireless communication and a power and hardware resources of a base station are superior to those of a terminal device, without increasing complexity, costs, or power consumption of the terminal device.

In a possible implementation, when N is greater than 1, a phase difference between the adjusted $(2i-1)^{th}$ first signal and the adjusted $2i^{th}$ first signal is θ1, where θ1 is determined based on a beam direction of the $1^{st}$ to-be-transmitted signal, and a phase difference between the adjusted $(2i-1)^{th}$ second signal and the adjusted $2i^{th}$ second signal is θ2, where θ2 is determined based on a beam direction of the $2^{nd}$ to-be-transmitted signal.

In a possible implementation, the first communications device includes N dual-polarized antennas, and an $i^{th}$ dual-polarized antenna includes the $(2i-1)^{th}$ port and the $2i^{th}$ port. When the N dual-polarized antennas form a uniformly spaced linear array, θ1 and θ2 satisfy the following formulas:

θ1=k1×d×sin φ1

θ2=k2×d×sin φ2 where k1 is a wave number of a carrier that carries the $1^{st}$ to-be-transmitted signal, d is a distance between two adjacent dual-polarized antennas, φ1 is an included angle between the beam direction of the $1^{st}$ to-be-transmitted signal and a normal direction of the linear array, k2 is a wave number of a carrier that carries the $2^{nd}$ to-be-transmitted signal, and φ2 is an included angle between the beam direction of the $2^{nd}$ to-be-transmitted signal and the normal direction of the linear array.

According to a seventh aspect, this application further provides a polarization reconfigurable apparatus, used for a receive-end device. The polarization reconfigurable apparatus includes a receiving unit, an analog-to-digital conversion unit, and a signal adjustment unit that are sequentially connected. The receiving unit includes a first port and a second port. A signal received by the first port is orthogonal to a signal received by the second port. The receiving unit is configured to receive a first signal by using the first port, and receive a second signal by using the second port. The first signal is a component of a third signal in a direction corresponding to the first port. The second signal is a component of the third signal in a direction corresponding to the second port. The analog-to-digital conversion unit is configured to perform analog-to-digital conversion on the first signal to obtain a fourth signal, and perform analog-to-digital conversion on the second signal to obtain a fifth signal. The signal adjustment unit is configured to: determine a polarization mode of the third signal, where the polarization mode includes linear polarization, circular polarization, and elliptical polarization, adjust an amplitude and a phase of the fourth signal and an amplitude and a phase of the fifth signal based on the determined polarization mode, and combine an adjusted fourth signal and an adjusted fifth signal into a sixth signal.

With the foregoing solution, the polarization reconfigurable apparatus can perform polarization reconfiguration on a received signal in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

In a possible implementation, during specific implementation, when the polarization mode of the third signal is linear polarization at an angle of $\gamma_1$ ($\gamma_1 \in (-90°, 90°)$, and $\gamma_1 \neq 0°$), a ratio of an amplitude A of the adjusted fourth signal to an amplitude B of the adjusted fifth signal is $|\tan \gamma_3|$. When $\gamma_1 > 0$, a difference between a phase $\alpha$ of the adjusted fourth signal and a phase $\beta$ of the adjusted fifth signal is an even multiple of 180°, or when $\gamma_1 < 0$, a difference between a phase $\alpha$ of the adjusted fourth signal and a phase $\beta$ of the adjusted fifth signal is an odd multiple of 180°. $\gamma_1$ is an included angle between an electric field direction of the third signal and a horizontal direction on a plane perpendicular to a propagation direction of the third signal.

When the polarization mode of the third signal is circular polarization, a ratio of an amplitude A of the adjusted fourth signal to an amplitude B of the adjusted fifth signal is 1, and a difference between a phase $\alpha$ of the adjusted fourth signal and a phase $\beta$ of the adjusted fifth signal is an odd multiple of 90°.

When the polarization mode of the third signal is elliptical polarization, a ratio A/B of an amplitude A of the adjusted fourth signal to an amplitude B of the adjusted fifth signal, and a difference $\alpha - \beta$ between a phase $\alpha$ of the adjusted fourth signal and a phase $\beta$ of the adjusted fifth signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

The ratio A/B of the amplitude A of the adjusted fourth signal to the amplitude B of the adjusted fifth signal, and $\alpha - \beta$ between the phase $\alpha$ of the adjusted fourth signal and the phase $\beta$ of the adjusted fifth signal satisfy the following formulas:

$$\tan 2\gamma_2 = \frac{2\left(\frac{A}{B}\right)\cos(\alpha - \beta)}{\left(\frac{A}{B}\right)^2 - 1}$$

-continued $$AR = \sqrt{\frac{\left(\frac{A}{B}\right)^2 (\cos\gamma_2)^2 + \frac{A}{B}\sin 2\gamma_2 \cos(\alpha - \beta) + (\sin\gamma_2)^2}{\left(\frac{A}{B}\right)^2 (\sin\gamma_2)^2 - \frac{A}{B}\sin 2\gamma_2 \cos(\alpha - \beta) + (\cos\gamma_2)^2}}$$

In a possible implementation, the polarization reconfigurable apparatus may further include a signal processing unit, and the signal processing unit is configured to process the sixth signal.

In a possible implementation, the polarization reconfigurable apparatus may include N receiving units, N digital-to-analog conversion units in a one-to-one correspondence with the N receiving units, and N signal adjustment units in a one-to-one correspondence with the N digital-to-analog conversion units, where N is an integer greater than or equal to 2. A phase difference between adjusted fourth signals obtained by any two adjacent signal adjustment units is $\theta$, and a phase difference between adjusted fifth signals obtained by any two adjacent signal adjustment units is $\theta$, where $\theta$ is determined based on a beam direction of the third signal. In other words, the polarization reconfigurable apparatus may further control the beam direction of the third signal.

In this case, the signal processing unit is further configured to combine N sixth signals obtained by the N signal adjustment units into a seventh signal, and process the seventh signal.

In a possible implementation, the receiving unit includes a dual-polarized antenna, and the dual-polarized antenna includes the first port and the second port, and is configured to receive the first signal by using the first port. When N dual-polarized antennas in the N receiving units form a uniformly spaced linear array, $\theta$ satisfies the following formula:

$\theta = k \times d \times \sin \varphi$ where k is a wave number of a carrier used to carry the third signal, d is a distance between two adjacent dual-polarized antennas, and $\varphi$ is an included angle between the beam direction of the third signal and a normal direction of the linear array.

According to an eighth aspect, this application further provides a communications device. The communications device includes a memory and a processor. The memory stores code instructions. The processor is configured to invoke the code instructions stored in the memory to perform the following operations: performing analog-to-digital conversion on an $i^{th}$ first signal to obtain an $i^{th}$ second signal, where the $i^{th}$ first signal is a component of a third signal in a direction corresponding to a $(2i-1)^{th}$ port, i=1, ..., N, and N is a positive integer, performing analog-to-digital conversion on an $i^{th}$ fourth signal to obtain an $i^{th}$ fifth signal, where the $i^{th}$ fourth signal is a component of the third signal in a direction corresponding to a $2i^{th}$ port, determining a polarization mode of the third signal, where the polarization mode includes linear polarization, circular polarization, and elliptical polarization, adjusting an amplitude and a phase of the $i^{th}$ second signal and an amplitude and a phase of the $i^{th}$ fifth signal based on the determined polarization mode, and combining an adjusted $i^{th}$ second signal and an adjusted $i^{th}$ fifth signal into an $i^{th}$ sixth signal.

With the foregoing solution, the communications device can perform polarization reconfiguration on a received signal in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

In a possible implementation, the $i^{th}$ first signal is received by the communications device by using the $(2i-1)^{th}$ port of a transceiver in the communications device, and the $i^{th}$ fourth signal is received by the communications device by using the $2i^{th}$ port of the transceiver in the communications device. The signal received by the $(2i-1)^{th}$ port is orthogonal to the signal received by the $2i^{th}$ port.

In a possible implementation, when the polarization mode of the third signal is linear polarization at an angle of $\gamma_1$ ($\gamma_1 \in (-90°, 90°)$, and $\gamma_3! = 0°$), a ratio of an amplitude A of the adjusted $i^{th}$ second signal to an amplitude B of the adjusted $i^{th}$ fifth signal is $|\tan \gamma_3|$. When $\gamma_1 > 0$, a difference between a phase $\alpha$ of the adjusted $i^{th}$ second signal and a phase $\beta$ of the adjusted $i^{th}$ fifth signal is an even multiple of 180°, or when $\gamma_1 < 0$, a difference between a phase $\alpha$ of the adjusted $i^{th}$ second signal and a phase $\beta$ of the adjusted $i^{th}$ fifth signal is an odd multiple of 180°. $\gamma_1$ is an included angle between an electric field direction of the third signal and a horizontal direction on a plane perpendicular to a propagation direction of the third signal.

When the polarization mode of the third signal is circular polarization, a ratio of an amplitude A of the adjusted $i^{th}$ second signal to an amplitude B of the adjusted $i^{th}$ fifth signal is 1, and a difference between a phase $\alpha$ of the adjusted $i^{th}$ second signal and a phase $\beta$ of the adjusted $i^{th}$ fifth signal is an odd multiple of 90°.

When the polarization mode of the third signal is elliptical polarization, a ratio A/B of an amplitude A of the adjusted $i^{th}$ second signal to an amplitude B of the adjusted $i^{th}$ fifth signal, and a difference $\alpha - \beta$ between a phase $\alpha$ of the adjusted $i^{th}$ second signal and a phase $\beta$ of the adjusted $i^{th}$ fifth signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

In a possible implementation, when N is greater than 1, a difference between a phase of the adjusted $i^{th}$ second signal and a phase of an adjusted $(i+1)^{th}$ second signal is $\theta$, and a difference between a phase of the adjusted $i^{th}$ fifth signal and a phase of an adjusted $(i+1)^{th}$ fifth signal, where $\theta$ is determined based on a beam direction of the third signal. In other words, the communications device may further control the beam direction of the third signal.

In this case, the processor is further configured to combine N sixth signals into a seventh signal, and process the seventh signal.

In a possible implementation, the transceiver in the communications device includes N dual-polarized antennas, and an $i^{th}$ dual-polarized antenna includes the $(2i-1)^{th}$ port and the $2i^{th}$ port. When the N dual-polarized antennas form a uniformly spaced linear array, $\theta$ satisfies the following formula:

$$\theta = k \times d \times \sin \varphi$$

where k is a wave number of a carrier used to carry the third signal, d is a distance between two adjacent dual-polarized antennas, and $\varphi$ is an included angle between the beam direction of the third signal and a normal direction of the linear array.

According to a ninth aspect, this application provides a polarization reconfiguration method, applied to a communications device. The communications device includes 2N ports, a signal received by a $(2i-1)^{th}$ port is orthogonal to a signal received by a $2i^{th}$ port, $i=1, \ldots, N$, and N is a positive integer. The method includes: receiving an $i^{th}$ first signal by using the $(2i-1)^{th}$ port, and receiving an $i^{th}$ second signal by using the $2i^{th}$ port, where the $i^{th}$ first signal is a component of a third signal in a direction corresponding to the $(2i-1)^{th}$ port, and the $i^{th}$ second signal is a component of the third signal in a direction corresponding to the $2i^{th}$ port, performing analog-to-digital conversion on the $i^{th}$ first signal to obtain an $i^{th}$ fourth signal, and performing analog-to-digital conversion on the $i^{th}$ second signal to obtain an $i^{th}$ fifth signal, and determining a polarization mode of the third signal, where the polarization mode includes linear polarization, circular polarization, and elliptical polarization, adjusting an amplitude and a phase of the $i^{th}$ fourth signal and an amplitude and a phase of the $i^{th}$ fifth signal based on the determined polarization mode, and combining an adjusted $i^{th}$ fourth signal and an adjusted $i^{th}$ fifth signal into an $i^{th}$ sixth signal.

With the foregoing solution, the communications device can perform polarization reconfiguration on a received signal in digital domain, and reconfiguration precision is relatively high. A problem that polarization modes of a transmit end and a receive end do not match due to a depolarization effect can be resolved, thereby improving signal reception efficiency and increasing a signal-to-noise ratio of a signal received by the receive end.

In a possible implementation, when the polarization mode of the third signal is linear polarization at an angle of $\gamma_1$ ($\gamma_1 \in (-90°, 90°)$, and $\gamma_3! = 0°$), a ratio of an amplitude A of the adjusted $i^{th}$ fourth signal to an amplitude B of the adjusted $i^{th}$ fifth signal is $|\tan \gamma_3|$. When $\gamma_1 > 0$, a difference between a phase $\alpha$ of the adjusted $i^{th}$ fourth signal and a phase $\beta$ of the adjusted $i^{th}$ fifth signal is an even multiple of 180°, or when $\gamma_1 < 0$, a difference between a phase $\alpha$ of the adjusted $i^{th}$ fourth signal and a phase $\beta$ of the adjusted $i^{th}$ fifth signal is an odd multiple of 180°. $\gamma_1$ is an included angle between an electric field direction of the third signal and a horizontal direction on a plane perpendicular to a propagation direction of the third signal.

When the polarization mode of the third signal is circular polarization, a ratio of an amplitude A of the adjusted $i^{th}$ fourth signal to an amplitude B of the adjusted $i^{th}$ fifth signal is 1, and a difference between a phase $\alpha$ of the adjusted $i^{th}$ fourth signal and a phase $\beta$ of the adjusted $i^{th}$ fifth signal is an odd multiple of 90°.

When the polarization mode of the third signal is elliptical polarization, a ratio A/B of an amplitude A of the adjusted $i^{th}$ fourth signal to an amplitude B of the adjusted $i^{th}$ fifth signal, and a difference $\alpha - \beta$ between a phase $\alpha$ of the adjusted $i^{th}$ fourth signal and a phase $\beta$ of the adjusted $i^{th}$ fifth signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

In a possible implementation, when N is greater than 1, a difference between a phase of the adjusted $i^{th}$ fourth signal and a phase of an adjusted $(i+1)^{th}$ fourth signal is $\theta$, and a difference between a phase of the adjusted $i^{th}$ fifth signal and a phase of an adjusted $(i+1)^{th}$ fifth signal, where $\theta$ is determined based on a beam direction of the third signal. In other words, the communications device may further control the beam direction of the third signal.

In this case, the communications device further combines N sixth signals into a seventh signal, and processes the seventh signal.

In a possible implementation, the communications device includes N dual-polarized antennas, and an $i^{th}$ dual-polarized antenna includes the $(2i-1)^{th}$ port and the $2i^{th}$ port. When the N dual-polarized antennas form a uniformly spaced linear array, θ satisfies the following formula:

$$\theta = k \times d \times \sin\varphi$$

where k is a wave number of a carrier used to carry the third signal, d is a distance between two adjacent dual-polarized antennas, and φ is an included angle between the beam direction of the third signal and a normal direction of the linear array.

According to a tenth aspect, this application provides a polarization reconfigurable apparatus. The polarization reconfigurable apparatus includes a receiving unit, an analog-to-digital conversion unit, and a signal adjustment unit that are sequentially connected. The receiving unit includes a first port and a second port. A signal received by the first port is orthogonal to a signal received by the second port. The receiving unit is configured to receive a first signal by using the first port, and receive a second signal by using the second port. The first signal is a sum of a component of a third signal in a direction corresponding to the first port and a component of a fourth signal in the direction corresponding to the first port. The second signal is a sum of a component of the third signal in a direction corresponding to the second port and a component of the fourth signal in the direction corresponding to the second port. The analog-to-digital conversion unit is configured to perform analog-to-digital conversion on the first signal to obtain a fifth signal, and perform analog-to-digital conversion on the second signal to obtain a sixth signal. The signal adjustment unit is configured to: determine a polarization mode of the third signal and a polarization mode of the fourth signal, where the polarization mode of the third signal includes linear polarization, circular polarization, and elliptical polarization, and the polarization mode of the fourth signal includes linear polarization, circular polarization, and elliptical polarization, divide the fifth signal into two fifth signals, and divide the sixth signal into two sixth signals, adjust an amplitude and a phase of a $1^{st}$ fifth signal and an amplitude and a phase of a $1^{st}$ sixth signal based on the polarization mode of the third signal, and combine an adjusted $1^{st}$ fifth signal and an adjusted $1^{st}$ sixth signal into a seventh signal, and adjust an amplitude and a phase of a $2^{nd}$ fifth signal and an amplitude and a phase of a $2^{nd}$ sixth signal based on the polarization mode of the fourth signal, and combine an adjusted $2^{nd}$ fifth signal and an adjusted $2^{nd}$ sixth signal into an eighth signal.

With the foregoing solution, the polarization reconfigurable apparatus may separately perform polarization reconfiguration based on polarization modes of two received signals in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

In a possible implementation, the polarization reconfigurable apparatus may further include a signal processing unit, and the signal processing unit is configured to process the seventh signal and the eighth signal.

In a possible implementation, in a scenario in which the polarization reconfigurable apparatus includes one receiving unit, the polarization mode of the third signal is orthogonal to the polarization mode of the fourth signal.

In a possible implementation, the polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Further, when the polarization mode of the third signal is vertical linear polarization, an amplitude A1 of the adjusted $1^{st}$ fifth signal is 0 (a phase α1 of the adjusted $1^{st}$ fifth signal does not exist), and an amplitude B1 and a phase β1 of the adjusted $1^{st}$ sixth signal may be any values, and when the polarization mode of the fourth signal is horizontal linear polarization, an amplitude A2 and a phase β2 of the adjusted $2^{nd}$ fifth signal are any values, and an amplitude B2 of the adjusted $2^{nd}$ sixth signal is 0 (a phase β2 of the adjusted $2^{nd}$ sixth signal does not exist).

When the polarization mode of the third signal is horizontal linear polarization, an amplitude A1 and a phase α1 of the adjusted $1^{st}$ fifth signal are any values, and an amplitude B1 of the adjusted $1^{st}$ sixth signal is 0 (a phase β1 of the adjusted $1^{st}$ sixth signal does not exist), and when the polarization mode of the fourth signal is vertical linear polarization, an amplitude A2 of the adjusted $2^{nd}$ fifth signal is 0 (a phase α2 of the adjusted $2^{nd}$ fifth signal does not exist), and an amplitude B2 and a phase β2 of the adjusted $2^{nd}$ sixth signal are any values.

When the polarization mode of the third signal is +45° linear polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted $1^{st}$ fifth signal and a phase β1 of the adjusted $1^{st}$ sixth signal is an even multiple of 180°, and when the polarization mode of the fourth signal is −45° linear polarization, a ratio A2/B2 of an amplitude A2 of the adjusted $2^{nd}$ fifth signal to an amplitude B2 of the adjusted $2^{nd}$ sixth signal is 1, and a difference α2−β2 between a phase α2 of the adjusted $2^{nd}$ fifth signal and a phase β2 of the adjusted $2^{nd}$ sixth signal is an odd multiple of 180°.

When the polarization mode of the third signal is −45° linear polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted $1^{st}$ fifth signal and a phase β1 of the adjusted $1^{st}$ sixth signal is an odd multiple of 180°, and when the polarization mode of the fourth signal is +45° linear polarization, a ratio A2/B2 of an amplitude A2 of the adjusted $2^{nd}$ fifth signal to an amplitude B2 of the adjusted $2^{nd}$ sixth signal is 1, and a difference α2−β2 between a phase α2 of the adjusted $2^{nd}$ fifth signal and a phase β2 of the adjusted $2^{nd}$ sixth signal is an even multiple of 180°.

When the polarization mode of the third signal is left-handed circular polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted 1st fifth signal and a phase β1 of the adjusted 1st sixth signal is 90°, and when the polarization mode of the fourth signal is right-handed circular polarization, a ratio A2/B2 of an amplitude A2 of the adjusted 2nd fifth signal to an amplitude B2 of the adjusted 2nd sixth signal is 1, and a difference α2−β2 between a phase α2 of the adjusted 2nd fifth signal and a phase β2 of the adjusted 2nd sixth signal is −90°.

When the polarization mode of the third signal is right-handed circular polarization, a ratio A1/B1 of an amplitude A1 of the adjusted 1st fifth signal to an amplitude B1 of the adjusted 1st sixth signal is 1, and a difference α1−β1 between a phase α1 of the adjusted 1st fifth signal and a phase β1 of the adjusted 1st sixth signal is −90°, and when the polarization mode of the fourth signal is left-handed circular polarization, a ratio A2/B2 of an amplitude A2 of the adjusted 2nd fifth signal to an amplitude B2 of the adjusted 2nd sixth signal is 1, and a difference α2−β2 between a phase α2 of the adjusted 2nd fifth signal and a phase β2 of the adjusted 2nd sixth signal is 90°.

In a possible implementation, the polarization reconfigurable apparatus may include N receiving units, N digital-to-analog conversion units in a one-to-one correspondence with the N receiving units, and N signal adjustment units in a one-to-one correspondence with the N digital-to-analog conversion units, where N is an integer greater than or equal to 2. A phase difference between adjusted 1st fifth signals obtained by any two adjacent signal adjustment units is θ1, and a phase difference between adjusted 1st sixth signals obtained by any two adjacent signal adjustment units is θ1, where θ1 is determined based on a beam direction of the third signal. A phase difference between adjusted 2nd fifth signals obtained by any two adjacent signal adjustment units is θ2, and a phase difference between adjusted 2nd sixth signals obtained by any two adjacent signal adjustment units is θ2, where θ2 is determined based on a beam direction of the fourth signal. In other words, the polarization reconfigurable apparatus may further separately control the beam direction of the third signal and the beam direction of the fourth signal.

In this case, the signal processing unit is further configured to combine N seventh signals obtained by the N signal adjustment units into a ninth signal, combine N eighth signals obtained by the N signal adjustment units into a tenth signal, and process the ninth signal and the tenth signal.

In a possible implementation, the receiving unit includes a dual-polarized antenna, and the dual-polarized antenna includes the first port and the second port, and is configured to receive the first signal by using the first port. When N dual-polarized antennas in the N receiving units form a uniformly spaced linear array, θ1 and θ2 satisfy the following formulas:

$$\theta1 = k1 \times d \times \sin \varphi1$$

$$\theta2 = k2 \times d \times \sin \varphi2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the fourth signal, and φ2 is an included angle between the beam direction of the fourth signal and the normal direction of the linear array.

According to an eleventh aspect, this application further provides a communications device. The communications device includes a transceiver, a memory, and a processor. The memory stores code instructions. The processor is configured to invoke the code instructions stored in the memory to perform the following operations: performing analog-to-digital conversion on an $i^{th}$ first signal to obtain an $i^{th}$ second signal, where the $i^{th}$ first signal is a sum of a component of a third signal in a direction corresponding to a $(2i-1)^{th}$ port and a component of a fourth signal in the direction corresponding to the $(2i-1)^{th}$ port, i=1, ..., N, and N is a positive integer, performing analog-to-digital conversion on an $i^{th}$ fifth signal to obtain an $i^{th}$ sixth signal, where the $i^{th}$ fifth signal is a sum of a component of the third signal in a direction corresponding to a $2i^{th}$ port and a component of the fourth signal in the direction corresponding to the $2i^{th}$ port, determining a polarization mode of the third signal and a polarization mode of the fourth signal, where the polarization mode of the third signal includes linear polarization, circular polarization, and elliptical polarization, and the polarization mode of the fourth signal includes linear polarization, circular polarization, and elliptical polarization, dividing the $i^{th}$ second signal into two signals to obtain 2N second signals, and dividing the $i^{th}$ sixth signal into two signals to obtain 2N sixth signals, adjusting an amplitude and a phase of a $(2j-1)^{th}$ second signal and an amplitude and a phase of a $(2j-1)^{th}$ sixth signal based on the polarization mode of the third signal, and combining an adjusted $(2j-1)^{th}$ second signal and an adjusted $(2j-1)^{th}$ sixth signal into a $j^{th}$ seventh signal, where j=1, 2, ..., N, and adjusting an amplitude and a phase of a $2j^{th}$ second signal and an amplitude and a phase of a $2j^{th}$ sixth signal based on the polarization mode of the fourth signal, and combining an adjusted $2j^{th}$ second signal and an adjusted $2j^{th}$ sixth signal into a $j^{th}$ eighth signal.

With the foregoing solution, the communications device may separately perform polarization reconfiguration based on polarization modes of two received signals in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

In a possible implementation, the $i^{th}$ first signal is received by the communications device by using the $(2i-1)^{th}$ port of the transceiver in the communications device, and the $i^{th}$ fifth signal is received by the communications device by using the $2i^{th}$ port of the transceiver in the communications device. The signal received by the $(2i-1)^{th}$ port is orthogonal to the signal received by the $2i^{th}$ port.

In a possible implementation, in a scenario in which the transceiver includes two ports (N=1), the polarization mode of the third signal is orthogonal to the polarization mode of the fourth signal.

In a possible implementation, the polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Further, when the polarization mode of the third signal is vertical linear polarization, an amplitude A1 of an adjusted $1^{st}$ second signal is 0 (a phase α1 of the adjusted $1^{st}$ second signal does not exist), and an amplitude B1 and a phase β1 of an adjusted $1^{st}$ sixth signal may be any values, and when the polarization mode of the fourth signal is horizontal linear polarization, an amplitude A2 and a phase α2 of an adjusted $2^{nd}$ second signal are any values, and an amplitude B2 of an adjusted $2^{nd}$ sixth signal is 0 (a phase β2 of the adjusted $2^{nd}$ sixth signal does not exist).

When the polarization mode of the third signal is horizontal linear polarization, an amplitude A1 and a phase α1 of an adjusted $1^{st}$ second signal are any values, and an amplitude B1 of an adjusted $1^{st}$ sixth signal is 0 (a phase β1 of the adjusted $1^{st}$ sixth signal does not exist), and when the polarization mode of the fourth signal is vertical linear polarization, an amplitude A2 of an adjusted $2^{nd}$ second signal is 0 (a phase α2 of the adjusted $2^{nd}$ second signal does not exist), and an amplitude B2 and a phase β2 of an adjusted $2^{nd}$ sixth signal are any values.

When the polarization mode of the third signal is +45° linear polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is an even multiple of 180°, and when the polarization mode of the fourth signal is −45° linear polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is an odd multiple of 180°.

When the polarization mode of the third signal is −45° linear polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is an odd multiple of 180°, and when the polarization mode of the fourth signal is +45° linear polarization, a ratio A2/B2 of an amplitude A2 of an adjusted $2^{nd}$ second signal to an amplitude B2 of an adjusted $2^{nd}$ sixth signal is 1, and a difference β2−β2 between a phase α2 of the adjusted $2^{nd}$ second signal and a phase β2 of the adjusted $2^{nd}$ sixth signal is an even multiple of 180°.

When the polarization mode of the third signal is left-handed circular polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is 90°, and when the polarization mode of the fourth signal is right-handed circular polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is −90°.

When the polarization mode of the third signal is right-handed circular polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is −90°, and when the polarization mode of the fourth signal is left-handed circular polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is 90°.

In a possible implementation, when N is greater than 1, a difference between a phase of the adjusted $(2j−1)^{th}$ second signal and a phase of the adjusted $(2j−1)^{th}$ sixth signal is θ1, and a difference between a phase of the adjusted $2j^{th}$ second signal and a phase of the adjusted $2j^{th}$ sixth signal is θ2, where θ1 is determined based on a beam direction of the third signal, and θ2 is determined based on a beam direction of the fourth signal. In other words, the communications device may further control the beam direction of the third signal and the beam direction of the fourth signal.

In this case, the processor is further configured to combine N seventh signals into a ninth signal, combine N eighth signals into a tenth signal, and process the ninth signal and the tenth signal.

In a possible implementation, in a scenario in which the transceiver in the communications device includes N dual-polarized antennas and an $i^{th}$ dual-polarized antenna includes the $(2i−1)^{th}$ port and the $2i^{th}$ port, when the N dual-polarized antennas form a uniformly spaced linear array, θ1 and θ2 satisfy the following formulas:

$$\theta 1 = k1 \times d \times \sin \varphi 1$$

$$\theta 2 = k2 \times d \times \sin \varphi 2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the third signal, and φ2 is an included angle between the beam direction of the fourth signal and the normal direction of the linear array.

According to a twelfth aspect, this application provides a polarization reconfiguration method, applied to a communications device. The communications device includes 2N ports, a signal received by a $(2i−1)^{th}$ port is orthogonal to a signal received by a $2i^{th}$ port, i=1, . . . , N, and N is a positive integer. The method includes the following steps: receiving an $i^{th}$ first signal by using the $(2i−1)^{th}$ port, and receiving an $i^{th}$ second signal by using the $2i^{th}$ port, where the $i^{th}$ first signal is a sum of a component of a third signal in a direction corresponding to the $(2i−1)^{th}$ port and a component of a fourth signal in the direction corresponding to the $(2i−1)^{th}$ port, and the $i^{th}$ second signal is a sum of a component of the third signal in a direction corresponding to the $2i^{th}$ port and a component of the fourth signal in the direction corresponding to the $2i^{th}$ port, performing analog-to-digital conversion on the $i^{th}$ first signal to obtain an $i^{th}$ fifth signal, and performing analog-to-digital conversion on the $i^{th}$ second signal to obtain an $i^{th}$ sixth signal, determining a polarization mode of the third signal and a polarization mode of the fourth signal, where the polarization mode of the third signal includes linear polarization, circular polarization, and elliptical polarization, and the polarization mode of the fourth signal includes linear polarization, circular polarization, and elliptical polarization, dividing the $i^{th}$ fifth signal into two signals to obtain 2N fifth signals, and dividing the $i^{th}$ sixth signal into two signals to obtain 2N sixth signals, adjusting an amplitude and a phase of a $(2j−1)^{th}$ fifth signal and an amplitude and a phase of a $(2j−1)^{th}$ sixth signal based on the polarization mode of the third signal, and combining an adjusted $(2j−1)^{th}$ fifth signal and an adjusted $(2j−1)^{th}$ sixth signal into a $j^{th}$ seventh signal, where j=1, 2, . . . , N, and adjusting an amplitude and a phase of a $2j^{th}$ fifth signal and an amplitude and a phase of a $2j^{th}$ sixth signal based on the polarization mode of the fourth signal, and combining an adjusted $2j^{th}$ fifth signal and an adjusted $2j^{th}$ sixth signal into a $j^{th}$ eighth signal.

With the foregoing solution, the communications device may perform polarization reconfiguration based on a polarization mode of a received signal in digital domain, and polarization reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

In a possible implementation, when N=1, the polarization mode of the third signal is orthogonal to the polarization mode of the fourth signal.

In a possible implementation, the polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Further, when the polarization mode of the third signal is vertical linear polarization, an amplitude A1 of an adjusted $1^{st}$ fifth signal is 0 (a phase α1 of the adjusted $1^{st}$ fifth signal does not exist), and an amplitude B1 and a phase β1 of an adjusted $1^{st}$ sixth signal may be any values, and when the polarization mode of the fourth signal is horizontal linear polarization, an amplitude A2 and a phase α2 of an adjusted $2^{nd}$ fifth signal are any values, and an amplitude B2 of an adjusted $2^{nd}$ sixth signal is 0 (a phase β2 of the adjusted $2^{nd}$ sixth signal does not exist).

When the polarization mode of the third signal is horizontal linear polarization, an amplitude A1 and a phase α1 of an adjusted $1^{st}$ fifth signal are any values, and an amplitude B1 of an adjusted $1^{st}$ sixth signal is 0 (a phase β1 of the adjusted $1^{st}$ sixth signal does not exist), and when the polarization mode of the fourth signal is vertical linear polarization, an amplitude A2 of an adjusted $2^{nd}$ fifth signal is 0 (a phase α2 of the adjusted $2^{nd}$ fifth signal does not exist), and an amplitude B2 and a phase β2 of an adjusted $2^{nd}$ sixth signal are any values.

When the polarization mode of the third signal is +45° linear polarization, a ratio A1/B1 of an amplitude A1 of an adjusted $1^{st}$ fifth signal to an amplitude B1 of an adjusted $1^{st}$ sixth signal is 1, and a difference α1−β1 between a phase α1 of the adjusted $1^{st}$ fifth signal and a phase β1 of the adjusted $1^{st}$ sixth signal is an even multiple of 180°, and when the polarization mode of the fourth signal is −45° linear polarization, a ratio A2/B2 of an amplitude A2 of an adjusted $2^{nd}$ fifth signal to an amplitude B2 of an adjusted $2^{nd}$ sixth signal is 1, and a difference α2−β2 between a phase α2 of the adjusted $2^{nd}$ fifth signal and a phase β2 of the adjusted $2^{nd}$ sixth signal is an odd multiple of 180°.

When the polarization mode of the third signal is −45° linear polarization, a ratio A1/B1 of an amplitude A1 of an adjusted $1^{st}$ fifth signal to an amplitude B1 of an adjusted $1^{st}$ sixth signal is 1, and a difference α1−β1 between a phase α1 of the adjusted $1^{st}$ fifth signal and a phase β1 of the adjusted $1^{st}$ sixth signal is an odd multiple of 180°, and when the polarization mode of the fourth signal is +45° linear polarization, a ratio A2/B2 of an amplitude A2 of an adjusted $2^{nd}$ fifth signal to an amplitude B2 of an adjusted $2^{nd}$ sixth signal is 1, and a difference α2−β2 between a phase α2 of the adjusted $2^{nd}$ fifth signal and a phase β2 of the adjusted $2^{nd}$ sixth signal is an even multiple of 180°.

When the polarization mode of the third signal is left-handed circular polarization, a ratio A1/B1 of an amplitude A1 of an adjusted $1^{st}$ fifth signal to an amplitude B1 of an adjusted $1^{st}$ sixth signal is 1, and a difference α1−β1 between a phase α1 of the adjusted $1^{st}$ fifth signal and a phase β1 of the adjusted $1^{st}$ sixth signal is 90°, and when the polarization mode of the fourth signal is right-handed circular polarization, a ratio A2/B2 of an amplitude A2 of an adjusted $2^{nd}$ fifth signal to an amplitude B2 of an adjusted $2^{nd}$ sixth signal is 1, and a difference α2−β2 between a phase α2 of the adjusted $2^{nd}$ fifth signal and a phase β2 of the adjusted $2^{nd}$ sixth signal is −90°.

When the polarization mode of the third signal is right-handed circular polarization, a ratio A1/B1 of an amplitude A1 of an adjusted $1^{st}$ fifth signal to an amplitude B1 of an adjusted $1^{st}$ sixth signal is 1, and a difference α1−β1 between a phase α1 of the adjusted $1^{st}$ fifth signal and a phase β1 of the adjusted $1^{st}$ sixth signal is −90°, and when the polarization mode of the fourth signal is left-handed circular polarization, a ratio A2/B2 of an amplitude A2 of an adjusted $2^{nd}$ fifth signal to an amplitude B2 of an adjusted $2^{nd}$ sixth signal is 1, and a difference α2−β2 between a phase α2 of the adjusted $2^{nd}$ fifth signal and a phase β2 of the adjusted $2^{nd}$ sixth signal is 90°.

In a possible implementation, when N is greater than 1, a difference between a phase of the adjusted $(2j-1)^{th}$ fifth signal and a phase of the adjusted $(2j-1)^{th}$ sixth signal is θ1, and a difference between a phase of the adjusted $2j^{th}$ fifth signal and a phase of the adjusted $2j^{th}$ sixth signal is θ2, where θ1 is determined based on a beam direction of the third signal, and θ2 is determined based on a beam direction of the fourth signal. In other words, the communications device may further control the beam direction of the third signal and the beam direction of the fourth signal.

In this case, the processor is further configured to combine N seventh signals into a ninth signal, combine N eighth signals into a tenth signal, and process the ninth signal and the tenth signal.

In a possible implementation, in a scenario in which the wireless communications device includes N dual-polarized antennas and an $i^{th}$ dual-polarized antenna includes the $(2i-1)^{th}$ port and the $2i^{th}$ port, when the N dual-polarized antennas form a uniformly spaced linear array, θ1 and θ2 satisfy the following formulas:

$$\theta 1 = k1 \times d \times \sin \varphi 1$$

$$\theta 2 = k2 \times d \times \sin \varphi 2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the third signal, and φ2 is an included angle between the beam direction of the fourth signal and the normal direction of the linear array.

According to a thirteenth aspect, this application further provides a computer storage medium. The storage medium stores a software program. When the software program is read and executed by one or more processors, the method provided in any one of the foregoing implementations of the third aspect may be implemented.

According to a fourteenth aspect, this application further provides a computer storage medium. The storage medium stores a software program. When the software program is read and executed by one or more processors, the method provided in any one of the foregoing implementations of the sixth aspect may be implemented.

According to a fifteenth aspect, this application further provides a computer storage medium. The storage medium stores a software program. When the software program is read and executed by one or more processors, the method provided in any one of the foregoing implementations of the ninth aspect may be implemented.

According to a sixteenth aspect, this application further provides a computer storage medium. The storage medium stores a software program. When the software program is read and executed by one or more processors, the method provided in any one of the foregoing implementations of the twelfth aspect may be implemented.

According to a seventeenth aspect, this application further provides a computer program product including instructions. When the computer program product is run on a computer, the computer is enabled to perform the method provided in any one of the foregoing implementations of the third aspect.

According to an eighteenth aspect, this application further provides a computer program product including instructions. When the computer program product is run on a computer, the computer is enabled to perform the method provided in any one of the foregoing implementations of the sixth aspect.

According to a nineteenth aspect, this application further provides a computer program product including instructions. When the computer program product is run on a computer, the computer is enabled to perform the method provided in any one of the foregoing implementations of the ninth aspect.

According to a twentieth aspect, this application further provides a computer program product including instructions. When the computer program product is run on a computer, the computer is enabled to perform the method provided in any one of the foregoing implementations of the twelfth aspect.

BRIEF DESCRIPTION OF THE DRAWINGS

FIG. 16A to FIG. 16C are a third schematic structural diagram of a third polarization reconfigurable apparatus according to an embodiment of this application;

FIG. 20b-1 to FIG. 20b-4 are a second schematic structural diagram of a communications device according to an embodiment of this application;

FIG. 21b-1 to FIG. 21b-4 are a second schematic structural diagram of another communications device according to an embodiment of this application;

DETAILED DESCRIPTION OF ILLUSTRATIVE EMBODIMENTS

Figure 1:
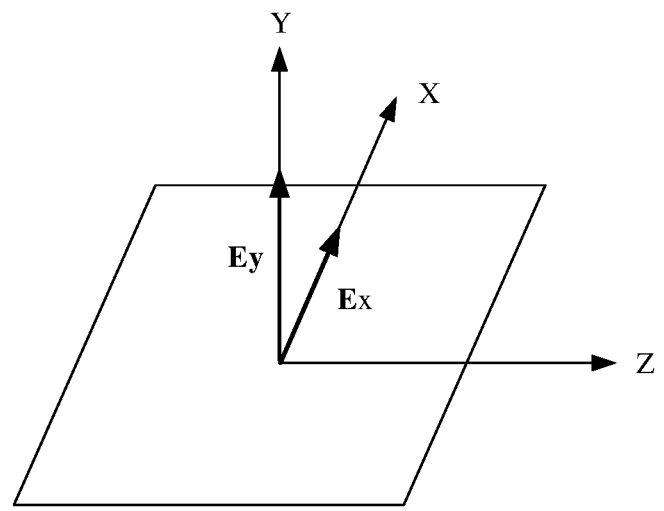
FIG. 1 is a schematic diagram of an electric field strength vector of an electromagnetic wave propagated along a+z axis.
Figure 2A:
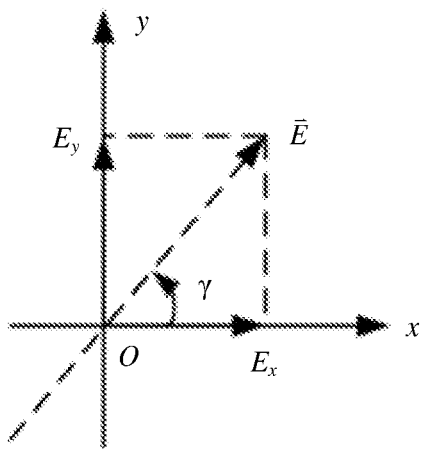
FIG. 2a is a schematic diagram of an electric field strength vector of an electromagnetic wave in linear polarization.
Figure 2B:
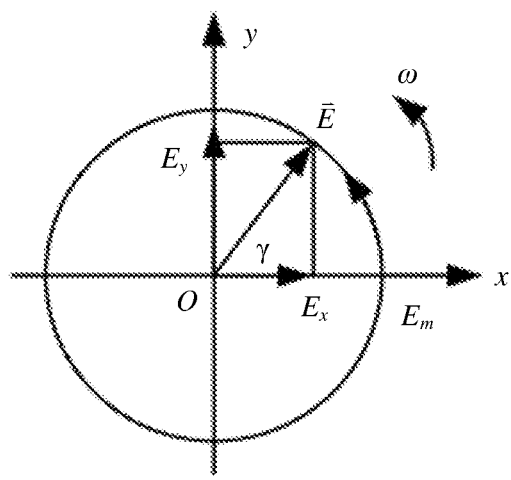
FIG. 2b is a schematic diagram of an electric field strength vector of an electromagnetic wave in circular polarization.
Figure 2C:
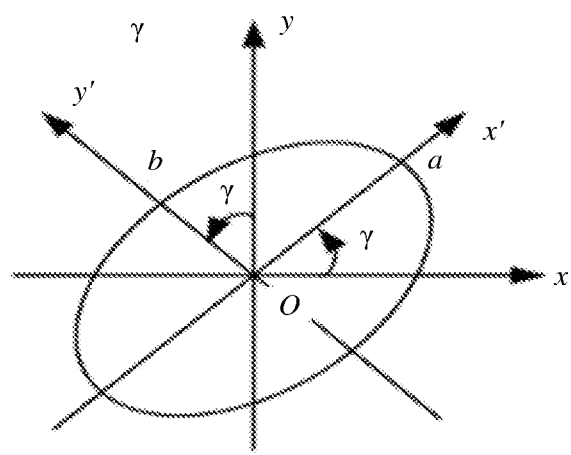
FIG. 2c is a schematic diagram of an electric field strength vector of an electromagnetic wave in elliptical polarization.

As shown in FIG. 1, for a planar electromagnetic wave propagated in a +z direction, both an electric field strength vector and a magnetic field strength vector are located on a plane on which z is a constant. The electric field strength vector includes two components: $E_x$ and $E_y$. Both components are complex numbers in frequency domain. Instantaneous values of $E_x$ and $E_y$ in time domain are shown in the following formula:

$$\begin{cases} E_x = E_{xm}\cos(\omega t - kz + \varphi_x) \\ E_y = E_{ym}\cos(\omega t - kz + \varphi_y) \end{cases}$$

where $E_{xm}$ is an amplitude of $E_x$, $\omega$ is a frequency of the electromagnetic wave, k is a wave number, $\varphi_x$ is a phase of $E_x$, $E_{ym}$ is an amplitude of $E_y$, and $\varphi_y$ is a phase of $E_y$. Based on a relative relationship between the amplitudes and the phases of $E_x$ and $E_y$, polarization of the electromagnetic wave presents different characteristics. As shown in FIG. 2a, when a phase difference between $E_x$ and $E_y$ is an integer multiple of π, the electromagnetic wave is linearly polarized. As shown in FIG. 2b, when a phase difference between $E_x$ and $E_y$ is 90° and the amplitudes are the same, the electromagnetic wave is circularly polarized. As shown in FIG. 2c, when a phase relationship between $E_x$ and $E_y$ is in other cases, the electromagnetic wave is elliptically polarized.

Figure 3:
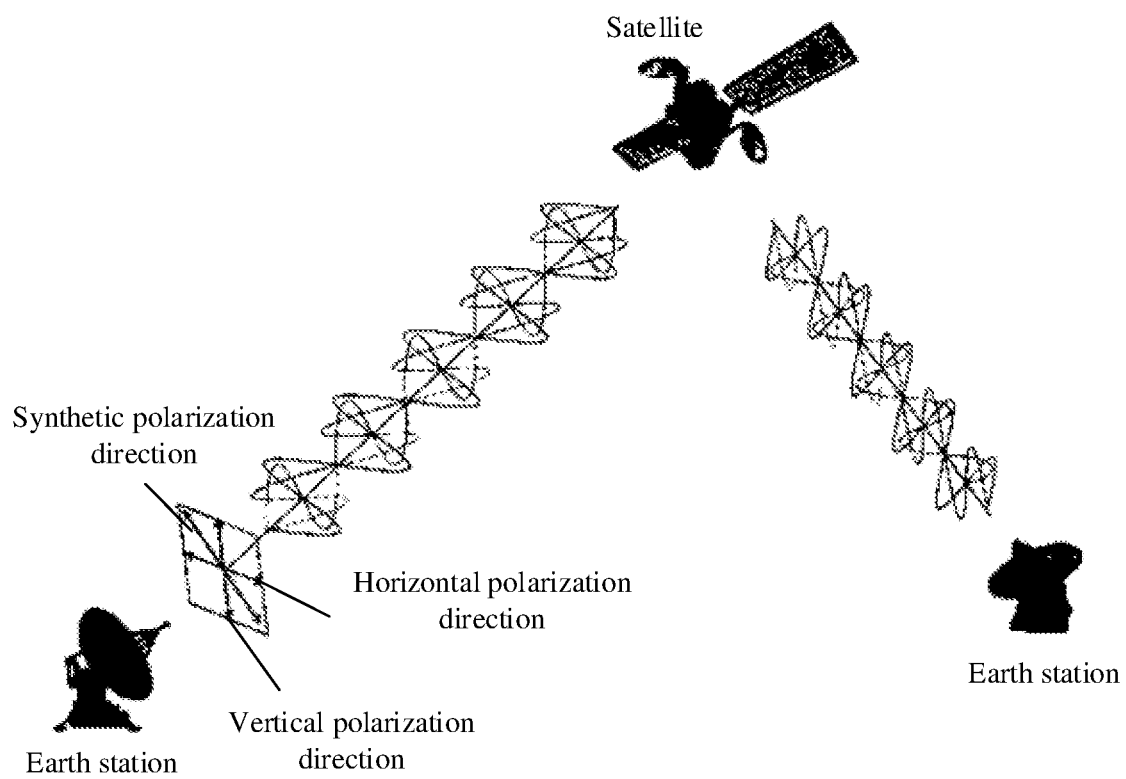
FIG. 3 is a schematic structural diagram of a satellite communications system.
Figure 4:
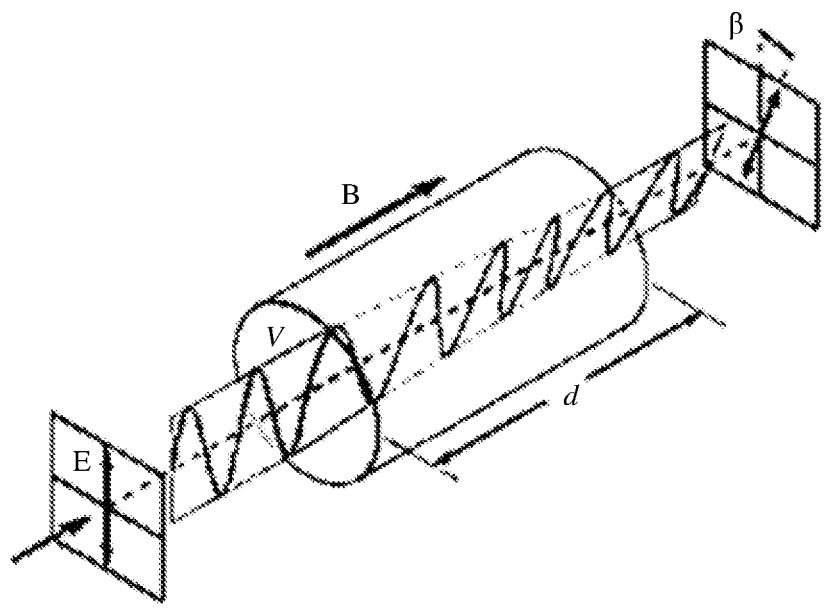
FIG. 4 is a schematic diagram of Faraday rotation.

As shown in FIG. 3, to improve electromagnetic wave transmission efficiency and increase a system throughput, a polarized electromagnetic wave is usually used for communication between a satellite and an earth station in a satellite communications system. The satellite serves as a relay station to forward radio waves, to implement communication between two or more earth stations. During satellite-to-earth communication, when an electromagnetic wave signal (a microwave signal) is propagated between a satellite and the earth, the electromagnetic wave signal needs to pass through the atmosphere. A depolarization effect of the ionosphere in the atmosphere, rain, snow, and the like causes deflection of a polarization plane of a polarized electromagnetic wave. The depolarization effect mainly includes depolarization caused by Faraday rotation, rain, and snow. The Faraday rotation means that, when a linearly polarized electromagnetic wave passes through the ionosphere, the electromagnetic wave interacts with charged ions in the ionosphere due to existence of the geomagnetic field, thereby causing deflection of a polarization plane, as shown in FIG. 4. Generally, Faraday rotation of a linearly polarized electromagnetic wave below 10 GHz is relatively significant. Under a same condition, deflection of a polarization plane of an electromagnetic wave at a lower frequency is severer.

Figure 5:
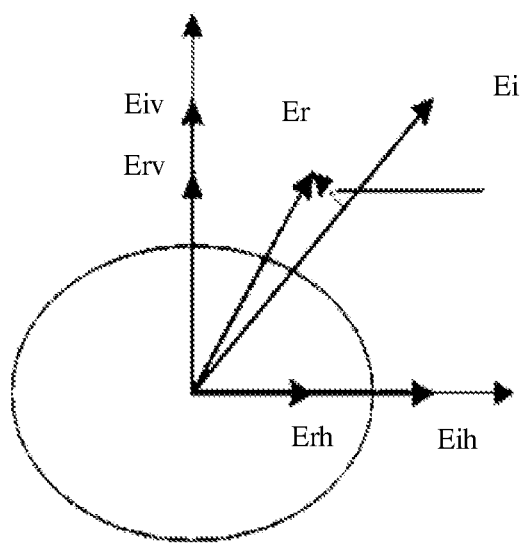
FIG. 5 is a schematic diagram of a depolarization effect of a raindrop.

In addition to the Faraday rotation in the ionosphere, raindrops and snow in the atmosphere also cause rotation of a polarization plane. Using a raindrop as an example, the raindrop is usually ellipsoidal but not ideally spherical due to an influence of gravity and/or wind. The ellipsoidal raindrop produces greater attenuation to an electric field in a major-axis direction, and produces smaller attenuation to an electric field in a minor-axis direction. After an electromagnetic wave passes through the raindrop, a polarization plane is deflected because relative magnitudes of two components of an electric field change. As shown in FIG. 5, an electric field of an electromagnetic wave incident to the raindrop is Ei, which is obtained by combining two components: Eiv and Eih. Because the raindrop causes greater attenuation to Eih and smaller attenuation to Eiv, an electric field Er obtained after the electromagnetic wave passes through the raindrop is deflected by a specific angle relative to Ei toward the minor-axis direction of the raindrop.

The depolarization effect causes a polarization mismatch between a transmit end and a receive end, thereby reducing a signal-to-noise ratio of a received signal and reducing reception efficiency. To resolve this problem, this application provides a polarization reconfigurable apparatus, a communications device, and a polarization reconfiguration method. The method and the apparatus in the embodiments of this application are based on a same concept. Because problem-resolving principles of the method and the apparatus are similar, mutual reference may be made to implementations of the apparatus and the method, and repeated content is not described in detail. The polarization reconfigurable apparatus and the method provided in the embodiments of this application may be used for a device that performs communication by using a polarized electromagnetic wave, for example, the satellite and the earth station in the satellite communications system shown in FIG. 3, or a base station and a terminal device in a wireless communications system.

Figure 6:
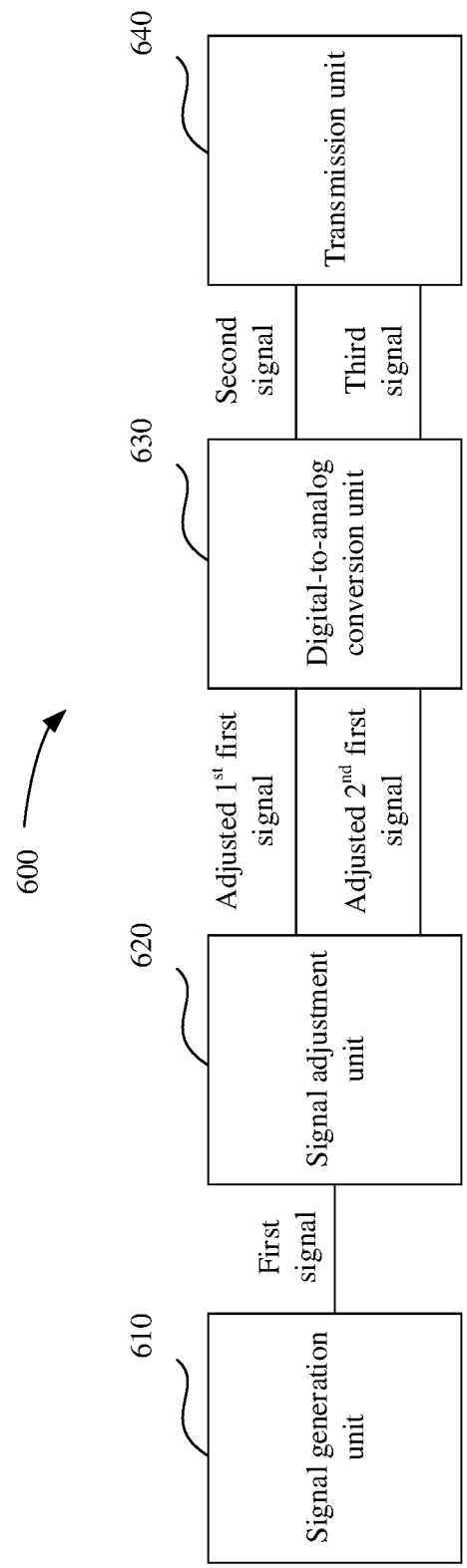
FIG. 6 is a first schematic structural diagram of a first polarization reconfigurable apparatus according to an embodiment of this application.

As shown in FIG. 6, this application provides a first polarization reconfigurable apparatus 600. The polarization reconfigurable apparatus 600 is used for a transmit-end device, and includes a signal generation unit 610, a signal adjustment unit 620, a digital-to-analog conversion unit 630, and a transmission unit 640 that are sequentially connected. The transmission unit 640 includes a first port and a second port. A signal transmitted by the first port is orthogonal to a signal transmitted by the second port.

The following specifically describes the foregoing components of the polarization reconfigurable apparatus 600 with reference to FIG. 6.

The signal generation unit 610 is configured to generate a first signal.

The signal adjustment unit 620 is configured to: determine a polarization mode of a to-be-transmitted signal, where the polarization mode includes linear polarization, circular polarization, and elliptical polarization, divide the first signal into two first signals, and adjust an amplitude and a phase of a $1^{st}$ first signal and an amplitude and a phase of a $2^{nd}$ first signal based on the determined polarization mode.

The digital-to-analog conversion unit 630 is configured to perform digital-to-analog conversion on an adjusted $1^{st}$ first signal to obtain a second signal, and perform digital-to-analog conversion on an adjusted $2^{nd}$ first signal to obtain a third signal. Specifically, the digital-to-analog conversion unit 630 may be implemented by two digital-to-analog converters (DAC).

The transmission unit 640 is configured to transmit the second signal by using the first port, and transmit the third signal by using the second port. The to-be-transmitted signal is obtained by combining the second signal and the third signal. To be specific, the second signal is a component of the to-be-transmitted signal in a direction corresponding to the first port, and the third signal is a component of the to-be-transmitted signal in a direction corresponding to the second port. For example, when the direction corresponding to the first port is a direction of an x-axis shown in FIG. 1 and the direction corresponding to the second port is a direction of a y-axis shown in FIG. 1, the second signal is a component of the to-be-transmitted signal in the x-axis direction, and the third signal is a component of the to-be-transmitted signal in the y-axis direction.

Figure 7:
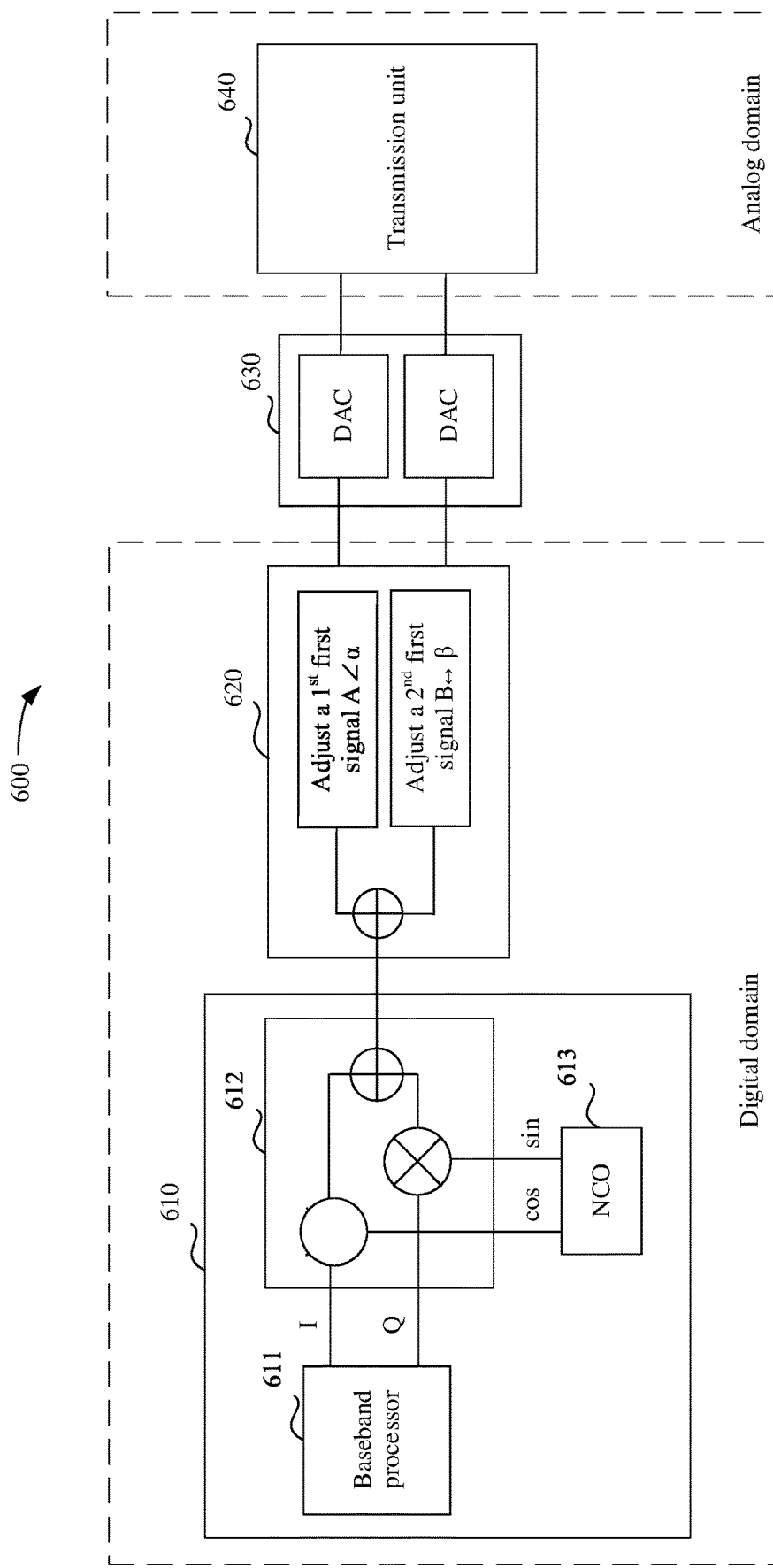
FIG. 7 is a second schematic structural diagram of a first polarization reconfigurable apparatus according to an embodiment of this application.

The first signal generated by the signal generation unit 610 may be a baseband signal or a digital intermediate-frequency signal. As shown in FIG. 7, when the first signal is a digital intermediate-frequency signal, the signal generation unit 610 may specifically include a baseband processor 611, a digital frequency mixer 612, and a numerically controlled oscillator (NCO) 613. The baseband processor 611 is configured to generate an I-channel baseband signal (that is, an in-phase component of a baseband signal) and a Q-channel baseband signal (that is, a quadrature component of the baseband signal). The digital frequency mixer 612 is configured to separately perform digital up-conversion on the I-channel baseband signal and the Q-channel baseband signal by using a signal generated by the numerically controlled oscillator 613, and combine an up-converted I-channel baseband signal and an up-converted Q-channel baseband signal to obtain the digital intermediate-frequency signal. When the first signal is a baseband signal, the signal generation unit 610 may be a baseband processor.

The signal adjustment unit 620 may specifically determine the polarization mode of the to-be-transmitted signal based on preconfigured information about the polarization mode of the to-be-transmitted signal, or obtain the polarization mode of the to-be-transmitted signal by measuring a signal transmitted by a receive end. During specific implementation, when the polarization mode of the to-be-transmitted signal is linear polarization at an angle of $\gamma_1$ ($\gamma_1 \in (-90°, 90°)$, and $\gamma_1 \neq 0°$), a ratio of an amplitude A of the adjusted $1^{st}$ first signal to an amplitude B of the adjusted $2^{nd}$ first signal is $|\tan \gamma_1|$. When $\gamma_1 > 0$, a difference between a phase $\alpha$ of the adjusted $1^{st}$ first signal and a phase $\beta$ of the adjusted $2^{nd}$ first signal is an even multiple of 180°, or when $\gamma_1 < 0$, a difference between a phase $\alpha$ of the adjusted $1^{st}$ first signal and a phase $\beta$ of the adjusted $2^{nd}$ first signal is an odd multiple of 180°. $\gamma_1$ is an included angle between an electric field direction of the to-be-transmitted signal and a horizontal direction on a plane perpendicular to a propagation direction of the to-be-transmitted signal. For example, as shown in FIG. 1, when the to-be-transmitted signal (an electromagnetic wave signal) is propagated in the +z-axis direction, $\gamma_1$ is an included angle between an electric field of the to-be-transmitted signal and the x-axis on an xoy plane.

For example, when the polarization mode of the to-be-transmitted signal is +45° linear polarization, the ratio of the amplitude A of the adjusted $1^{st}$ first signal to the amplitude B of the adjusted $2^{nd}$ first signal is 1, and the difference between the phase $\alpha$ of the adjusted $1^{st}$ first signal and the phase $\beta$ of the adjusted $2^{nd}$ first signal is an even multiple of 180°, or when the polarization mode of the to-be-transmitted signal is −45° linear polarization, the ratio of the amplitude A of the adjusted $1^{st}$ first signal to the amplitude B of the adjusted $2^{nd}$ first signal is 1, and the difference between the phase $\alpha$ of the adjusted $1^{st}$ first signal and the phase $\beta$ of the adjusted $2^{nd}$ first signal is an odd multiple of 180°.

When the polarization mode of the to-be-transmitted signal is circular polarization, a ratio of an amplitude A of the adjusted $1^{st}$ first signal to an amplitude B of the adjusted $2^{nd}$ first signal is 1, and a difference between a phase $\alpha$ of the adjusted $1^{st}$ first signal and a phase $\beta$ of the adjusted $2^{nd}$ first signal is an odd multiple of 90°.

When the polarization mode of the to-be-transmitted signal is elliptical polarization, a ratio A/B of an amplitude A of the adjusted $1^{st}$ first signal to an amplitude B of the adjusted $2^{nd}$ first signal, and a difference $\alpha-\beta$ between a phase $\alpha$ of the adjusted $1^{st}$ first signal and a phase $\beta$ of the adjusted $2^{nd}$ first signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

When the polarization mode of the to-be-transmitted signal is elliptical polarization shown in FIG. 2c, the ratio A/B of the amplitude A of the adjusted $1^{st}$ first signal to the amplitude B of the adjusted $2^{nd}$ first signal, and $\alpha-\beta$ between the phase $\alpha$ of the adjusted $1^{st}$ first signal and the phase $\beta$ of the adjusted $2^{nd}$ first signal satisfy the following formulas:

$$\tan 2\gamma_2 = \frac{2\left(\frac{A}{B}\right)\cos(\alpha-\beta)}{\left(\frac{A}{B}\right)^2 - 1}$$

$$AR = \sqrt{\frac{\left(\frac{A}{B}\right)^2 (\cos\gamma_2)^2 + \frac{A}{B}\sin 2\gamma_2 \cos(\alpha-\beta) + (\sin\gamma_2)^2}{\left(\frac{A}{B}\right)^2 (\sin\gamma_2)^2 - \frac{A}{B}\sin 2\gamma_2 \cos(\alpha-\beta) + (\cos\gamma_2)^2}}$$

Figure 8:
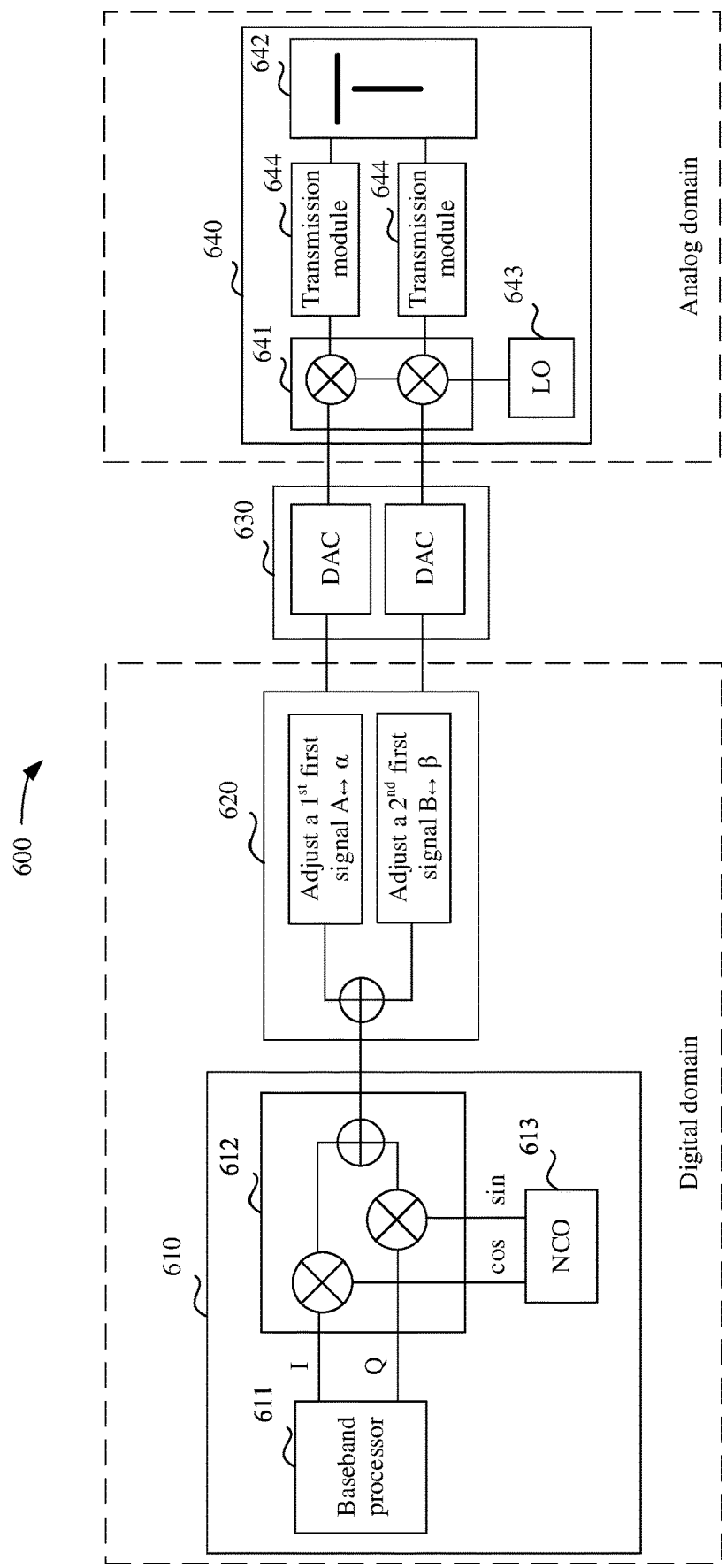
FIG. 8 is a third schematic structural diagram of a first polarization reconfigurable apparatus according to an embodiment of this application.

The transmission unit 640 may transmit the second signal and the third signal by using a dual-polarized antenna, or transmit the second signal and the third signal by using a dual-polarized antenna including two single-polarized antennas whose polarization directions are orthogonal. Optionally, as shown in FIG. 8, the transmission unit 640 may specifically include an analog frequency mixer 641, a dual-polarized antenna 642, and a local oscillator (LO) 643. The analog frequency mixer 641 is configured to separately perform analog up-conversion on the second signal and the third signal by using a local-frequency signal generated by the LO 643. The dual-polarized antenna 642 is configured to transmit an up-converted second signal and an up-converted third signal by using a first port and a second port of the dual-polarized antenna respectively. In addition, the transmission unit 640 may further include a transmission module (transmit module, T module) 644, mainly configured to perform power amplification on the up-converted second signal and the up-converted third signal.

Figure 9A:
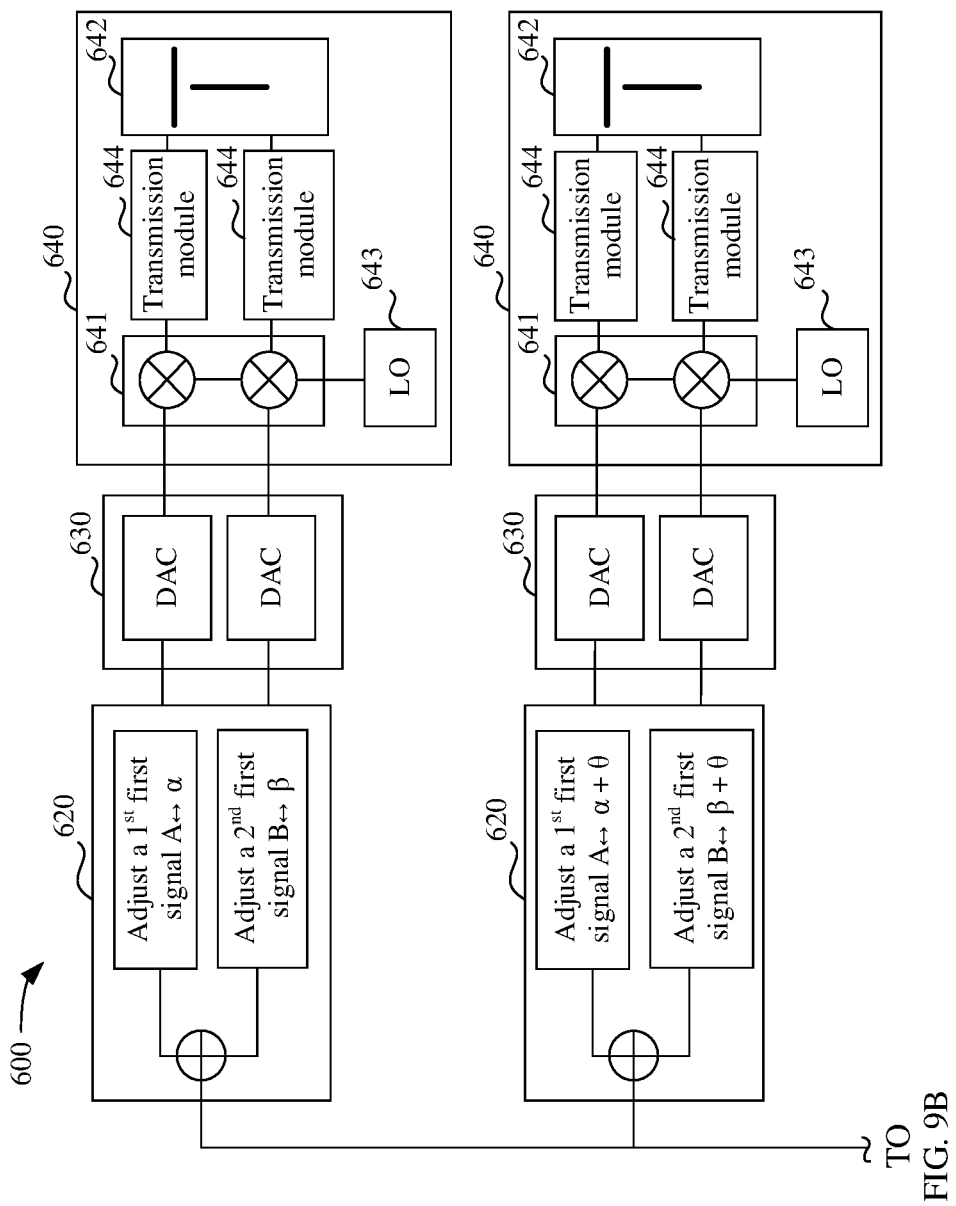
FIG. 9A to FIG. 9C are a fourth schematic structural diagram of a first polarization reconfigurable apparatus according to an embodiment of this application.
Figure 9B:
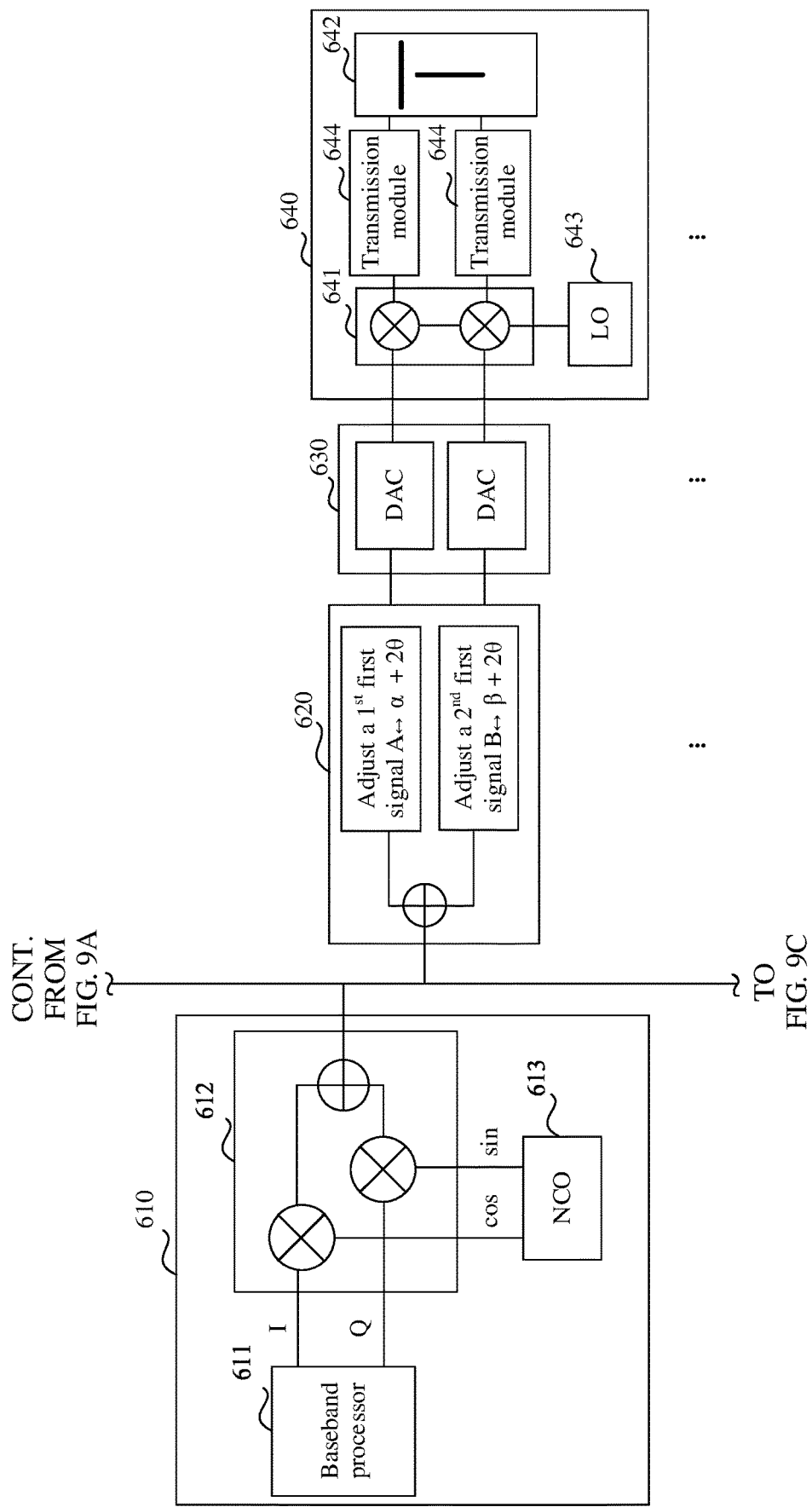
Figure 9C:
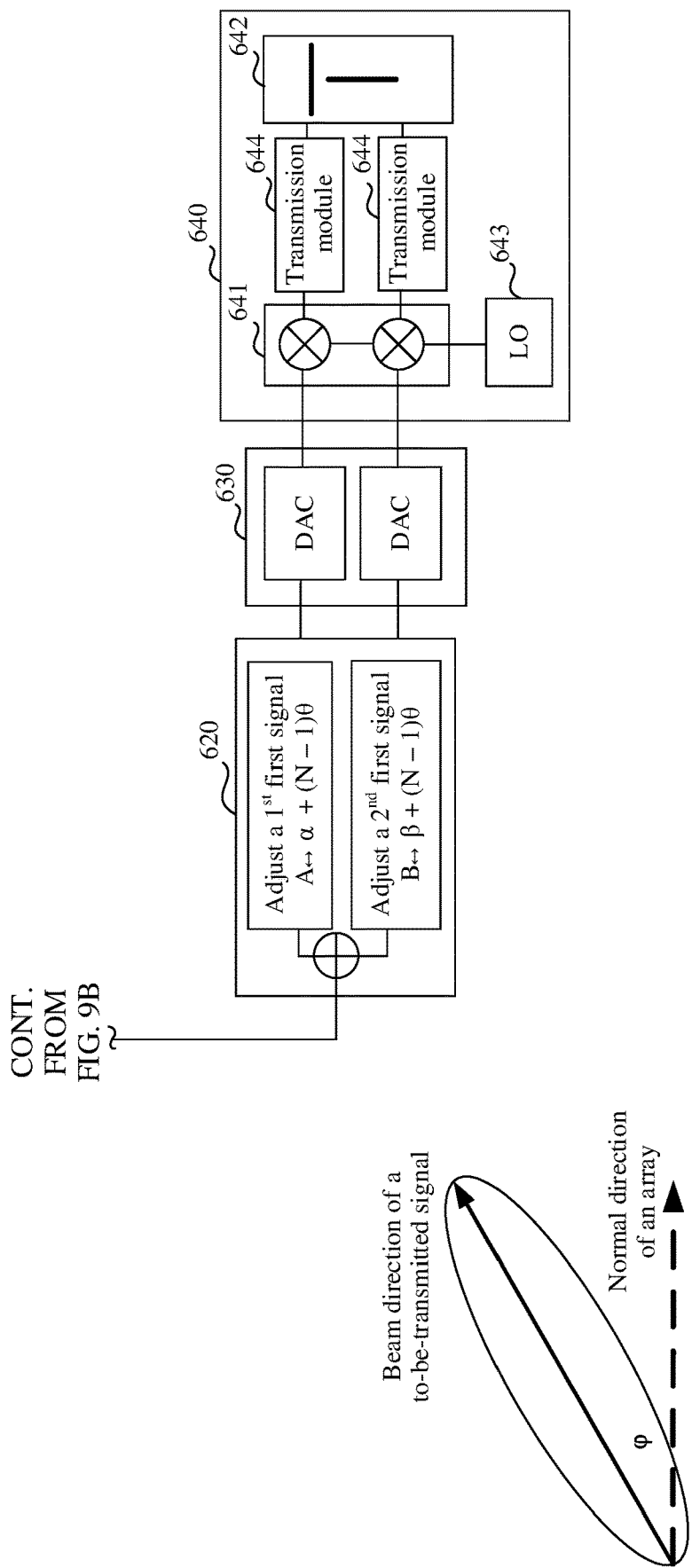

Further, as shown in FIG. 9A to FIG. 9C, the polarization reconfigurable apparatus 600 may include N transmission units 640, N digital-to-analog conversion units 630 in a one-to-one correspondence with the N transmission units 640, and N signal adjustment units 620 in a one-to-one correspondence with the N digital-to-analog conversion units 630, where N is an integer greater than or equal to 2. In this case, a phase difference between adjusted $1^{st}$ first signals obtained by any two adjacent signal adjustment units 620 is θ, and a phase difference between adjusted $2^{nd}$ first signals obtained by any two adjacent signal adjustment units 620 is θ, where θ is determined based on a beam direction of the to-be-transmitted signal. In this case, the polarization reconfigurable apparatus 600 may further control the beam direction of the to-be-transmitted signal.

In addition, to satisfy a specific beamforming requirement, an amplitude ratio between adjusted $1^{st}$ first signals obtained by any two adjacent signal adjustment units 620 and an amplitude ratio between adjusted $2^{nd}$ first signals obtained by any two adjacent signal adjustment units 620 are determined based on the beam direction of the to-be-transmitted signal.

In a scenario in which the transmission unit includes a dual-polarized antenna and the dual-polarized antenna includes the first port and the second port, when N dual-polarized antennas in the N transmission units 640 form a uniformly spaced linear array, θ satisfies the following formula:

$$\theta = k \times d \times \sin \varphi$$

where k is a wave number of a carrier used to carry the to-be-transmitted signal, d is a distance between two adjacent dual-polarized antennas, and φ is an included angle between the beam direction of the to-be-transmitted signal and a normal direction of the linear array (as shown in FIG. 9C).

With the foregoing solution, the polarization reconfigurable apparatus 600 may perform polarization reconfiguration based on the polarization mode of the to-be-transmitted signal in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

Figure 10:
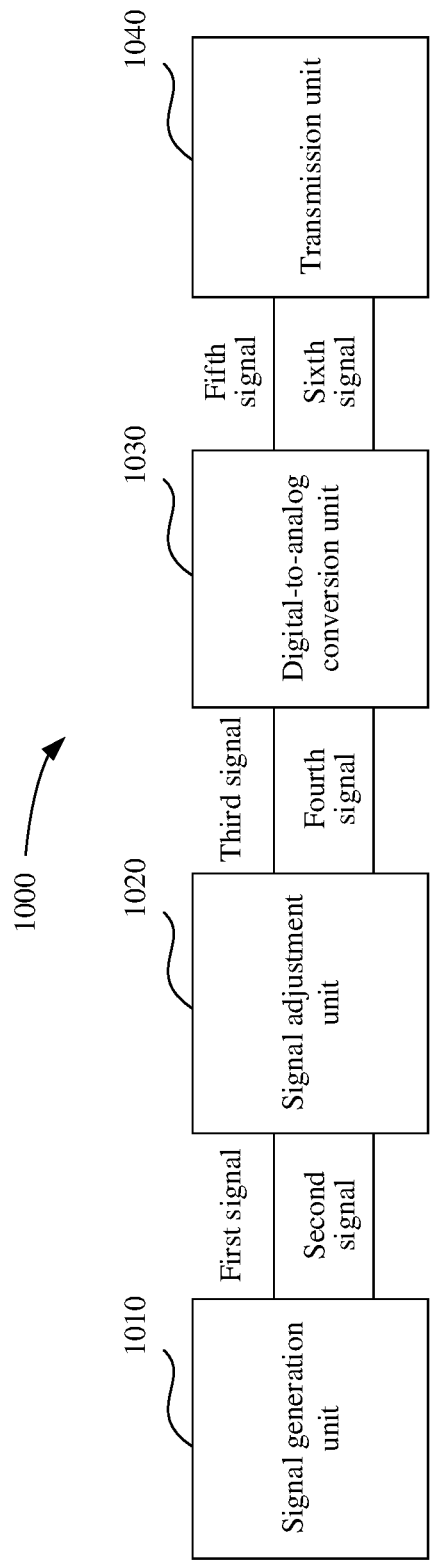
FIG. 10 is a first schematic structural diagram of a second polarization reconfigurable apparatus according to an embodiment of this application.

As shown in FIG. 10, this application provides a second polarization reconfigurable apparatus 1000, including a signal generation unit 1010, a signal adjustment unit 1020, a digital-to-analog conversion unit 1030, and a transmission unit 1040 that are sequentially connected. The transmission unit 1040 includes a first port and a second port. A signal received by the first port is orthogonal to a signal received by the second port.

The following specifically describes the foregoing components of the polarization reconfigurable apparatus 1000 with reference to FIG. 10.

The signal generation unit 1010 is configured to generate a first signal and a second signal.

The signal adjustment unit 1020 is configured to: determine a polarization mode of each of two to-be-transmitted signals, where a polarization mode of a $1^{st}$ to-be-transmitted signal includes linear polarization, circular polarization, and elliptical polarization, and a polarization mode of a $2^{nd}$ to-be-transmitted signal includes linear polarization, circular polarization, and elliptical polarization, divide the first signal into two first signals, and divide the second signal into two second signals, separately adjust an amplitude and a phase of a $1^{st}$ first signal and an amplitude and a phase of a $2^{nd}$ first signal based on the polarization mode of the $1^{st}$ to-be-transmitted signal, separately adjust an amplitude and a phase of a $1^{st}$ second signal and an amplitude and a phase of a $2^{nd}$ second signal based on the polarization mode of the $2^{nd}$ to-be-transmitted signal, and combine an adjusted $1^{st}$ first signal and an adjusted $1^{st}$ second signal into a third signal, and combine an adjusted $2^{nd}$ first signal and an adjusted $2^{nd}$ second signal into a fourth signal.

The digital-to-analog conversion unit 1030 is configured to perform digital-to-analog conversion on the third signal to obtain a fifth signal, and perform digital-to-analog conversion on the fourth signal to obtain a sixth signal.

The transmission unit 1040 is configured to transmit the fifth signal by using the first port, and transmit the sixth signal by using the second port. The fifth signal is a component of the $1^{st}$ to-be-transmitted signal and the $2^{nd}$ to-be-transmitted signal in a direction corresponding to the first port. The sixth signal is a component of the $1^{st}$ to-be-transmitted signal and the $2^{nd}$ to-be-transmitted signal in a direction corresponding to the second port.

Figure 11:
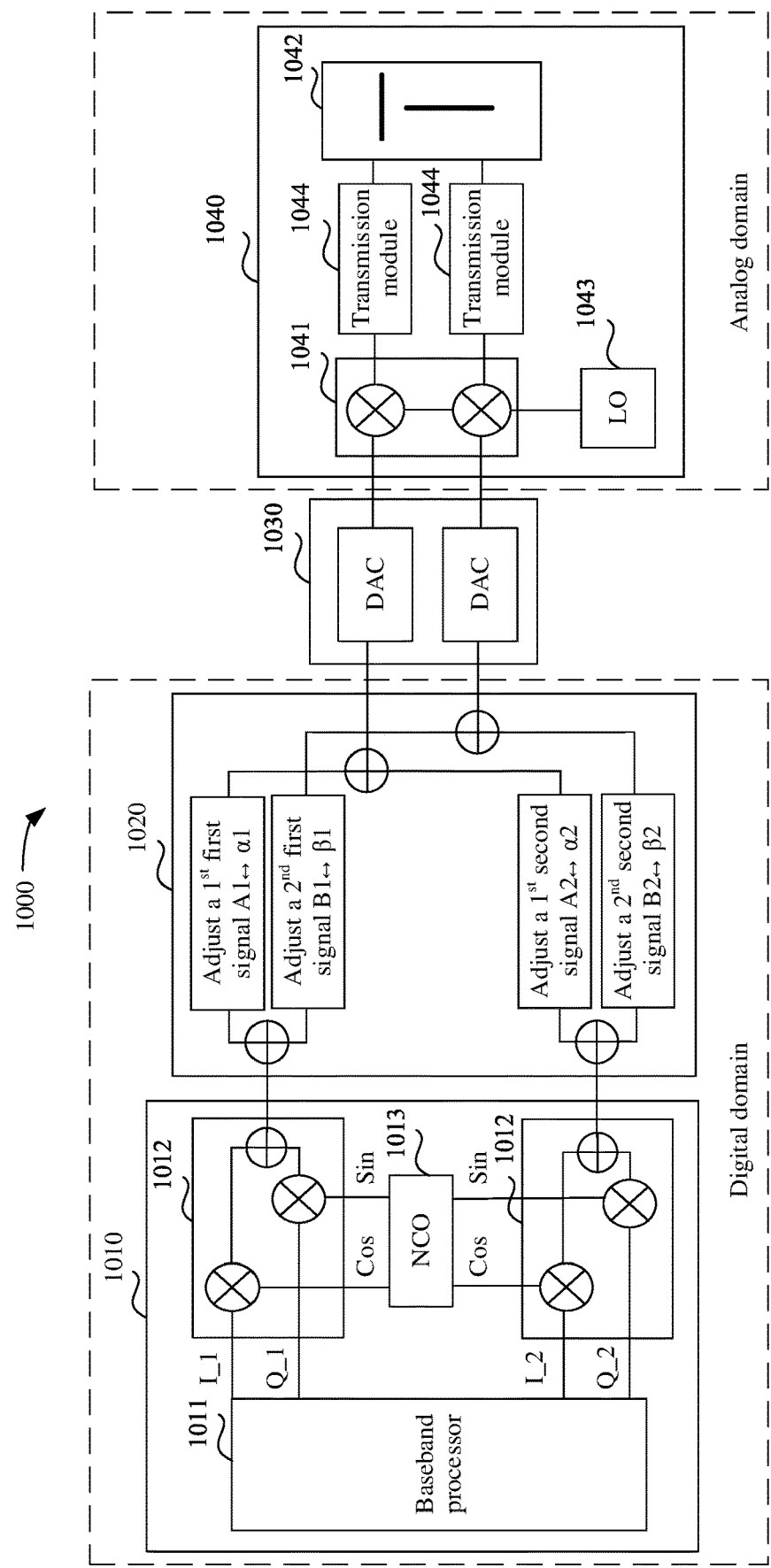
FIG. 11 is a second schematic structural diagram of a second polarization reconfigurable apparatus according to an embodiment of this application.

The first signal and the second signal generated by the signal generation unit 1010 may be baseband signals or digital intermediate-frequency signals. As shown in FIG. 11, when the first signal and the second signal are digital intermediate-frequency signals, the signal generation unit 1010 may specifically include a baseband processor 1011, two digital frequency mixers 1012, and an NCO 1013. The baseband processor 1011 is configured to generate a first I-channel baseband signal I_1, a first Q-channel baseband signal Q_1, a second I-channel baseband signal I_2, and a second Q-channel baseband signal Q_2. One of the digital frequency mixers 1012 is configured to separately perform digital up-conversion on the first I-channel baseband signal I_1 and the first Q-channel baseband signal Q_1 by using a signal generated by the numerically controlled oscillator 1013, and combine an up-converted first I-channel baseband signal I_1 and an up-converted first Q-channel baseband signal Q_1 to obtain the first signal. The other digital frequency mixer 1012 is configured to separately perform digital up-conversion on the second I-channel baseband signal I_2 and the second Q-channel baseband signal Q_2 by using the signal generated by the numerically controlled oscillator 1013, and combine an up-converted second I-channel baseband signal I_2 and an up-converted second Q-channel baseband signal Q_2 to obtain the second signal. When the first signal and the second signal are baseband signals, the signal generation unit 1010 may be a baseband processor.

It should be noted that, that the two digital frequency mixers 1012 in the signal generation unit 1010 shown in FIG. 11 share one NCO 1013 is only a possible implementation of the signal generation unit 1010, and does not constitute a limitation on this application. The signal generation unit 1010 may alternatively include two NCOs 1013 in a one-to-one correspondence with the two digital frequency mixers 1012.

The signal adjustment unit 1020 may specifically determine the polarization mode of the $1^{st}$ to-be-transmitted signal and the polarization mode of the $2^{nd}$ to-be-transmitted signal based on preconfigured information about the polarization mode of the two to-be-transmitted signals, or obtain the polarization mode of the $1^{st}$ to-be-transmitted signal and the polarization mode of the $2^{nd}$ to-be-transmitted signal by measuring a signal transmitted by a receive end.

During specific implementation, the transmission unit 1040 may transmit the fifth signal and the sixth signal by using a dual-polarized antenna, or transmit the fifth signal and the sixth signal by using a dual-polarized antenna including two single-polarized antennas whose polarization directions are orthogonal. Optionally, as shown in FIG. 11, the transmission unit 1040 may specifically include an analog frequency mixer 1041, a dual-polarized antenna

1042, and an LO 1043. The analog frequency mixer 1041 is configured to separately perform analog up-conversion on the fifth signal and the sixth signal by using a local-frequency signal generated by the LO 1043. The dual-polarized antenna 1042 is configured to transmit an up-converted fifth signal and an up-converted sixth signal by using a first port and a second port of the dual-polarized antenna respectively. In addition, the transmission unit 1040 may further include a transmission module (T module) 1044, mainly configured to perform power amplification on the up-converted fifth signal and the up-converted sixth signal.

In a scenario in which the polarization reconfigurable apparatus includes one transmission unit 1040, the polarization mode of the $1^{st}$ to-be-transmitted signal is orthogonal to the polarization mode of the $2^{nd}$ to-be-transmitted signal. The polarization mode of the $1^{st}$ to-be-transmitted signal is vertical linear polarization, and the polarization mode of the $2^{nd}$ to-be-transmitted signal is horizontal linear polarization, or the polarization mode of the $1^{st}$ to-be-transmitted signal is horizontal linear polarization, and the polarization mode of the $2^{nd}$ to-be-transmitted signal is vertical linear polarization, or the polarization mode of the $1^{st}$ to-be-transmitted signal is +45° linear polarization, and the polarization mode of the $2^{nd}$ to-be-transmitted signal is −45° linear polarization, or the polarization mode of the $1^{st}$ to-be-transmitted signal is −45° linear polarization, and the polarization mode of the $2^{nd}$ to-be-transmitted signal is +45° linear polarization, or the polarization mode of the $1^{st}$ to-be-transmitted signal is left-handed circular polarization, and the polarization mode of the $2^{nd}$ to-be-transmitted signal is right-handed circular polarization, or the polarization mode of the $1^{st}$ to-be-transmitted signal is right-handed circular polarization, and the polarization mode of the $2^{nd}$ to-be-transmitted signal is left-handed circular polarization.

Specifically, when the polarization mode of the $1^{st}$ to-be-transmitted signal is vertical linear polarization, an amplitude A1 of the adjusted $1^{st}$ first signal is 0 (a phase α1 of the adjusted $1^{st}$ first signal does not exist), and an amplitude B1 and a phase β1 of the adjusted $2^{nd}$ first signal may be any values, and when the polarization mode of the $2^{nd}$ to-be-transmitted signal is horizontal linear polarization, an amplitude A2 and a phase α2 of the adjusted $1^{st}$ second signal are any values, and an amplitude B2 of the adjusted $2^{nd}$ second signal is 0 (a phase β2 of the adjusted $2^{nd}$ second signal does not exist).

When the polarization mode of the $1^{st}$ to-be-transmitted signal is horizontal linear polarization, an amplitude A1 and a phase α1 of the adjusted $1^{st}$ first signal are any values, and an amplitude B1 of the adjusted $2^{nd}$ first signal is 0 (a phase β1 of the adjusted $2^{nd}$ first signal does not exist), and when the polarization mode of the $2^{nd}$ to-be-transmitted signal is vertical linear polarization, an amplitude A2 of the adjusted $1^{st}$ second signal is 0 (a phase α2 of the adjusted $1^{st}$ second signal does not exist), and an amplitude B2 and a phase β2 of the adjusted $2^{nd}$ second signal are any values.

When the polarization mode of the $1^{st}$ to-be-transmitted signal is +45° linear polarization, a ratio A1/B1 of an amplitude A1 of the adjusted $1^{st}$ first signal to an amplitude B1 of the adjusted $2^{nd}$ first signal is 1, and a difference α1−β1 between a phase α1 of the adjusted $1^{st}$ first signal and a phase β1 of the adjusted $2^{nd}$ first signal is an even multiple of 180°, and when the polarization mode of the $2^{nd}$ to-be-transmitted signal is −45° linear polarization, a ratio A2/B2 of an amplitude A2 of the adjusted $1^{st}$ second signal to an amplitude B2 of the adjusted $2^{nd}$ second signal is 1, and a difference α2−β2 between a phase α2 of the adjusted $1^{st}$ second signal and a phase β2 of the adjusted $2^{nd}$ second signal is an odd multiple of 180°.

When the polarization mode of the $1^{st}$ to-be-transmitted signal is −45° linear polarization, a ratio A1/B1 of an amplitude A1 of the adjusted $1^{st}$ first signal to an amplitude B1 of the adjusted $2^{nd}$ first signal is 1, and a difference α1−β1 between a phase α1 of the adjusted $1^{st}$ first signal and a phase β1 of the adjusted $2^{nd}$ first signal is an odd multiple of 180°, and when the polarization mode of the $2^{nd}$ to-be-transmitted signal is +45° linear polarization, a ratio A2/B2 of an amplitude A2 of the adjusted $1^{st}$ second signal to an amplitude B2 of the adjusted $2^{nd}$ second signal is 1, and a difference α2−β2 between a phase α2 of the adjusted $1^{st}$ second signal and a phase β2 of the adjusted $2^{nd}$ second signal is an even multiple of 180°.

When the polarization mode of the $1^{st}$ to-be-transmitted signal is left-handed circular polarization, a ratio A1/B1 of an amplitude A1 of the adjusted $1^{st}$ first signal to an amplitude B1 of the adjusted $2^{nd}$ first signal is 1, and a difference α1−β1 between a phase α1 of the adjusted $1^{st}$ first signal and a phase β1 of the adjusted $2^{nd}$ first signal is 90°, and when the polarization mode of the $2^{nd}$ to-be-transmitted signal is right-handed circular polarization, a ratio A2/B2 of an amplitude A2 of the adjusted $1^{st}$ second signal to an amplitude B2 of the adjusted $2^{nd}$ second signal is 1, and a difference α2−β2 between a phase α2 of the adjusted $1^{st}$ second signal and a phase β2 of the adjusted $2^{nd}$ second signal is −90°.

When the polarization mode of the $1^{st}$ to-be-transmitted signal is right-handed circular polarization, a ratio A1/B1 of an amplitude A1 of the adjusted $1^{st}$ first signal to an amplitude B1 of the adjusted $2^{nd}$ first signal is 1, and a difference α1−β1 between a phase α1 of the adjusted $1^{st}$ first signal and a phase β1 of the adjusted $2^{nd}$ first signal is −90°, and when the polarization mode of the $2^{nd}$ to-be-transmitted signal is left-handed circular polarization, a ratio A2/B2 of an amplitude A2 of the adjusted $1^{st}$ second signal to an amplitude B2 of the adjusted $2^{nd}$ second signal is 1, and a difference α2−β2 between a phase α2 of the adjusted $1^{st}$ second signal and a phase β2 of the adjusted $2^{nd}$ second signal is 90°.

Figure 12:
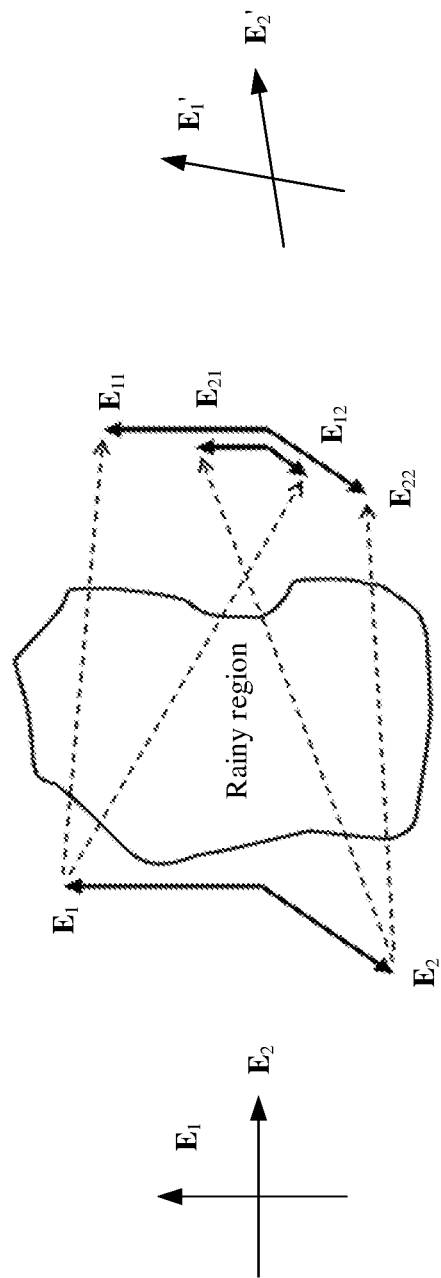
FIG. 12 is a schematic diagram of cross-polarization interference according to an embodiment of this application.
Figure 13A:
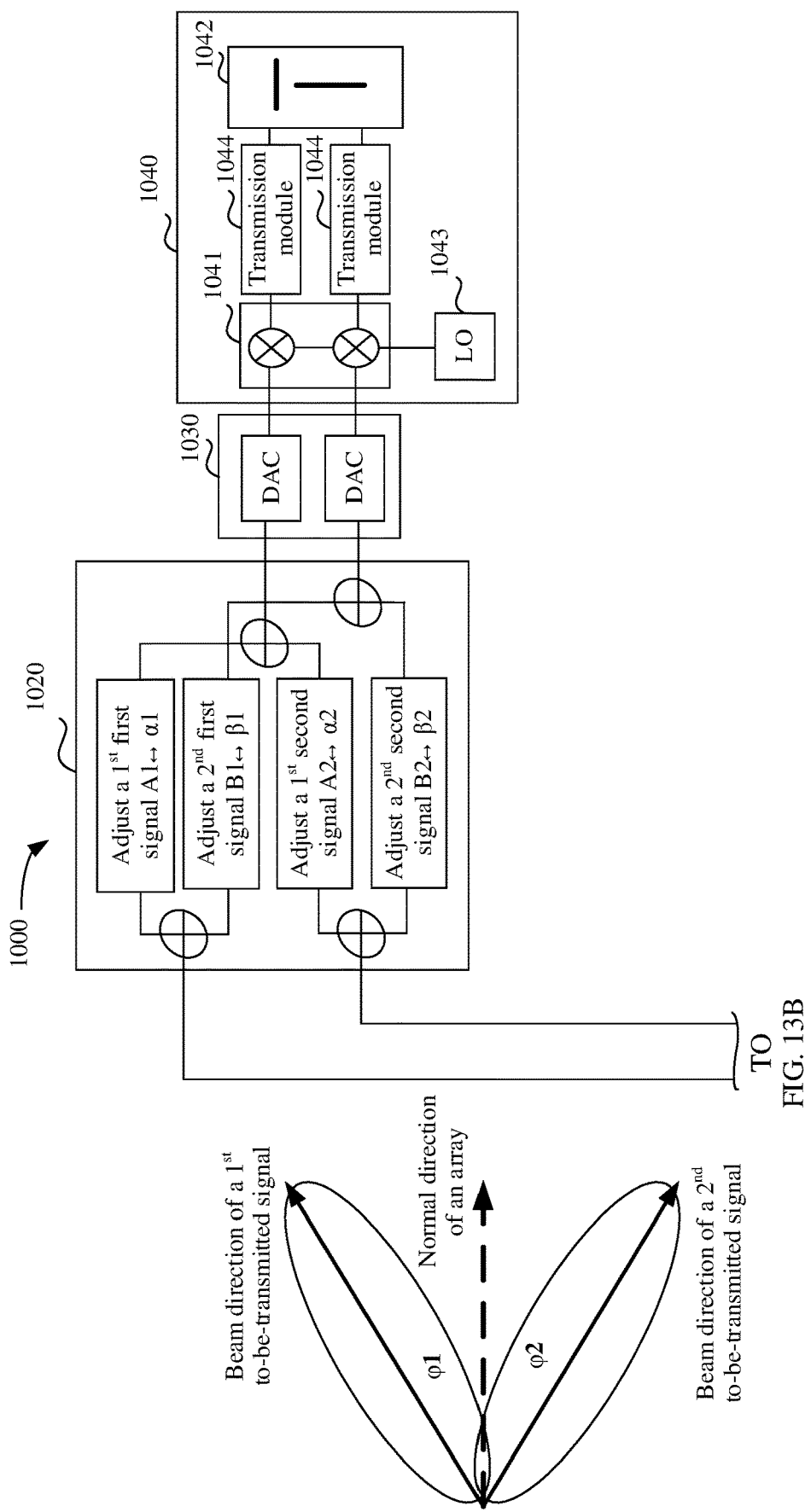
FIG. 13A to FIG. 13D are a third schematic structural diagram of a second polarization reconfigurable apparatus according to an embodiment of this application.
Figure 13B:
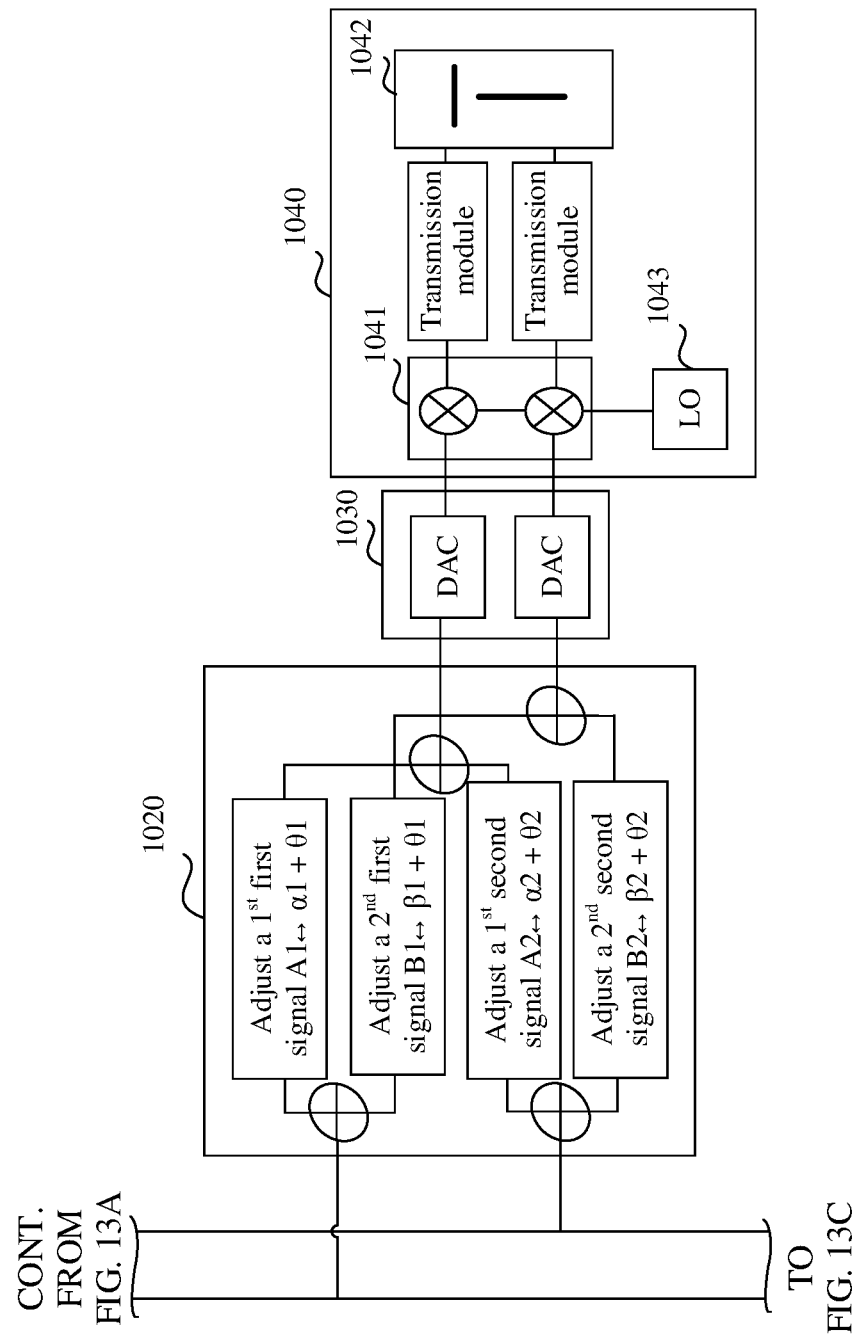
Figure 13C:
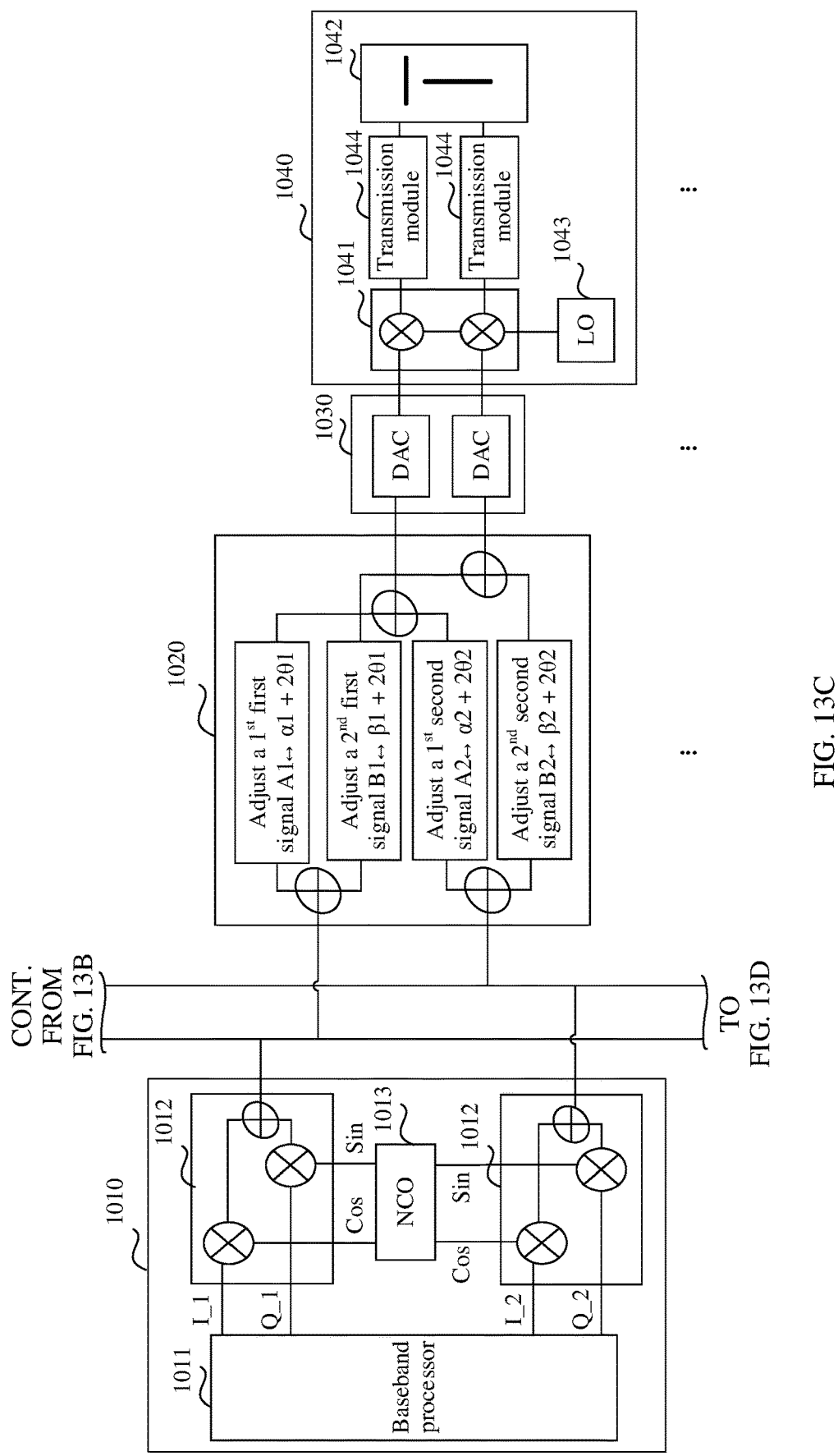
Figure 13D:
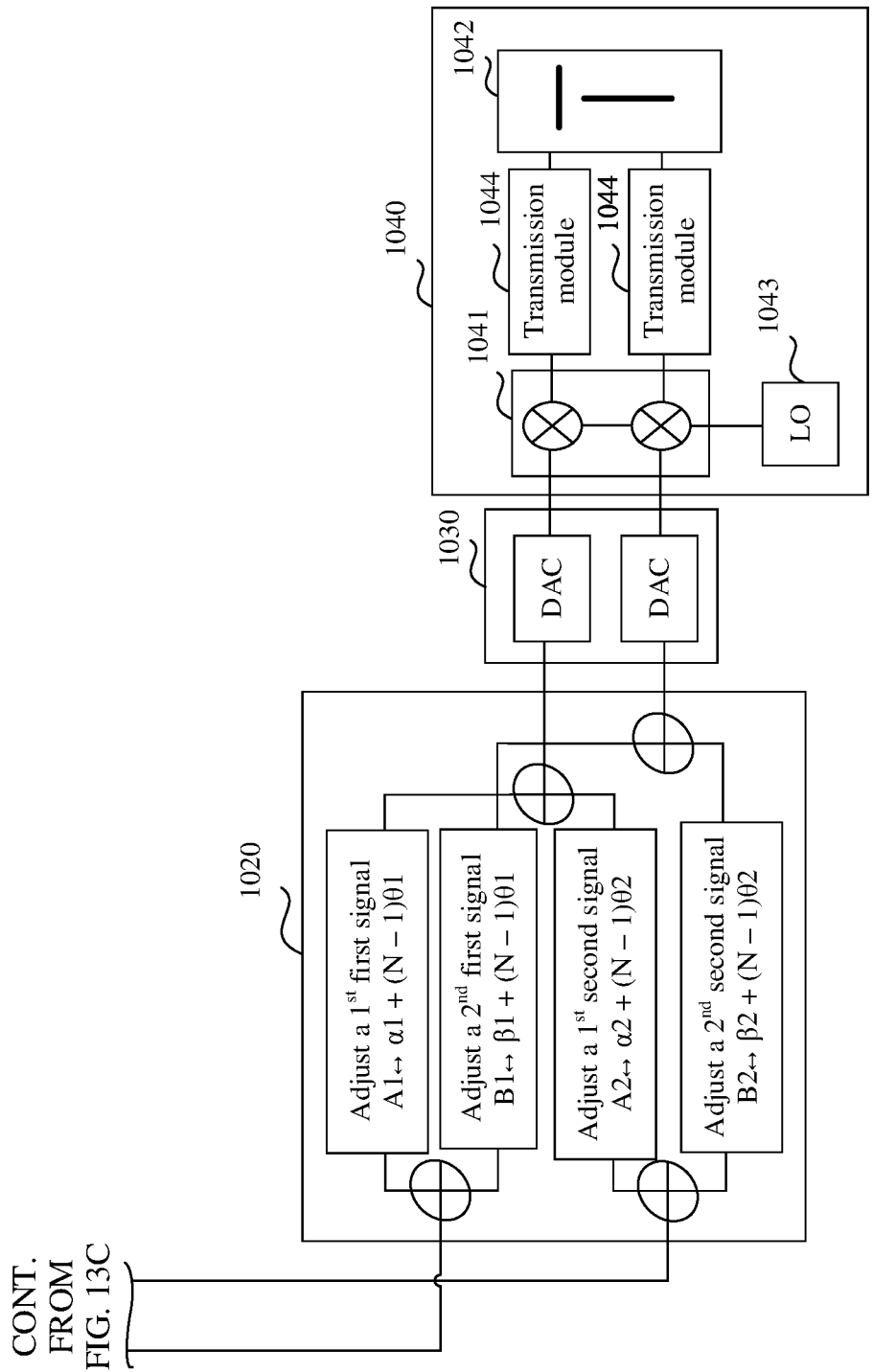

Further, in a scenario in which the polarization mode of the $1^{st}$ to-be-transmitted signal is orthogonal to the polarization mode of the $2^{nd}$ to-be-transmitted signal (for example, to fully utilize spectrum resources, orthogonal polarization for frequency reuse is generally used in satellite communication to provide double bandwidth on a given operating frequency band), due to impact of a depolarization effect, polarization deflection occurs during propagation of the $1^{st}$ to-be-transmitted signal and the $2^{nd}$ to-be-transmitted signal. When the $1^{st}$ to-be-transmitted signal and the $2^{nd}$ to-be-transmitted signal arrive at the receive end, orthogonality is damaged, causing cross-polarization interference to channels used by the receive end to receive the two signals. For example, as shown in FIG. 12, electric field intensities of two electromagnetic wave signals whose polarization modes are orthogonal and that are sent by a transmit end are $E_1$ and $E_2$ ($E_1$ and $E_2$ are orthogonal). When the two electromagnetic wave signals encounter raindrops in a cloudy and rainy region during propagation, due to impact of a depolarization effect of the raindrops, directions of $E_1$ and $E_2$ are deflected, $E_1$ becomes $E_1'$ including components $E_{11}$ and $E_{12}$, and $E_2$ becomes $E_2'$ including components $E_{21}$ and $E_{22}$. $E_1'$ and $E_2'$ are no longer orthogonal, causing cross-polarization interference to the receive end.

In a scenario in which the polarization mode of the $1^{st}$ to-be-transmitted signal is horizontal linear polarization and the polarization mode of the $2^{nd}$ to-be-transmitted signal is vertical linear polarization, a horizontally linearly polarized reference signal H and a vertically linearly polarized reference signal V that are transmitted by the polarization reconfigurable apparatus moo, a horizontally linearly polarized reference signal H' received by the receive end that corresponds to the horizontally linearly polarized reference signal H and that is affected by a depolarization effect, and a vertically linearly polarized reference signal V' received by the receive end that corresponds to the vertically linearly polarized reference signal V and that is affected by a depolarization effect satisfy the following relationship:

$$\begin{bmatrix} H' \\ V' \end{bmatrix} = \begin{bmatrix} A_{HH}*e^{j\theta_{HH}} & A_{HV}*e^{j\theta_{HV}} \\ A_{VH}*e^{j\theta_{VH}} & A_{VV}*e^{j\theta_{VV}} \end{bmatrix} \begin{bmatrix} H \\ V \end{bmatrix}$$

where $A_{VV}$ is an amplitude of a vertically linearly polarized reference signal received by a first port of the receive end, $\theta_{VV}$ is a phase of the vertically linearly polarized reference signal received by the first port of the receive end, $A_{HV}$ is an amplitude of a horizontally linearly polarized reference signal received by the first port of the receive end, $\theta_{HV}$ is a phase of the horizontally linearly polarized reference signal received by the first port of the receive end, $A_{VH}$ is an amplitude of a vertically linearly polarized reference signal received by a second port of the receive end, $\theta_{VH}$ is a phase of the vertically linearly polarized reference signal received by the second port of the receive end, $A_{HH}$ is an amplitude of a horizontally linearly polarized reference signal received by the second port of the receive end, $\theta_{HH}$ is a phase of the horizontally linearly polarized reference signal received by the second port of the receive end, the second port of the receive end is configured to receive a horizontally linearly polarized signal, the first port of the receive end is configured to receive a vertically linearly polarized signal, and the receive end is configured to receive the $1^{st}$ to-be-transmitted signal and the $2^{nd}$ to-be-transmitted signal.

Therefore, to eliminate cross-polarization interference, the difference between the phase $\alpha 1$ of the adjusted $1^{st}$ first signal and the phase $\beta 1$ of the adjusted $2^{nd}$ first signal satisfies the following conditions:

$$\frac{A_1}{B_1} = \frac{A_{VV}}{A_{HV}}$$

$\alpha_1 - \beta_1 = \theta_{VV} - \theta_{HV} + n*180°$, where $n$ is an odd number, and
the ratio of the amplitude A2 of the adjusted $1^{st}$ second signal to the amplitude B2 of the adjusted $2^{nd}$ second signal, and the difference between the phase $\alpha 2$ of the adjusted $1^{st}$ second signal and the phase $\beta 2$ of the adjusted $2^{nd}$ second signal satisfy the following conditions:

$$\frac{A_2}{B_2} = \frac{A_{VH}}{A_{HH}}$$

$\alpha_2 - \beta_2 = \theta_{VH} - \theta_{HH} + m*180°$ where m is an odd number.

With the foregoing solution, in a scenario in which the polarization mode of the $1^{st}$ to-be-transmitted signal is horizontal linear polarization and the polarization mode of the $2^{nd}$ to-be-transmitted signal is vertical linear polarization, the polarization reconfigurable apparatus 1000 may pre-compensate for impact of a depolarization effect, so that the two signals received by the receive end are orthogonal, and cross-polarization interference and a depolarization effect are eliminated.

Further, as shown in FIG. 13A to FIG. 13D, the polarization reconfigurable apparatus 1000 may include N transmission units 1040, N digital-to-analog conversion units 1030 in a one-to-one correspondence with the N transmission units 1040, and N signal adjustment units 1020 in a one-to-one correspondence with the N digital-to-analog conversion units 1030, where N is an integer greater than or equal to 2. A phase difference between adjusted $1^{st}$ first signals obtained by any two adjacent signal adjustment units is $\theta 1$, and a phase difference between adjusted $2^{nd}$ first signals obtained by any two adjacent signal adjustment units is $\theta 2$, where $\theta 1$ is determined based on a beam direction of the $1^{st}$ to-be-transmitted signal. A phase difference between adjusted $1^{st}$ second signals obtained by any two adjacent signal adjustment units is $\theta 2$, and a phase difference between adjusted $2^{nd}$ second signals obtained by any two adjacent signal adjustment units is $\theta 2$, where $\theta 2$ is determined based on a beam direction of the $2^{nd}$ to-be-transmitted signal.

It should be noted that, in the scenario in which the polarization reconfigurable apparatus includes the N transmission units 1040, the N digital-to-analog conversion units 1030, and the N signal adjustment units 1020, conditions met by the amplitude and the phase of the adjusted $1^{st}$ first signal and the amplitude and the phase of the adjusted $2^{nd}$ first signal when the polarization mode of the $1^{st}$ to-be-transmitted signal is linear polarization, circular polarization, or elliptical polarization, and conditions met by the amplitude and the phase of the adjusted $1^{st}$ second signal and the amplitude and the phase of the adjusted $2^{nd}$ second signal when the polarization mode of the $2^{nd}$ to-be-transmitted signal is linear polarization, circular polarization, or elliptical polarization are the same as the conditions met by the amplitude and the phase of the adjusted $1^{st}$ first signal and the amplitude and the phase of the adjusted $2^{nd}$ first signal when the to-be-transmitted signal in the first polarization reconfigurable apparatus 600 provided in this application is in the corresponding polarization mode. Details are not described herein again.

In addition, in the scenario in which the polarization reconfigurable apparatus 1000 includes the N transmission units 1040, if the polarization mode of the $1^{st}$ to-be-transmitted signal is the same as the polarization mode of the $2^{nd}$ to-be-transmitted signal, the beam direction of the $1^{st}$ to-be-transmitted signal is different from the beam direction of the $2^{nd}$ to-be-transmitted signal, or if the beam direction of the $1^{st}$ to-be-transmitted signal is the same as the beam direction of the $2^{nd}$ to-be-transmitted signal, the polarization mode of the $1^{st}$ to-be-transmitted signal is different from the polarization mode of the $2^{nd}$ to-be-transmitted signal. In this case, the polarization reconfigurable apparatus 1000 may further separately control the beam direction of the $1^{st}$ to-be-transmitted signal and the beam direction of the $2^{nd}$ to-be-transmitted signal.

Specifically, in a scenario in which the transmission unit 1040 includes a dual-polarized antenna and the dual-polarized antenna includes the first port and the second port, when N dual-polarized antennas in the N transmission units 1040 form a uniformly spaced linear array, $\theta 1$ and $\theta 2$ satisfy the following formulas:

$\theta 1 = k1 \times d \times \sin \varphi 1$ $\theta 2 = k2 \times d \times \sin \varphi 2$ where k1 is a wave number of a carrier that carries the $1^{st}$ to-be-transmitted signal, d is a distance between two adjacent dual-polarized antennas, φ1 is an included angle between the beam direction of the $1^{st}$ to-be-transmitted signal and a normal direction of the linear array, k2 is a wave number of a carrier that carries the $2^{nd}$ to-be-transmitted signal, and φ2 is an included angle between the beam direction of the $2^{nd}$ to-be-transmitted signal and the normal direction of the linear array.

It should be noted that the uniformly spaced linear array is only a possible form of an array including the N dual-polarized antennas in the N transmission units 1040, and does not constitute a limitation on this embodiment of this application. Another array including the N dual-polarized antennas in the N transmission units 1040 is also applicable to this embodiment of this application.

In addition, in the scenario in which the polarization reconfigurable apparatus 1000 includes the N transmission units 1040, the signal generation unit 1010 may generate three or more signals. In this case, processing processes of the signal adjustment unit 1020, the digital-to-analog conversion unit 1030, and the transmission unit 1040 are similar to the processing processes in the scenario in which the signal generation unit 1010 may generate two signals (the first signal and the second signal). Details are not described herein again.

With the foregoing solution, the polarization reconfigurable apparatus 1000 may perform polarization reconfiguration based on a polarization mode of a received signal in digital domain, and polarization reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

Figure 14:
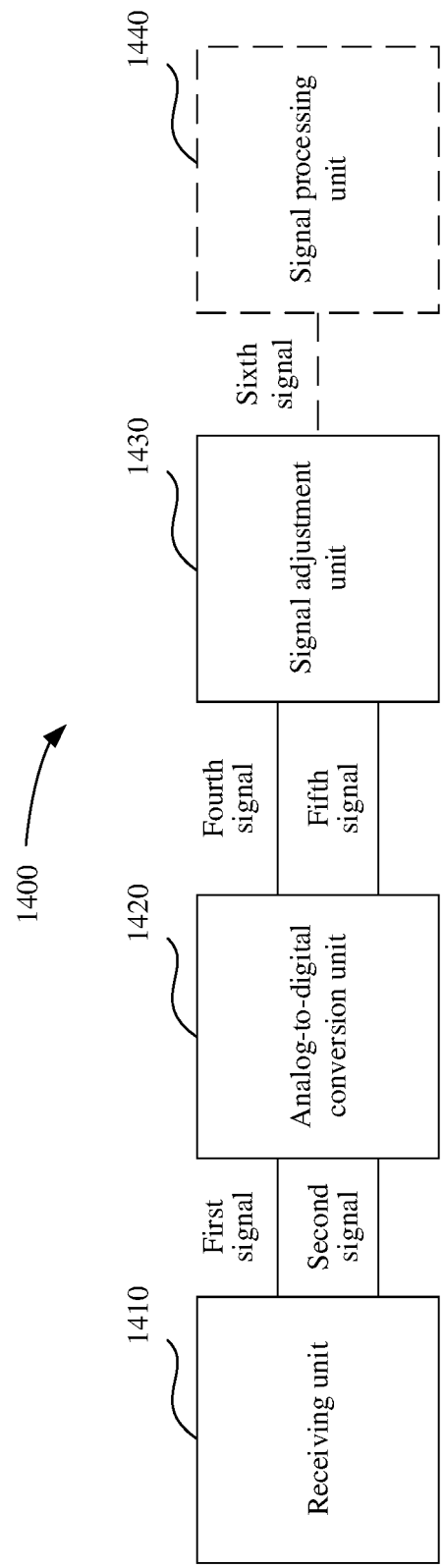
FIG. 14 is a first schematic structural diagram of a third polarization reconfigurable apparatus according to an embodiment of this application.

As shown in FIG. 14, this application provides a third polarization reconfigurable apparatus 1040. The polarization reconfigurable apparatus 1400 is used for a receive-end device, and includes a receiving unit 1410, an digital-to-analog conversion unit 1420, and a signal adjustment unit 1430 that are sequentially connected. The receiving unit 1410 includes a first port and a second port. A signal received by the first port is orthogonal to a signal received by the second port.

The following specifically describes the foregoing components of the polarization reconfigurable apparatus 1400 with reference to FIG. 14.

The receiving unit 1410 is configured to receive a first signal by using the first port, and receive a second signal by using the second port. The first signal is a component of a third signal in a direction corresponding to the first port. The second signal is a component of the third signal in a direction corresponding to the second port. For example, when the direction corresponding to the first port is a direction of an x-axis shown in FIG. 1 and the direction corresponding to the second port is a direction of a y-axis shown in FIG. 1, the first signal is a component of the third signal in the x-axis direction, and the second signal is a component of the third signal in the y-axis direction.

The digital-to-analog conversion unit 1420 is configured to perform analog-to-digital conversion on the first signal to obtain a fourth signal, and perform analog-to-digital conversion on the second signal to obtain a fifth signal. Specifically, the digital-to-analog conversion unit 1420 may be implemented by two analog-to-digital converters (ADC).

The signal adjustment unit 1430 is configured to: determine a polarization mode of the third signal, where the polarization mode includes linear polarization, circular polarization, and elliptical polarization, adjust an amplitude and a phase of the fourth signal and an amplitude and a phase of the fifth signal based on the determined polarization mode, and combine an adjusted fourth signal and an adjusted fifth signal into a sixth signal.

Figure 15:
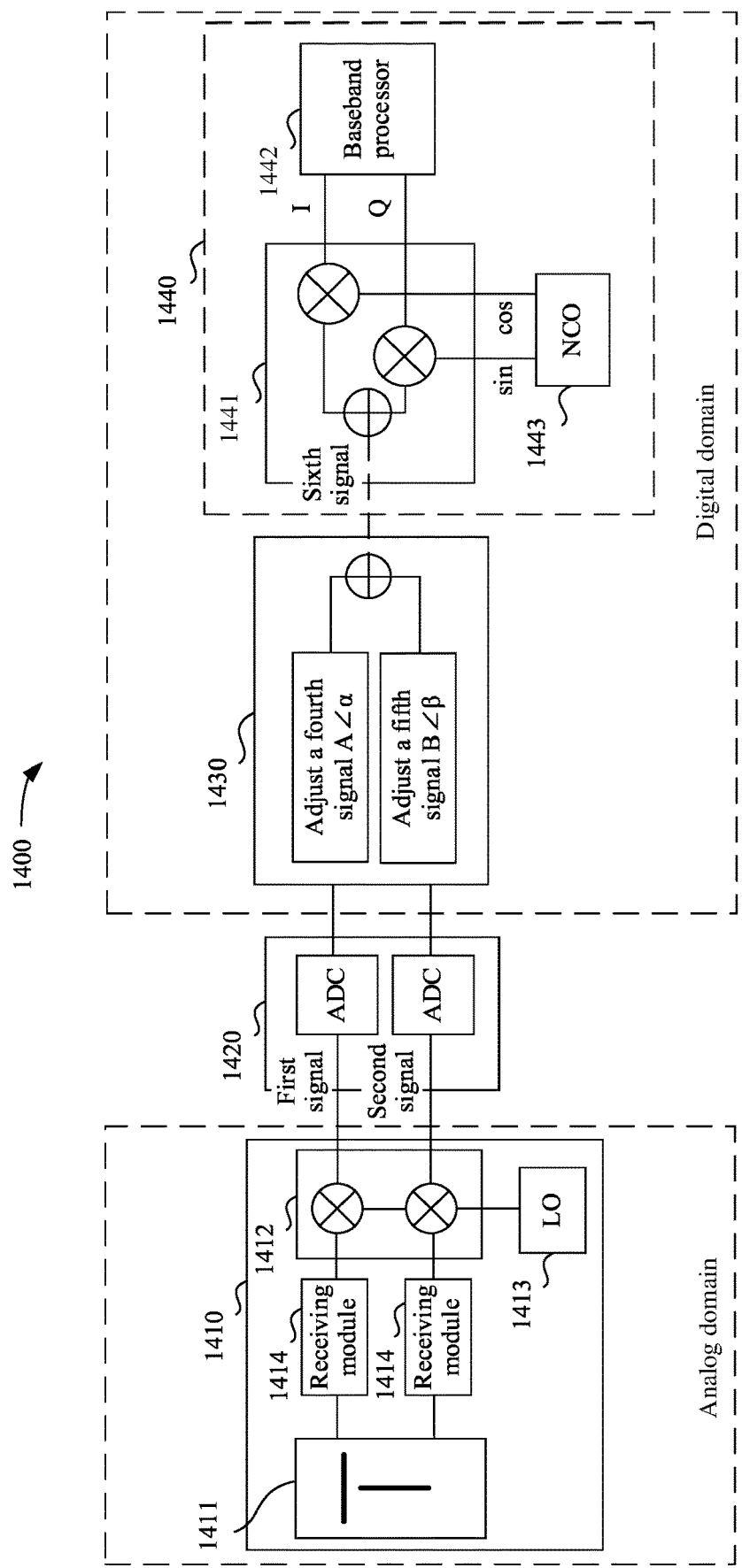
FIG. 15 is a second schematic structural diagram of a third polarization reconfigurable apparatus according to an embodiment of this application.

The receiving unit 1410 may receive the first signal and the second signal by using a dual-polarized antenna, or receive the first signal and the second signal by using a dual-polarized antenna including two single-polarized antennas whose polarization directions are orthogonal. Optionally, as shown in FIG. 15, the receiving unit 1410 may specifically include a dual-polarized antenna 1411, an analog frequency mixer 1412, and a local oscillator LO 1413. The dual-polarized antenna 1411 includes the first port and the second port. The dual-polarized antenna 1411 is configured to receive the first signal by using the first port, and receive the second signal by using the second port. The analog frequency mixer 1412 is configured to separately perform analog down-conversion on the first signal and the second signal by using a local-frequency signal generated by the LO 1413. In addition, the receiving unit 1410 may further include a receiving module (receive module, R module) 1414, configured to amplify the first signal and the second signal before the analog frequency mixer 1412 performs analog down-conversion on the first signal and the second signal.

The signal adjustment unit 1430 may specifically determine the polarization mode of the third signal based on preconfigured information about the polarization mode of the third signal, or obtain the polarization mode of the third signal by measuring a signal transmitted by a transmit end. During specific implementation, when the polarization mode of the third signal is linear polarization at an angle of $\gamma_1$ ($\gamma_1 \in (-90°, 90°)$, and $\gamma_1 != 0°$), a ratio of an amplitude A of the adjusted fourth signal to an amplitude B of the adjusted fifth signal is $|\tan \gamma_3|$. When $\gamma_1 > 0$, a difference between a phase α of the adjusted fourth signal and a phase β of the adjusted fifth signal is an even multiple of 180°, or when $\gamma_1 < 0$, a difference between a phase α of the adjusted fourth signal and a phase β of the adjusted fifth signal is an odd multiple of 180°. $\gamma_1$ is an included angle between an electric field direction of the third signal and a horizontal direction on a plane perpendicular to a propagation direction of the third signal. For example, as shown in FIG. 1, when the third signal (an electromagnetic wave signal) is propagated in the +z-axis direction, $\gamma_1$ is an included angle between an electric field of the third signal and the x-axis on an xoy plane. For example, as shown in FIG. 1, when the third signal is propagated in the +z-axis direction, $\gamma_1$ is an included angle between a direction of the electric field of the third signal and the x-axis on the xoy plane.

For example, when the polarization mode of the third signal is +45° linear polarization, the ratio of the amplitude A of the adjusted fourth signal to the amplitude B of the adjusted fifth signal is 1, and the difference between the phase α of the adjusted fourth signal and the phase β of the adjusted fifth signal is an even multiple of 180°, or when the polarization mode of the third signal is −45° linear polarization, the ratio of the amplitude A of the adjusted fourth signal to the amplitude B of the adjusted fifth signal is 1, and the difference between the phase α of the adjusted fourth signal and the phase β of the adjusted fifth signal is an odd multiple of 180°.

When the polarization mode of the third signal is circular polarization, a ratio of an amplitude A of the adjusted fourth signal to an amplitude B of the adjusted fifth signal is 1, and a difference between a phase α of the adjusted fourth signal and a phase β of the adjusted fifth signal is an odd multiple of 90°.

When the polarization mode of the third signal is elliptical polarization, a ratio A/B of an amplitude A of the adjusted fourth signal to an amplitude B of the adjusted fifth signal, and a difference α−β between a phase α of the adjusted fourth signal and a phase β of the adjusted fifth signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

When the polarization mode of the to-be-transmitted signal is elliptical polarization shown in FIG. 2c, the ratio A/B of the amplitude A of the adjusted fourth signal to the amplitude B of the adjusted fifth signal, and α−β between the phase α of the adjusted fourth signal and the phase β of the adjusted fifth signal satisfy the following formulas:

$$\tan 2\gamma_2 = \frac{2\left(\frac{A}{B}\right)\cos(\alpha - \beta)}{\left(\frac{A}{B}\right)^2 - 1}$$

$$AR = \sqrt{\frac{\left(\frac{A}{B}\right)^2 (\cos\gamma_2)^2 + \frac{A}{B}\sin 2\gamma_2 \cos(\alpha - \beta) + (\sin\gamma_2)^2}{\left(\frac{A}{B}\right)^2 (\sin\gamma_2)^2 - \frac{A}{B}\sin 2\gamma_2 \cos(\alpha - \beta) + (\cos\gamma_2)^2}}$$

During specific implementation, as shown in FIG. 14, the polarization reconfigurable apparatus 1400 may further include a signal processing unit 1440, and the signal processing unit 1440 is configured to process the sixth signal. Further, as shown in FIG. 15, the signal processing unit 1440 may specifically include a digital frequency mixer 1441, a baseband processor 1442, and an NCO 1443. The digital frequency mixer 1441 is configured to divide the sixth signal into two sixth signals, perform down-conversion on a $1^{st}$ sixth signal by using a signal generated by the NCO 1443 to obtain an I-channel baseband signal, and perform down-conversion on a $2^{nd}$ sixth signal by using the signal generated by the NCO 1443 to obtain a Q-channel baseband signal. The baseband processor 1442 is configured to process the I-channel baseband signal and the Q-channel baseband signal. Alternatively, the signal processing unit 1440 is a baseband processor.

Figure 16B:
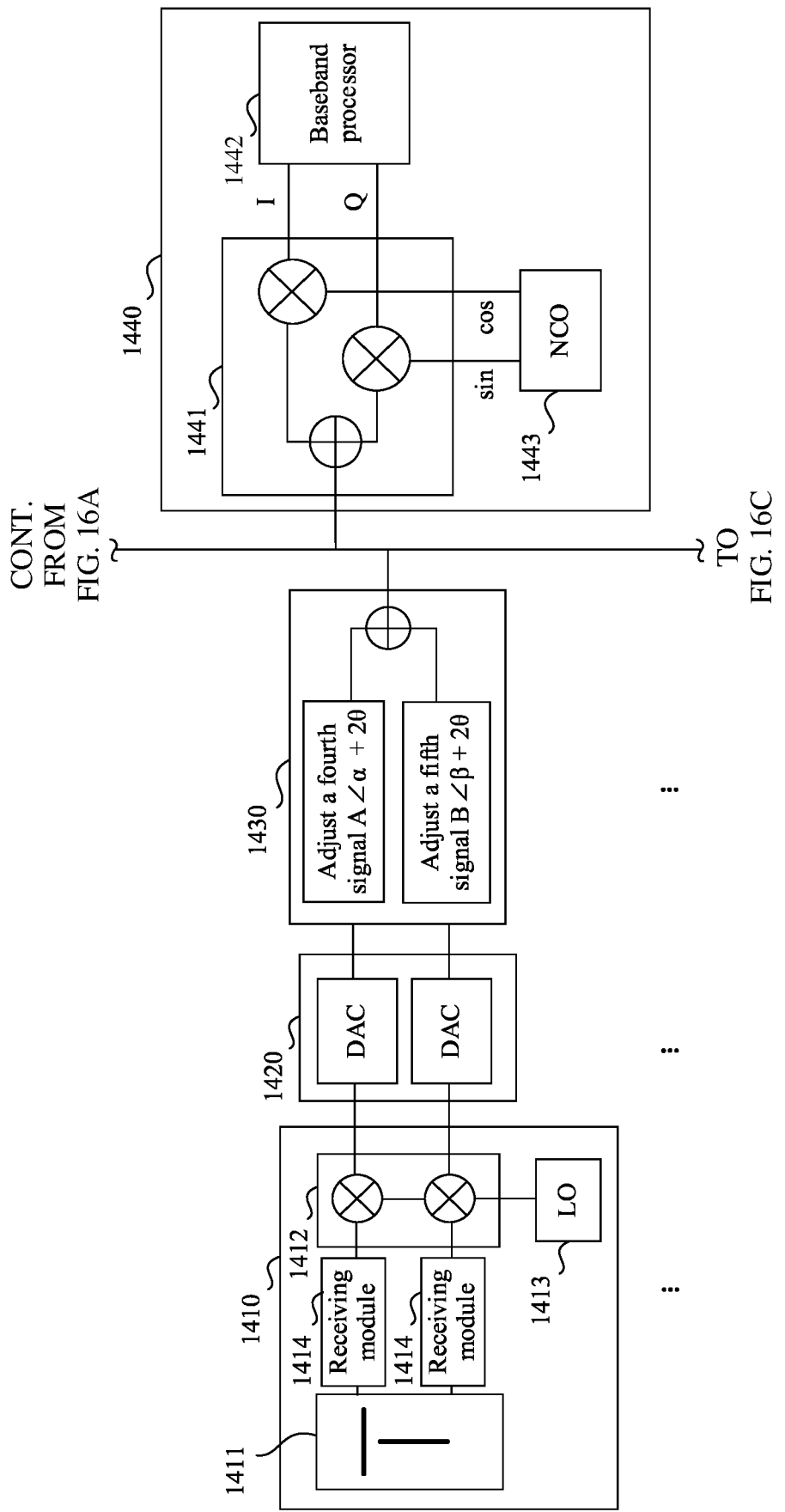
Figure 16C:
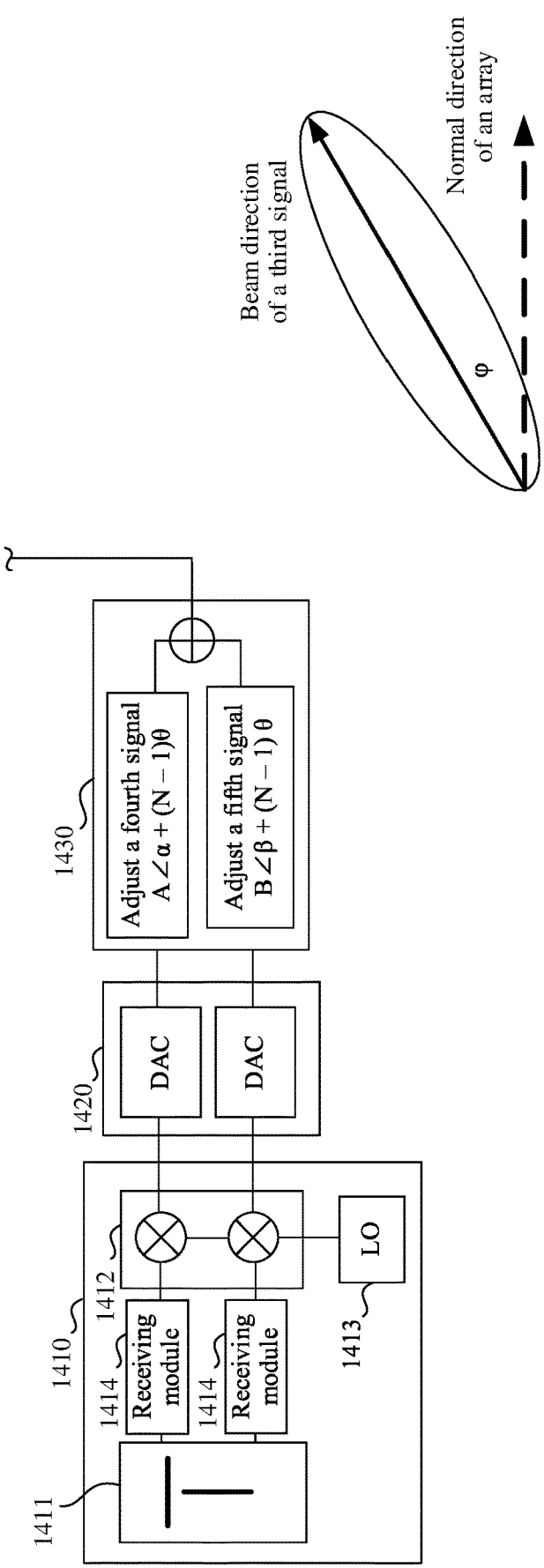

Further, as shown in FIG. 16A to FIG. 16C, the polarization reconfigurable apparatus 1400 may include N receiving units 1410, N digital-to-analog conversion units 1420 in a one-to-one correspondence with the N receiving units 1410, and N signal adjustment units 1430 in a one-to-one correspondence with the N digital-to-analog conversion units 1420, where N is an integer greater than or equal to 2. A phase difference between adjusted fourth signals obtained by any two adjacent signal adjustment units 1430 is θ, and a phase difference between adjusted fifth signals obtained by any two adjacent signal adjustment units 1430 is θ, where θ is determined based on a beam direction of the third signal. In other words, the polarization reconfigurable apparatus 1400 may further control the beam direction of the third signal.

In this case, the signal processing unit 1440 is further configured to combine N sixth signals obtained by the N signal adjustment units 1430 into a seventh signal, and process the seventh signal.

In a scenario in which the receiving unit 1410 includes a dual-polarized antenna, and the dual-polarized antenna includes the first port and the second port, and is configured to receive the first signal by using the first port and receive the second signal by using the second port, when N dual-polarized antennas in the N receiving units 1410 form a uniformly spaced linear array, θ satisfies the following formula:

$$\theta = k \times d \times \sin\varphi$$

where k is a wave number of a carrier used to carry the third signal, d is a distance between two adjacent dual-polarized antennas, and φ is an included angle between the beam direction of the third signal and a normal direction of the linear array.

With the foregoing solution, the polarization reconfigurable apparatus 1400 can perform polarization reconfiguration on a received signal in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

Figure 17:
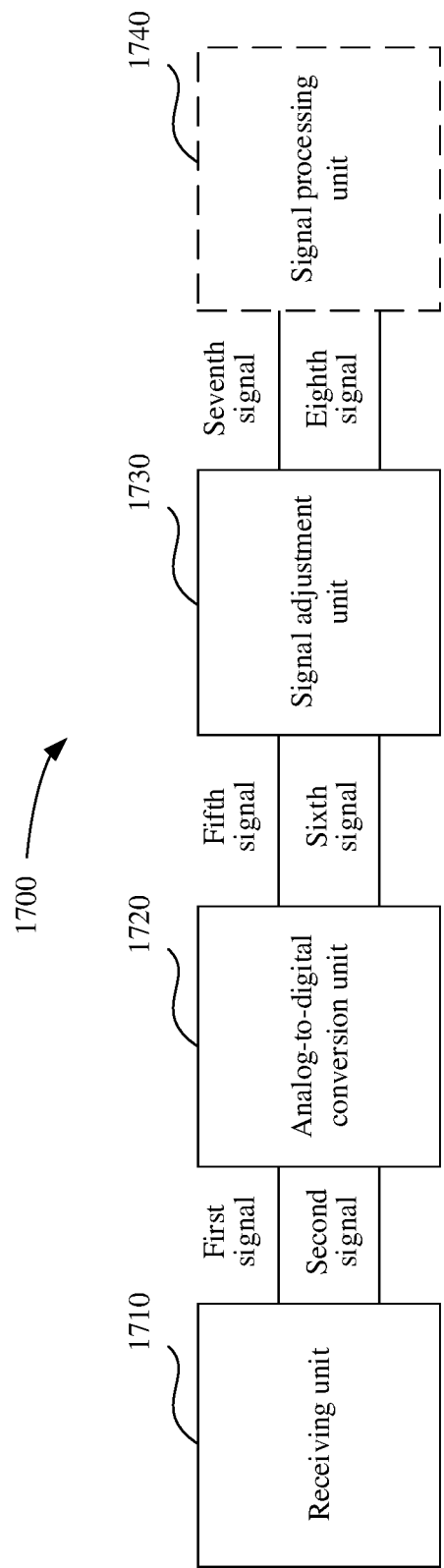
FIG. 17 is a first schematic structural diagram of a fourth polarization reconfigurable apparatus according to an embodiment of this application.

As shown in FIG. 17, this application provides a fourth polarization reconfigurable apparatus 1700. The polarization reconfigurable apparatus 1700 is used for a receive-end device, and includes a receiving unit 1710, an analog-to-digital conversion unit 1720, and a signal adjustment unit 1730 that are sequentially connected. The receiving unit 1710 includes a first port and a second port. A signal received by the first port is orthogonal to a signal received by the second port.

The following specifically describes the foregoing components of the polarization reconfigurable apparatus 1700 with reference to FIG. 17.

The receiving unit 1710 is configured to receive a first signal by using the first port, and receive a second signal by using the second port. The first signal is a sum of a component of a third signal in a direction corresponding to the first port and a component of a fourth signal in the direction corresponding to the first port. The second signal is a sum of a component of the third signal in a direction corresponding to the second port and a component of the fourth signal in the direction corresponding to the second port. For example, when the direction corresponding to the first port is a direction of an x-axis shown in FIG. 1 and the direction corresponding to the second port is a direction of a y-axis shown in FIG. 1, the first signal is a component of the third signal and the fourth signal in the x-axis direction, and the second signal is a component of the third signal and the fourth signal in the y-axis direction.

The analog-to-digital conversion unit 1720 is configured to perform analog-to-digital conversion on the first signal to obtain a fifth signal, and perform analog-to-digital conversion on the second signal to obtain a sixth signal. Specifically, the digital-to-analog conversion unit 1720 may be implemented by two ADCs.

The signal adjustment unit 1730 is configured to: determine a polarization mode of the third signal and a polarization mode of the fourth signal, where the polarization mode of the third signal includes linear polarization, circular polarization, and elliptical polarization, and the polarization mode of the fourth signal includes linear polarization, circular polarization, and elliptical polarization, divide the fifth signal into two fifth signals, and divide the sixth signal into two sixth signals, adjust an amplitude and a phase of a $1^{st}$ fifth signal and an amplitude and a phase of a $1^{st}$ sixth signal based on the polarization mode of the third signal, and combine an adjusted $1^{st}$ fifth signal and an adjusted $1^{st}$ sixth signal into a seventh signal, and adjust an amplitude and a phase of a $2^{nd}$ fifth signal and an amplitude and a phase of a $2^{nd}$ sixth signal based on the polarization mode of the fourth signal, and combine an adjusted $2^{nd}$ fifth signal and an adjusted $2^{nd}$ sixth signal into an eighth signal.

Figure 18:
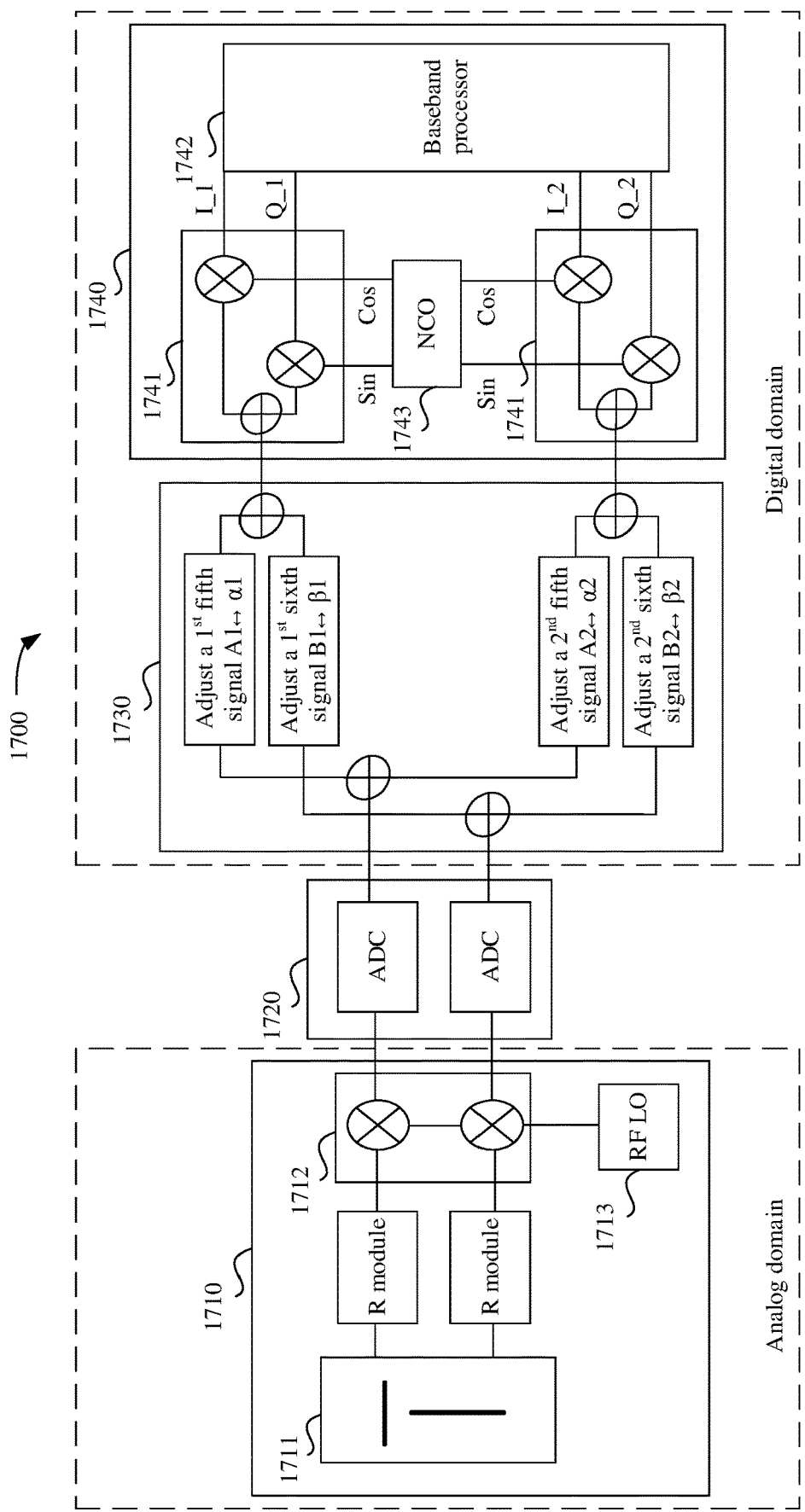
FIG. 18 is a second schematic structural diagram of a fourth polarization reconfigurable apparatus according to an embodiment of this application.
Figure 19A:
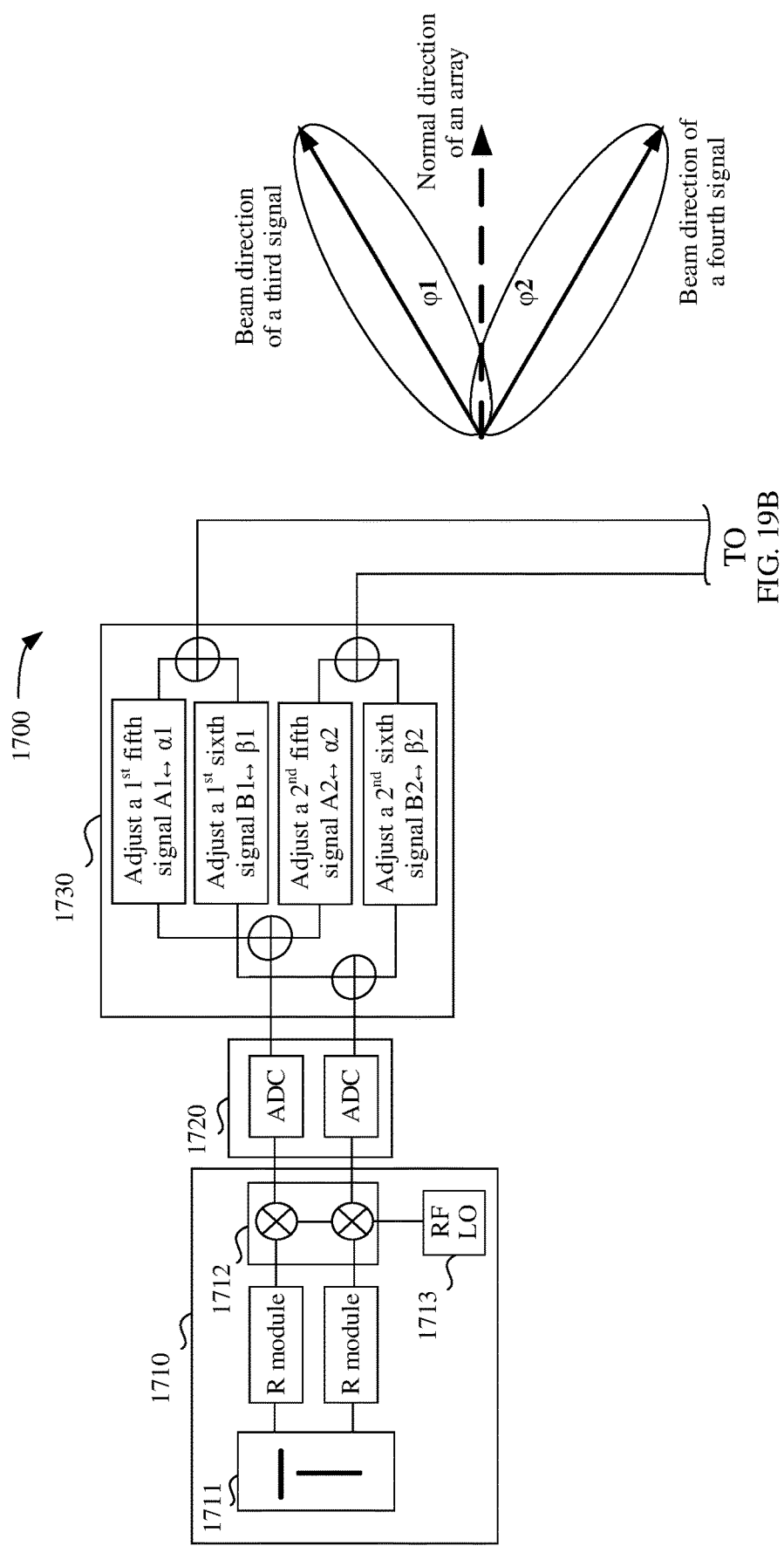
FIG. 19A to FIG. 19D are a third schematic structural diagram of a fourth polarization reconfigurable apparatus according to an embodiment of this application.
Figure 19B:
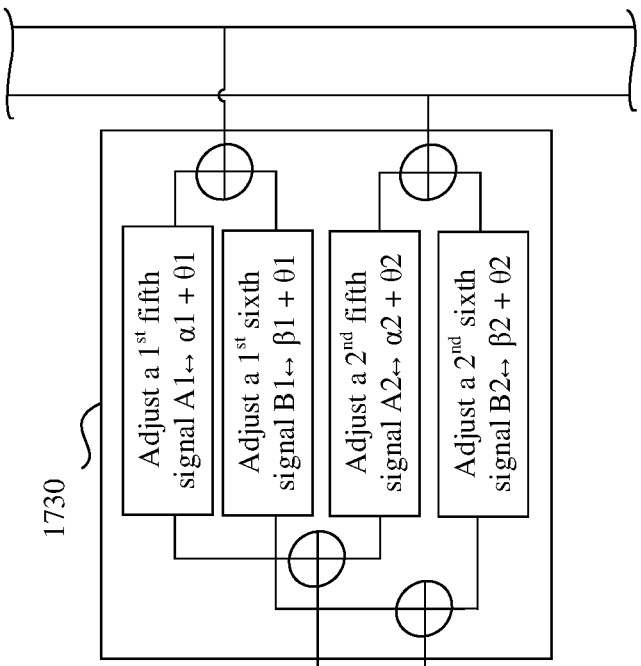
Figure 19C:
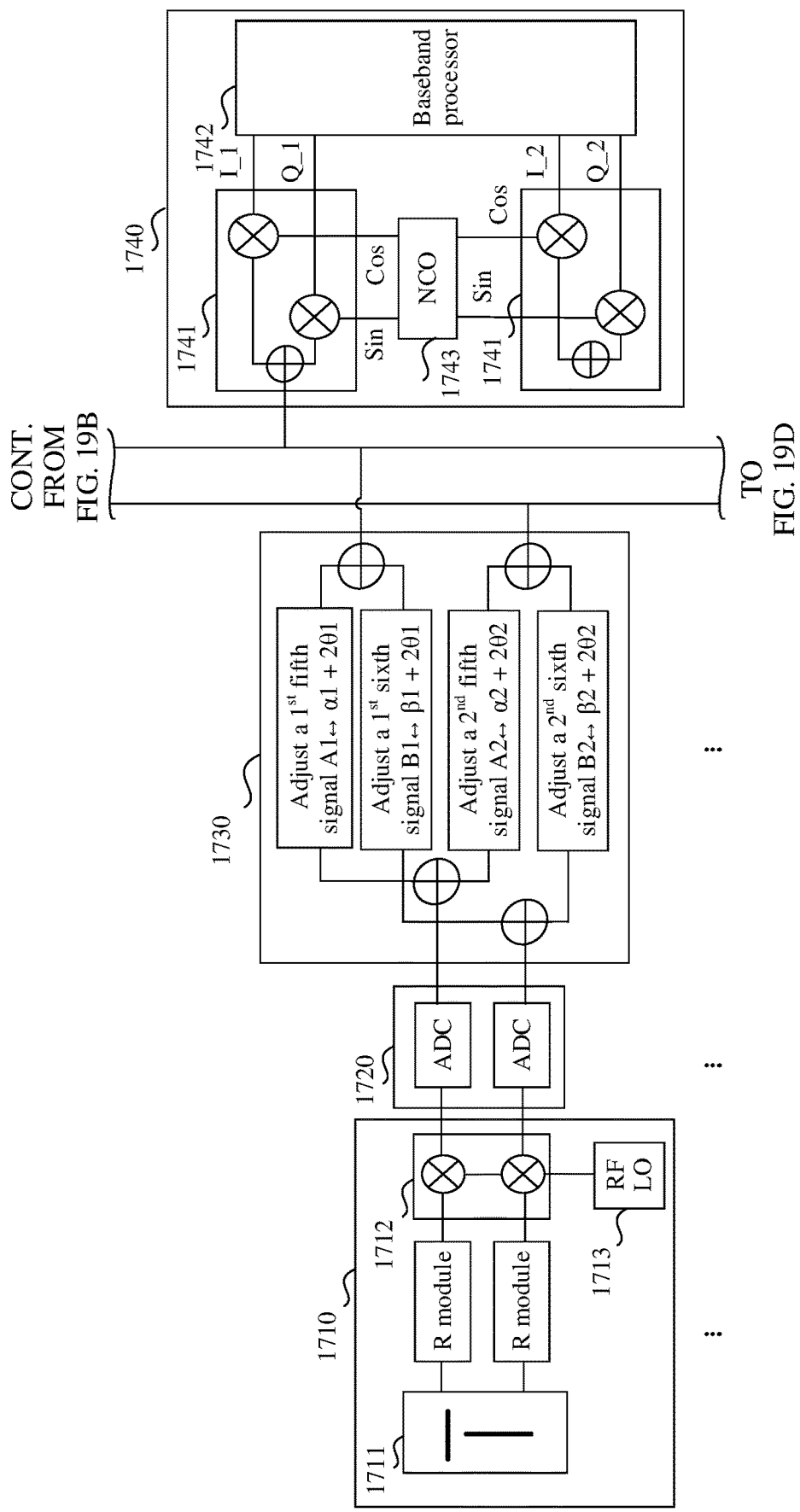
Figure 19D:
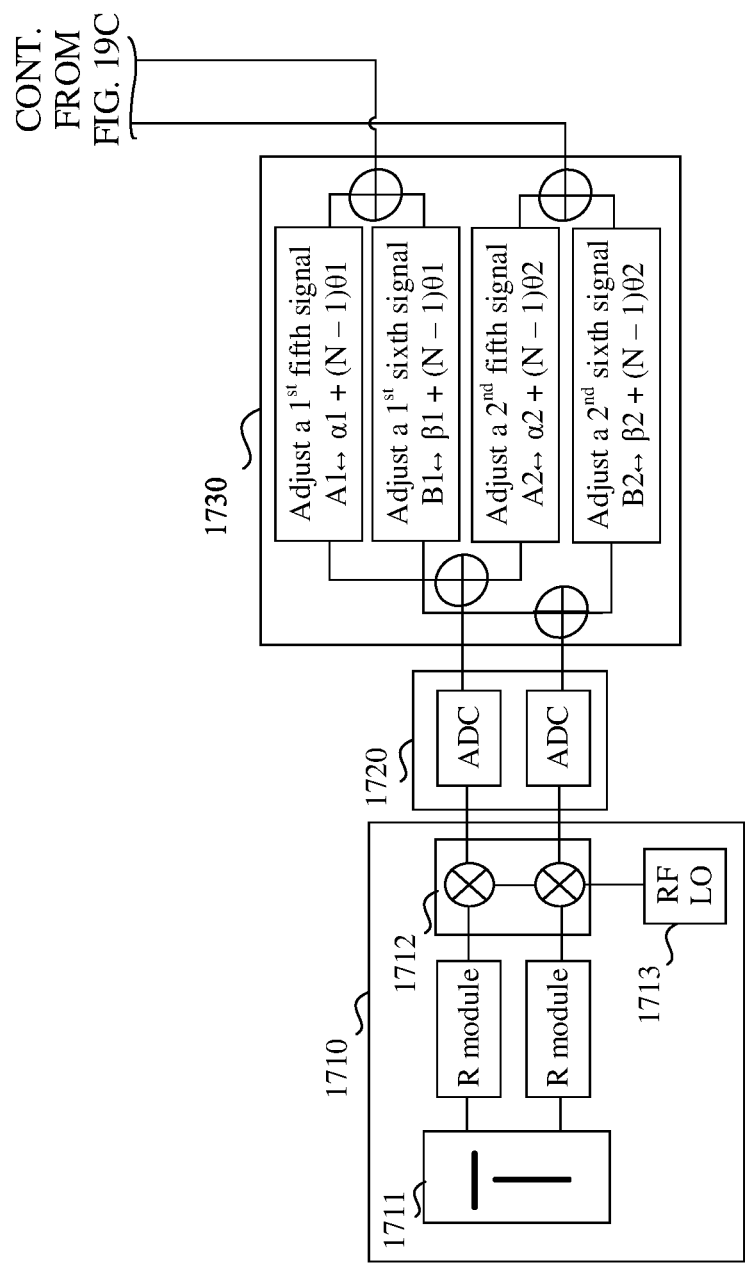

The receiving unit 1710 may receive the first signal and the second signal by using a dual-polarized antenna, or receive the first signal and the second signal by using a dual-polarized antenna including two single-polarized antennas whose polarization directions are orthogonal. Optionally, as shown in FIG. 18, the receiving unit 1710 may specifically include a dual-polarized antenna 1711, an analog frequency mixer 1712, and an LO 1713. The dual-polarized antenna 1711 includes the first port and the second port. The dual-polarized antenna 1711 is configured to receive the first signal by using the first port, and receive the second signal by using the second port. The analog frequency mixer 1712 is configured to separately perform analog down-conversion on the first signal and the second signal by using a local-frequency signal generated by the LO 1713. In addition, the receiving unit 1710 may further include a receiving module 1714, configured to amplify the first signal and the second signal before the analog frequency mixer 1712 performs analog down-conversion on the first signal and the second signal.

The signal adjustment unit 1730 may specifically determine the polarization mode of the third signal based on preconfigured information about the polarization mode of the third signal, and determine the polarization mode of the fourth signal based on preconfigured information about the polarization mode of the fourth signal, or obtain the polarization mode of the third signal and the polarization mode of the fourth signal by measuring a signal transmitted by a transmit end.

During specific implementation, as shown in FIG. 17, the polarization reconfigurable apparatus 1700 may further include a signal processing unit 1740, and the signal processing unit 1740 is configured to process the seventh signal and the eighth signal. Further, as shown in FIG. 18, the signal processing unit 1740 may specifically include two digital frequency mixers 1711, a baseband processor 1742, and an NCO 1743. One of the digital frequency mixers 1741 is configured to divide the seventh signal into two seventh signals, perform down-conversion on a $1^{st}$ seventh signal by using a signal generated by the NCO 1743 to obtain a first I-channel baseband signal I_1, and perform down-conversion on a $2^{nd}$ seventh signal by using the signal generated by the NCO 1743 to obtain a first Q-channel baseband signal Q_1. The other digital frequency mixer 1741 is configured to divide the eighth signal into two eighth signals, perform down-conversion on a $1^{st}$ eighth signal by using the signal generated by the NCO 1743 to obtain a second I-channel baseband signal I_2, and perform down-conversion on a $2^{nd}$ eighth signal by using the signal generated by the NCO 1743 to obtain a second Q-channel baseband signal Q_2. The baseband processor 1742 is configured to process the first I-channel baseband signal I_1, the first Q-channel baseband signal Q_1, the second I-channel baseband signal I_2, and the second Q-channel baseband signal Q_2. Alternatively, the signal processing unit 1740 may be a baseband processor.

It should be noted that, that the two digital frequency mixers 1741 in the signal processing unit 1740 shown in FIG. 17 share one NCO 1743 is only a possible implementation of the signal processing unit 1740, and does not constitute a limitation on this application. The signal processing unit 1740 may alternatively include two NCOs 1743 in a one-to-one correspondence with the two digital frequency mixers 1741.

In a scenario in which the polarization reconfigurable apparatus 1700 includes one receiving unit 1710, the polarization mode of the third signal is orthogonal to the polarization mode of the fourth signal. The polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Specifically, when the polarization mode of the third signal is vertical linear polarization, an amplitude A1 of the adjusted $1^{st}$ fifth signal is 0 (a phase α1 of the adjusted $1^{st}$ fifth signal does not exist), and an amplitude B1 and a phase β1 of the adjusted $1^{st}$ sixth signal may be any values, and when the polarization mode of the fourth signal is horizontal linear polarization, an amplitude A2 and a phase α2 of the adjusted $2^{nd}$ fifth signal are any values, and an amplitude B2 of the adjusted $2^{nd}$ sixth signal is 0 (a phase β2 of the adjusted $2^{nd}$ sixth signal does not exist).

When the polarization mode of the third signal is horizontal linear polarization, an amplitude A1 and a phase α1 of the adjusted $1^{st}$ fifth signal are any values, and an amplitude B1 of the adjusted $1^{st}$ sixth signal is 0 (a phase β1 of the adjusted $1^{st}$ sixth signal does not exist), and when the polarization mode of the fourth signal is vertical linear polarization, an amplitude A2 of the adjusted $2^{nd}$ fifth signal is 0 (a phase α2 of the adjusted $2^{nd}$ fifth signal does not exist), and an amplitude B2 and a phase β2 of the adjusted $2^{nd}$ sixth signal are any values.

When the polarization mode of the third signal is +45° linear polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted $1^{st}$ fifth signal and a phase β1 of the adjusted $1^{st}$ sixth signal is an even multiple of 180°, and when the polarization mode of the fourth signal is −45° linear polarization, a ratio A2/B2 of an amplitude A2 of the adjusted $2^{nd}$ fifth signal to an amplitude B2 of the adjusted $2^{nd}$ sixth signal is 1, and a difference α2−β2 between a phase α2 of the adjusted $2^{nd}$ fifth signal and a phase β2 of the adjusted $2^{nd}$ sixth signal is an odd multiple of 180°.

When the polarization mode of the third signal is −45° linear polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted $1^{st}$ fifth signal and a phase β1 of the adjusted $1^{st}$ sixth signal is an odd multiple of 180°, and when the polarization mode of the fourth signal is +45° linear polarization, a ratio A2/B2 of an amplitude A2 of the adjusted $2^{nd}$ fifth signal to an amplitude B2 of the adjusted $2^{nd}$ sixth signal is 1, and a difference α2−β2 between a phase α2 of the adjusted $2^{nd}$ fifth signal and a phase β2 of the adjusted $2^{nd}$ sixth signal is an even multiple of 180°.

When the polarization mode of the third signal is left-handed circular polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted $1^{st}$ fifth signal and a phase β1 of the adjusted $1^{st}$ sixth signal is 90°, and when the polarization mode of the fourth signal is right-handed circular polarization, a ratio A2/B2 of an amplitude A2 of the adjusted $2^{nd}$ fifth signal to an amplitude B2 of the adjusted $2^{nd}$ sixth signal is 1, and a difference α2−β2 between a phase α2 of the adjusted $2^{nd}$ fifth signal and a phase β2 of the adjusted $2^{nd}$ sixth signal is −90°.

When the polarization mode of the third signal is right-handed circular polarization, a ratio A1/B1 of an amplitude A1 of the adjusted $1^{st}$ fifth signal to an amplitude B1 of the adjusted $1^{st}$ sixth signal is 1, and a difference α1−β1 between a phase α1 of the adjusted $1^{st}$ fifth signal and a phase β1 of the adjusted $1^{st}$ sixth signal is −90°, and when the polarization mode of the fourth signal is left-handed circular polarization, a ratio A2/B2 of an amplitude A2 of the adjusted $2^{nd}$ fifth signal to an amplitude B2 of the adjusted $2^{nd}$ sixth signal is 1, and a difference α2−β2 between a phase α2 of the adjusted $2^{nd}$ fifth signal and a phase β2 of the adjusted $2^{nd}$ sixth signal is 90°.

Further, as shown in FIG. 19A to FIG. 19D, the polarization reconfigurable apparatus 1700 may include N receiving units 1710, N digital-to-analog conversion units 1720 in a one-to-one correspondence with the N receiving units 1710, and N signal adjustment units 1730 in a one-to-one correspondence with the N digital-to-analog conversion units 1720, where N is an integer greater than or equal to 2. A phase difference between adjusted $1^{st}$ fifth signals obtained by any two adjacent signal adjustment units 1730 is θ1, and a phase difference between adjusted $1^{st}$ sixth signals obtained by any two adjacent signal adjustment units 1730 is θ1, where θ1 is determined based on a beam direction of the third signal.

A phase difference between adjusted $2^{nd}$ fifth signals obtained by any two adjacent signal adjustment units 1730 is θ2, and a phase difference between adjusted $2^{nd}$ sixth signals obtained by any two adjacent signal adjustment units 1730 is θ2, where θ2 is determined based on a beam direction of the fourth signal. In other words, the polarization reconfigurable apparatus 1700 may further separately control the beam direction of the third signal and the beam direction of the fourth signal.

In this case, the signal processing unit 1740 is further configured to combine N seventh signals obtained by the N signal adjustment units 1730 into a ninth signal, combine N eighth signals obtained by the N signal adjustment units 1730 into a tenth signal, and process the ninth signal and the tenth signal.

It should be noted that, in the scenario in which the polarization reconfigurable apparatus 1700 includes the N receiving units 1710, the N analog-to-digital conversion units 1720, and the N signal adjustment units 1730, conditions met by the amplitude and the phase of the adjusted $1^{st}$ fifth signal and the amplitude and the phase of the adjusted $1^{st}$ sixth signal when the polarization mode of the third signal is linear polarization, circular polarization, or elliptical polarization, and conditions met by the amplitude and the phase of the adjusted $2^{nd}$ fifth signal and the amplitude and the phase of the adjusted $2^{nd}$ sixth signal when the polarization mode of the fourth signal is linear polarization, circular polarization, or elliptical polarization are the same as the conditions met by the amplitude and the phase of the adjusted fourth signal and the amplitude and the phase of the adjusted fifth signal when the third signal in the third polarization reconfigurable apparatus 1400 provided in this application is in the corresponding polarization mode. Details are not described herein again.

In addition, in the scenario in which the polarization reconfigurable apparatus 1700 includes the N receiving units 1710, if the polarization mode of the third signal is the same as the polarization mode of the fourth signal, the beam direction of the third signal is different from the beam direction of the fourth signal, or if the beam direction of the third signal is the same as the beam direction of the fourth signal, the polarization mode of the third signal is different from the polarization mode of the fourth signal.

In a scenario in which the receiving unit 1710 includes a dual-polarized antenna, and the dual-polarized antenna includes the first port and the second port, and is configured to receive the first signal by using the first port and receive the second signal by using the second port, when N dual-polarized antennas in the N receiving units 1710 form a uniformly spaced linear array, θ1 and θ2 satisfy the following formulas:

$$\theta 1 = k1 \times d \times \sin \varphi 1$$

$$\theta 2 = k2 \times d \times \sin \varphi 2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the third signal, and φ2 is an included angle between the beam direction of the fourth signal and the normal direction of the linear array.

It should be noted that the uniformly spaced linear array is only a possible form of an array including the N dual-polarized antennas in the N receiving units 1710, and does not constitute a limitation on this embodiment of this application. Another array including the N dual-polarized antennas in the N receiving units 1710 is also applicable to this embodiment of this application.

In addition, in the scenario in which the polarization reconfigurable apparatus 1700 includes the N receiving units 1710, the N receiving units may receive three or more signals. In this case, processing processes of the receiving unit 1710, the analog-to-digital conversion unit 1720, and the signal adjustment unit 1730 are similar to the processing processes in the scenario in which the receiving unit 1710 receives two signals (the first signal and the second signal). Details are not described herein again.

With the foregoing solution, the polarization reconfigurable apparatus 1700 may separately perform polarization reconfiguration based on polarization modes of two received signals in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

Figure 20A:
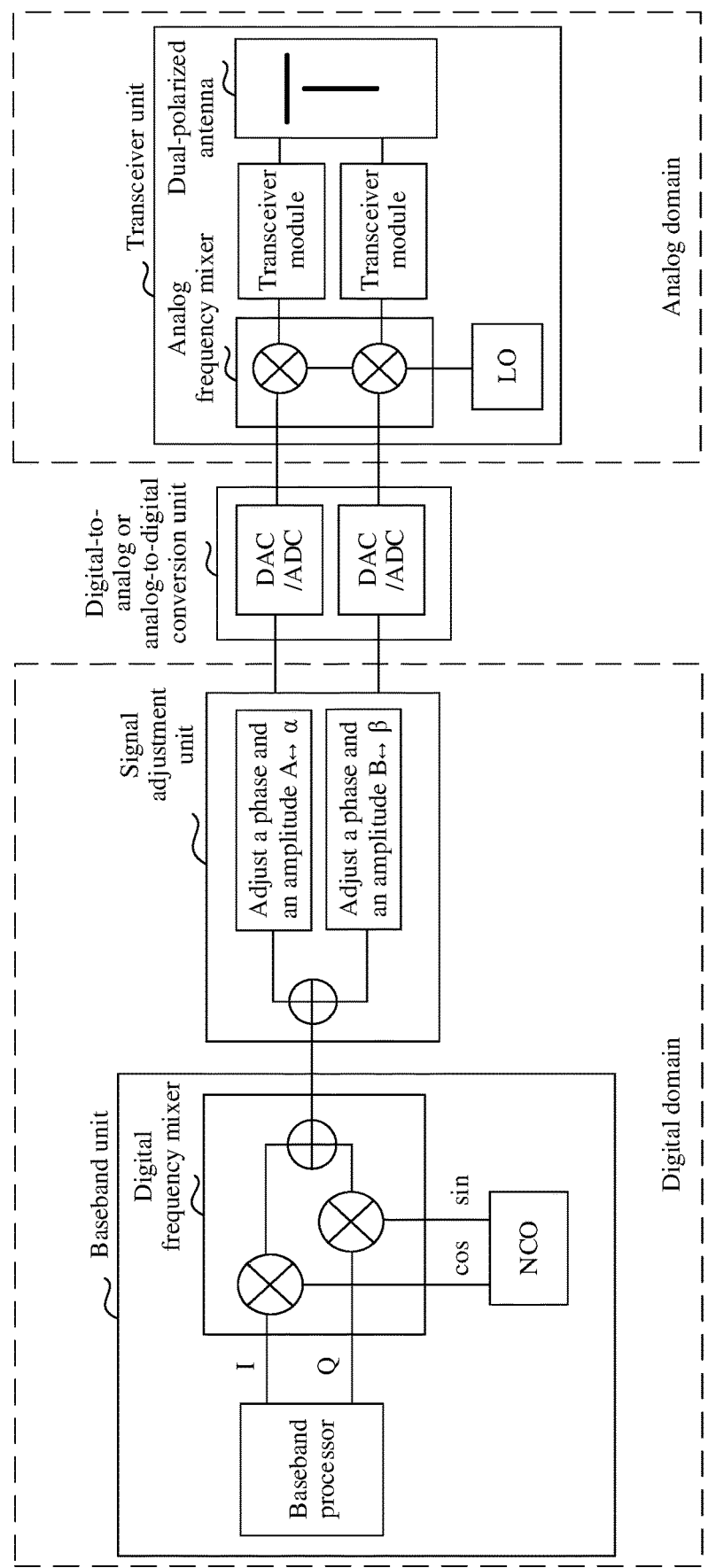
FIG. 20a is a first schematic structural diagram of a communications device according to an embodiment of this application.
Figures 1, 20B:
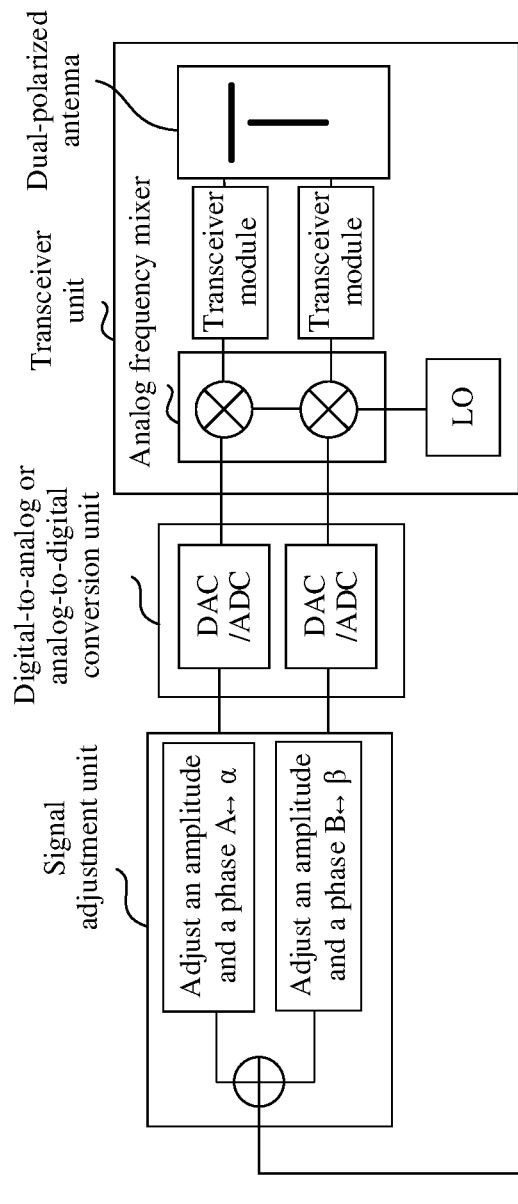
Figures 2, 20B:
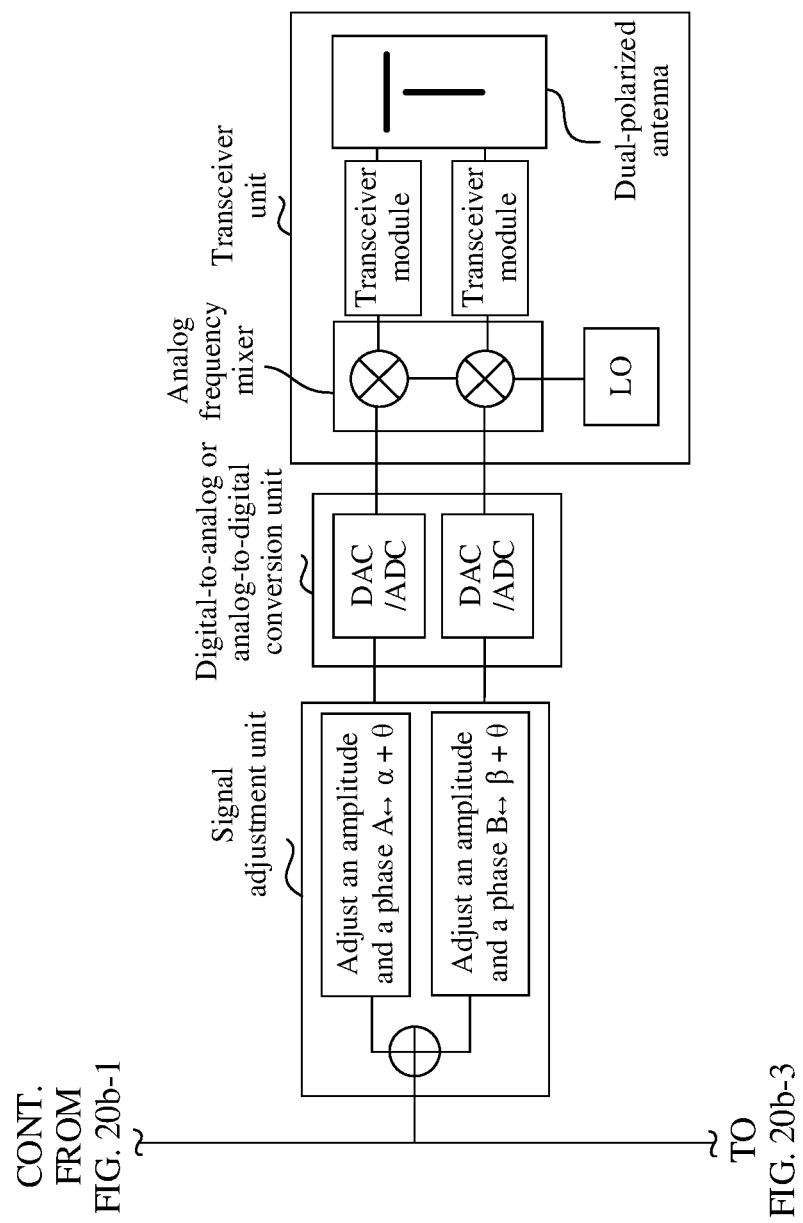
Figure 20B:
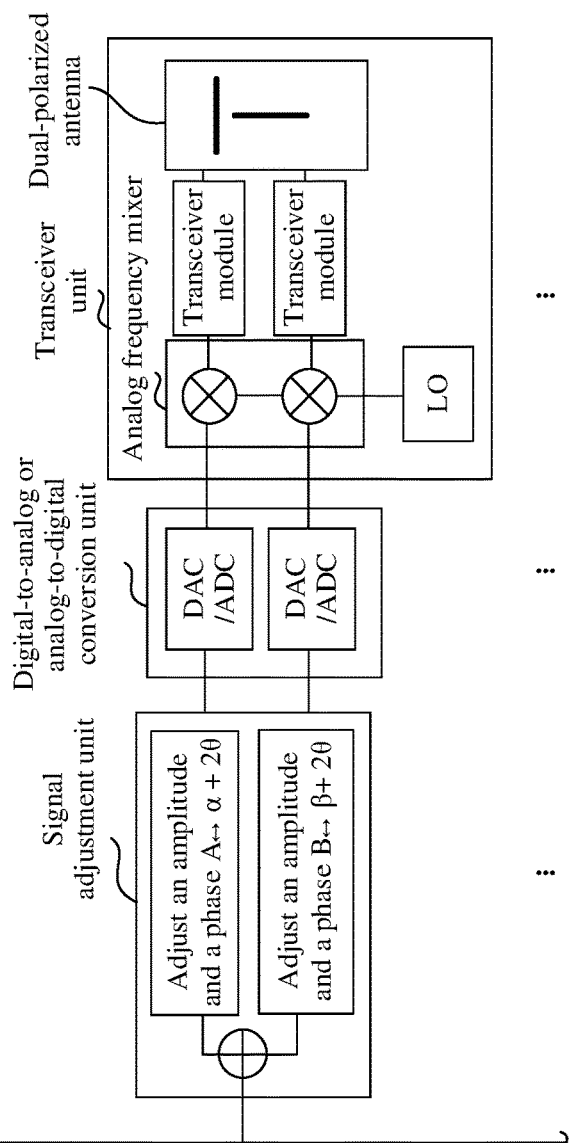
Figure 3:
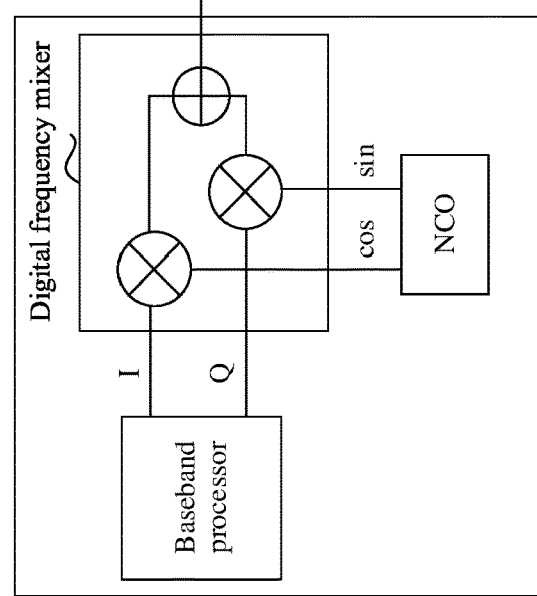
Figures 4, 20B:
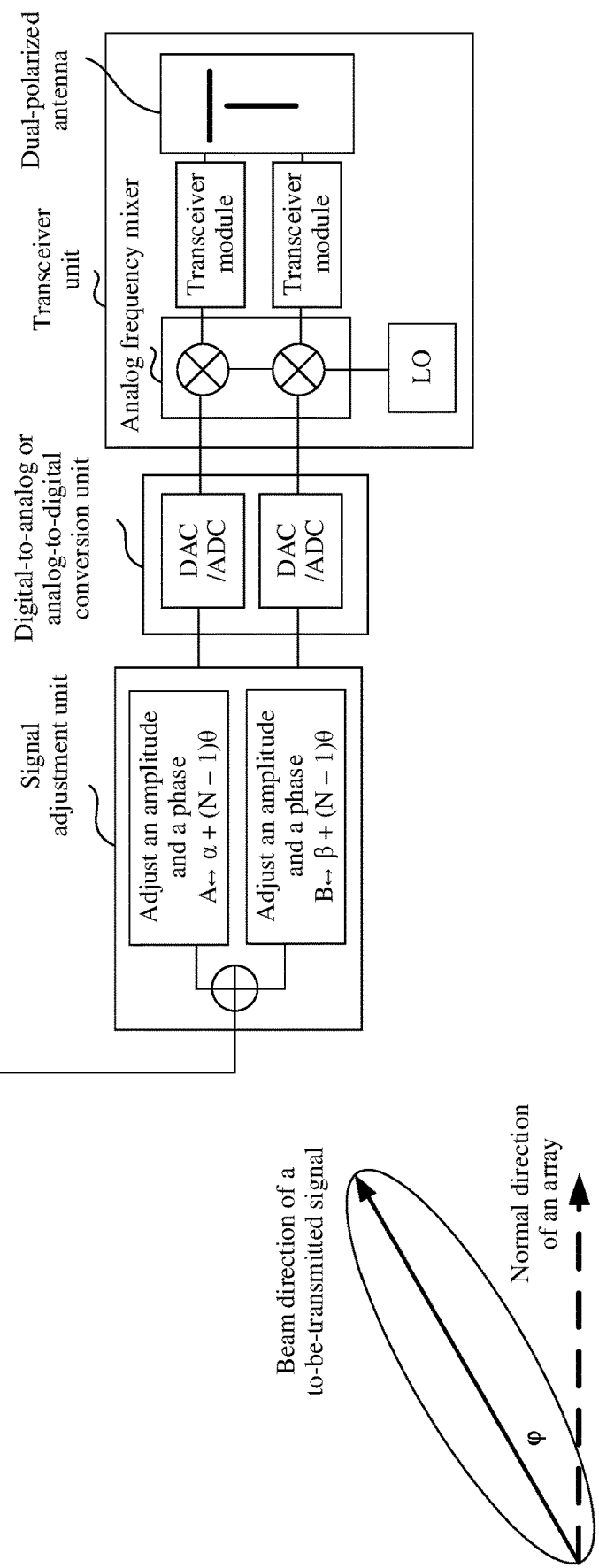
Figure 21A:
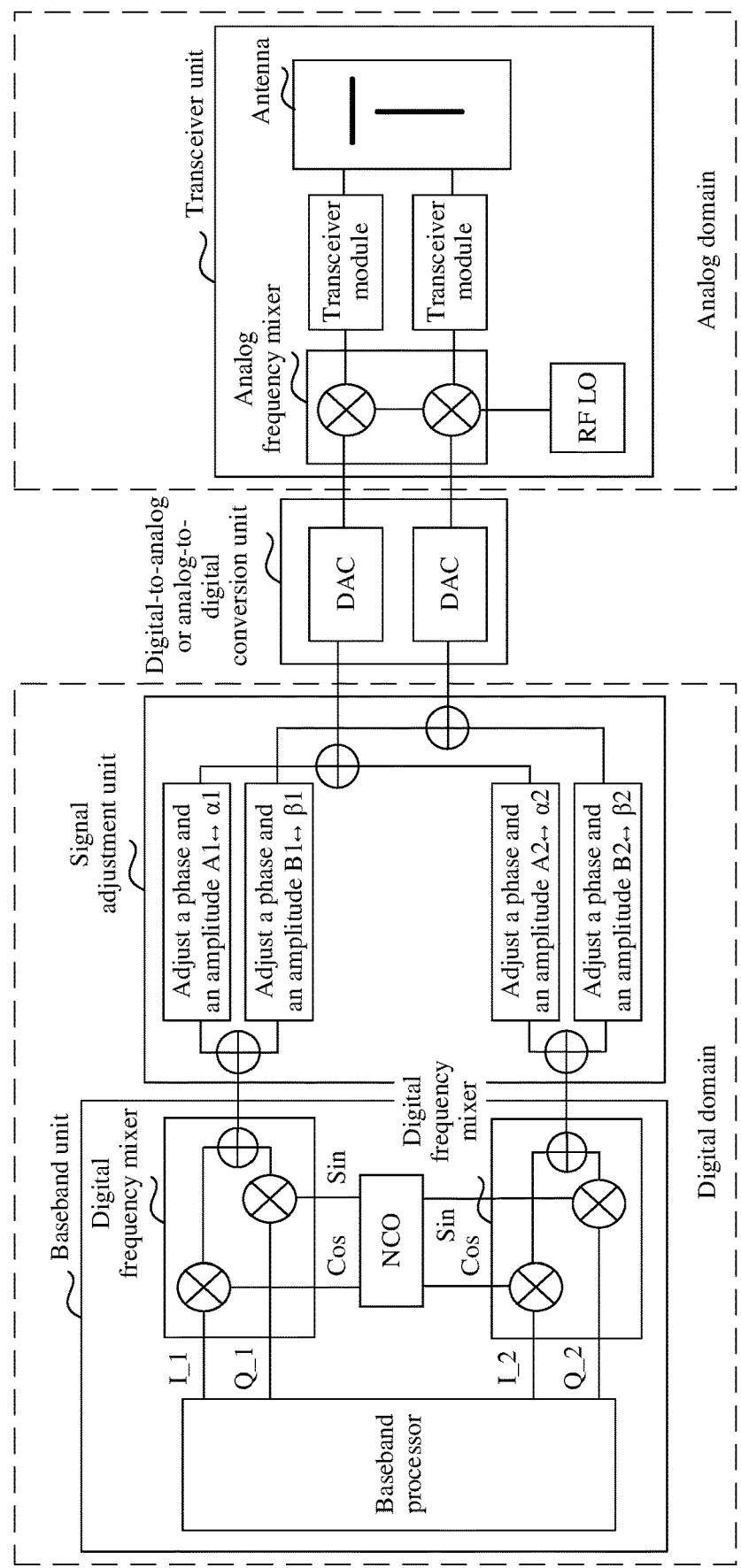
FIG. 21a is a first schematic structural diagram of another communications device according to an embodiment of this application.
Figures 1, 21B:
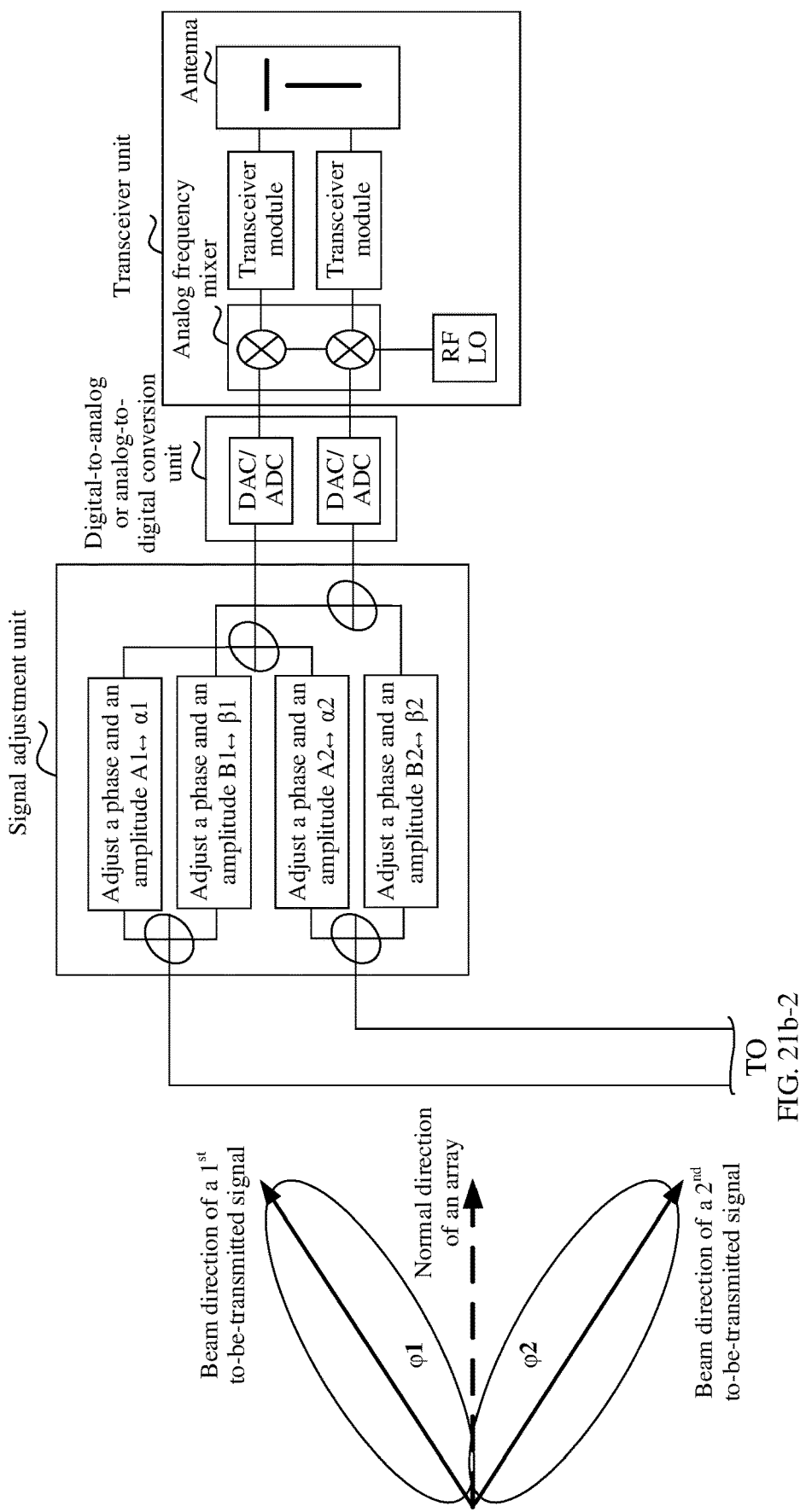
Figures 2, 21B:
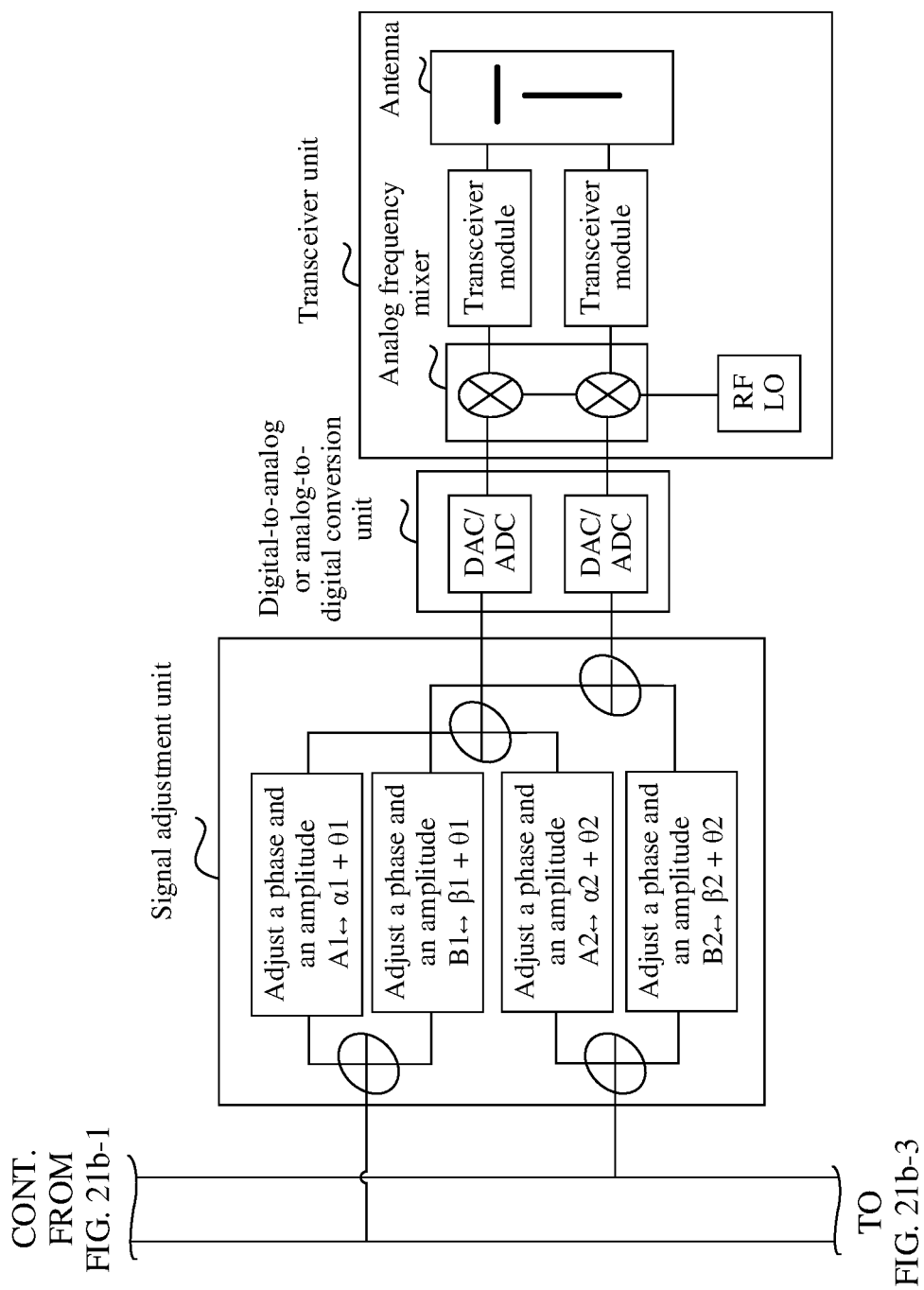
Figures 3, 21B:
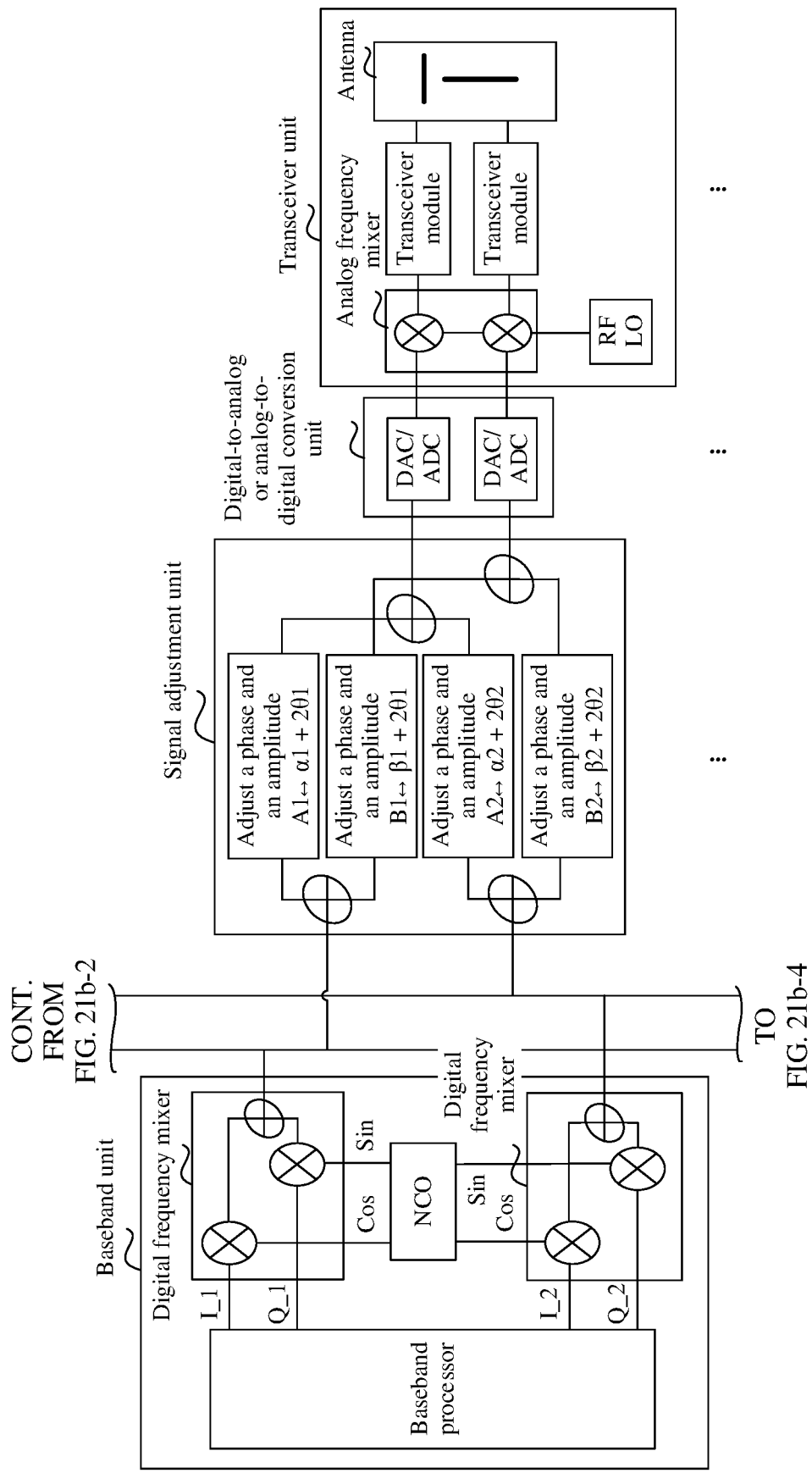
Figures 4, 21B:
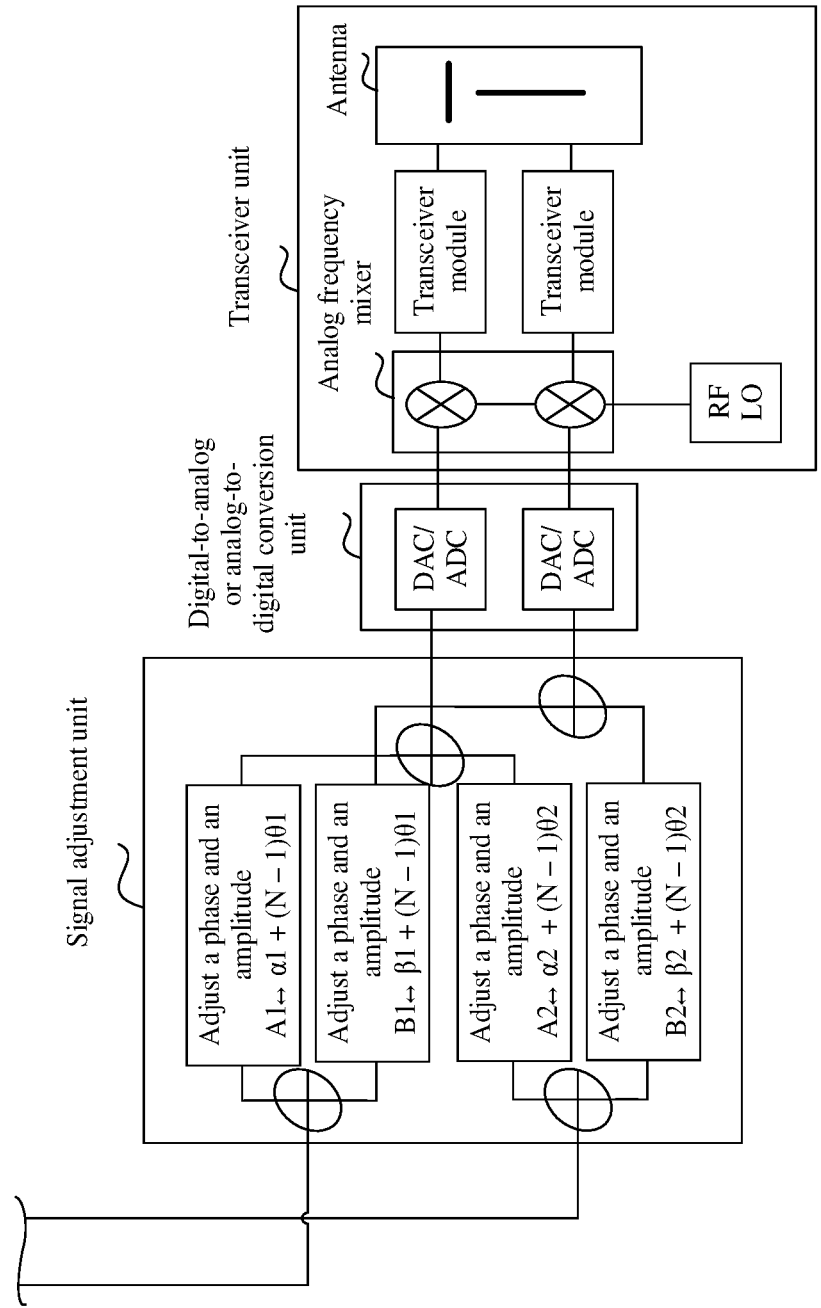

During actual implementation, the polarization reconfigurable apparatus 600 and the polarization reconfigurable apparatus 1400 may be separately disposed in different communications devices, or may be integrated in one communications device, for example, a single-polarized communications device shown in FIG. 20a or a dual-polarized communications device shown in FIG. 20b-1 to FIG. 20b-4. The polarization reconfigurable apparatus 1000 and the polarization reconfigurable apparatus 1700 may be separately disposed in different communications devices, or may be integrated in one communications device, for example, a single-polarized communications device shown in FIG. 21a or a dual-polarized communications device shown in FIG. 21b-1 to FIG. 21b-4.

Figure 22:
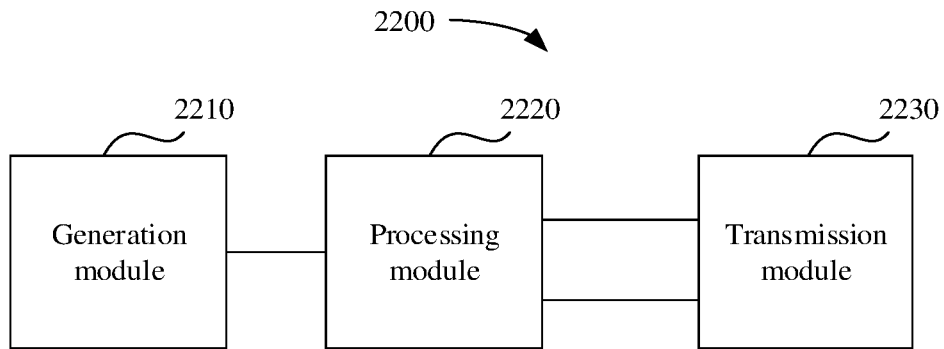
FIG. 22 is a first schematic structural diagram of a fifth polarization reconfigurable apparatus according to an embodiment of this application.

As shown in FIG. 22, this application further provides a polarization reconfigurable apparatus 2200. The polarization reconfigurable apparatus 2200 includes a generation module 2210, a processing module 2220, and a transmission module 2230. The transmission module 2230 includes a first port and a second port. A signal transmitted by the first port is orthogonal to a signal transmitted by the second port.

In a possible implementation, the polarization reconfigurable apparatus 2200 has a structure of the polarization reconfigurable apparatus 600 shown in FIG. 6.

The generation module 2210 is configured to generate a first signal.

The processing module 2220 is configured to: determine a polarization mode of a to-be-transmitted signal, where the polarization mode includes linear polarization, circular polarization, and elliptical polarization, divide the first signal into two first signals, adjust an amplitude and a phase of a $1^{st}$ first signal and an amplitude and a phase of a $2^{nd}$ first signal based on the determined polarization mode, and perform digital-to-analog conversion on an adjusted $1^{st}$ first signal to obtain a second signal, and perform digital-to-analog conversion on an adjusted $2^{nd}$ first signal to obtain a third signal.

The transmission module 2230 is configured to transmit the second signal by using the first port, and transmit the third signal by using the second port. The to-be-transmitted signal is obtained by combining the second signal and the third signal.

Figure 23:
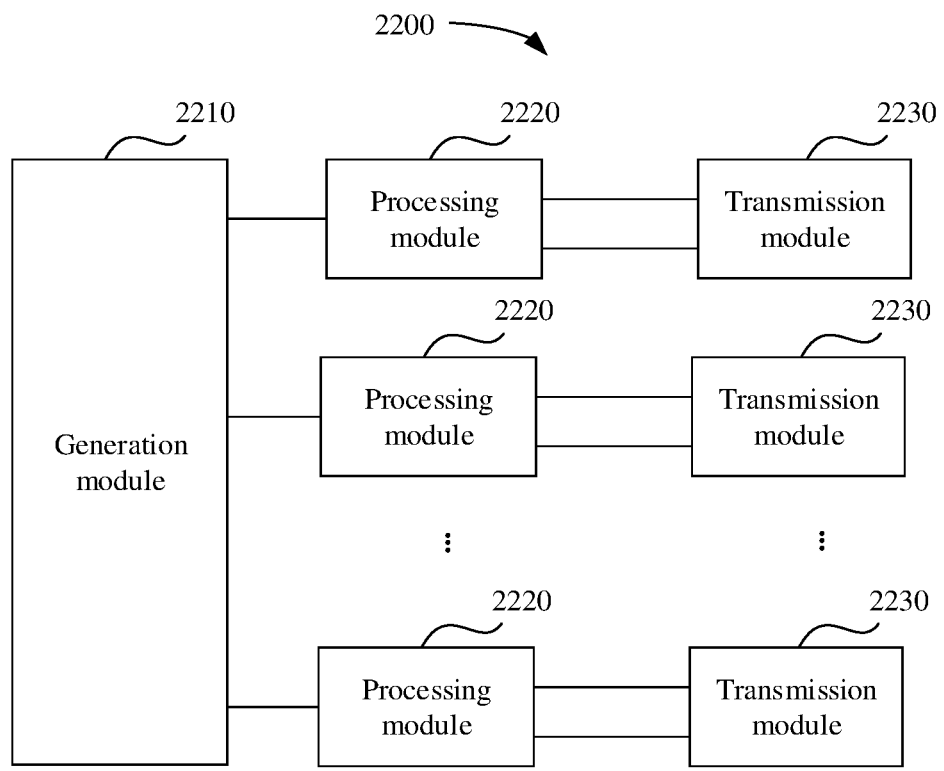
FIG. 23 is a second schematic structural diagram of a fifth polarization reconfigurable apparatus according to an embodiment of this application.

Further, as shown in FIG. 23, the polarization reconfigurable apparatus 2200 includes N transmission modules 2230, and N processing modules 2220 in a one-to-one correspondence with the N transmission modules 2230, where N is an integer greater than or equal to 2. A phase difference between adjusted $1^{st}$ first signals obtained by any two adjacent processing modules 2220 is θ, and a phase difference between adjusted $2^{nd}$ first signals obtained by any two adjacent processing modules 2220 is θ, where θ is determined based on a beam direction of the to-be-transmitted signal.

Further, in a scenario in which the transmission module 2230 includes a dual-polarized antenna and the dual-polarized antenna includes the first port and the second port, when N dual-polarized antennas in the N transmission modules 2230 form a uniformly spaced linear array, θ satisfies the following formula:

$$\theta = k \times d \times \sin \varphi$$

where k is a wave number of a carrier used to carry the to-be-transmitted signal, d is a distance between two adjacent dual-polarized antennas, and φ is an included angle between the beam direction of the to-be-transmitted signal and a normal direction of the linear array.

During specific implementation, when the polarization mode is linear polarization at an angle of $\gamma_1$, a ratio of an amplitude of the adjusted $1^{st}$ first signal to an amplitude of the adjusted $2^{nd}$ first signal is $|\tan \gamma_1|$, and a difference between a phase of the adjusted $1^{st}$ first signal and a phase of the adjusted $2^{nd}$ first signal is an integer multiple of 180°. $\gamma_1$ is an included angle between an electric field direction of the to-be-transmitted signal and a horizontal direction on a plane perpendicular to a propagation direction of the to-be-transmitted signal.

When the polarization mode is circular polarization, a ratio of an amplitude of the adjusted $1^{st}$ first signal to an amplitude of the adjusted $2^{nd}$ first signal is 1, and a difference between a phase of the adjusted $1^{st}$ first signal and a phase of the adjusted $2^{nd}$ first signal is an odd multiple of 90°.

When the polarization mode is elliptical polarization, a ratio of an amplitude of the adjusted $1^{st}$ first signal to an amplitude of the adjusted $2^{nd}$ first signal, and a difference between a phase of the adjusted $1^{st}$ first signal and a phase of the adjusted $2^{nd}$ first signal are determined based on $\gamma_2$ and a ratio of a major axis to a minor axis of an ellipse corresponding to the elliptical polarization mode. $\gamma_2$ is an included angle between the major axis and a horizontal direction on a plane perpendicular to a propagation direction of the to-be-transmitted signal.

In another possible implementation, the polarization reconfigurable apparatus 2200 has a function of the polarization reconfigurable apparatus 1000 shown in FIG. 10.

The generation module 2210 is configured to generate a first signal and a second signal.

The processing module 2220 is configured to: determine a polarization mode of each of two to-be-transmitted signals, where a polarization mode of a $1^{st}$ to-be-transmitted signal includes linear polarization, circular polarization, and elliptical polarization, and a polarization mode of a $2^{nd}$ to-be-transmitted signal includes linear polarization, circular polarization, and elliptical polarization, divide the first signal into two first signals, and divide the second signal into two second signals, separately adjust an amplitude and a phase of a $1^{st}$ first signal and an amplitude and a phase of a $2^{nd}$ first signal based on the polarization mode of the $1^{st}$ to-be-transmitted signal, separately adjust an amplitude and a phase of a $1^{st}$ second signal and an amplitude and a phase of a $2^{nd}$ second signal based on the polarization mode of the $2^{nd}$ to-be-transmitted signal, combine an adjusted $1^{st}$ first signal and an adjusted $1^{st}$ second signal into a third signal, and combine an adjusted $2^{nd}$ first signal and an adjusted $2^{nd}$ second signal into a fourth signal, and perform digital-to-analog conversion on the third signal to obtain a fifth signal, and perform digital-to-analog conversion on the fourth signal to obtain a sixth signal.

The transmission module 2230 is configured to transmit the fifth signal by using the first port, and transmit the sixth signal by using the second port.

Further, when the polarization reconfigurable apparatus 2200 includes one transmission module 2230, the polarization mode of the $1^{st}$ to-be-transmitted signal is orthogonal to the polarization mode of the $2^{nd}$ to-be-transmitted signal. The polarization mode of the $1^{st}$ to-be-transmitted signal is vertical linear polarization, and the polarization mode of the $2^{nd}$ to-be-transmitted signal is horizontal linear polarization, or the polarization mode of the $1^{st}$ to-be-transmitted signal is horizontal linear polarization, and the polarization mode of the $2^{nd}$ to-be-transmitted signal is vertical linear polarization, or the polarization mode of the $1^{st}$ to-be-transmitted signal is +45° linear polarization, and the polarization mode of the $2^{nd}$ to-be-transmitted signal is −45° linear polarization, or the polarization mode of the $1^{st}$ to-be-transmitted signal is −45° linear polarization, and the polarization mode of the $2^{nd}$ to-be-transmitted signal is +45° linear polarization, or the polarization mode of the $1^{st}$ to-be-transmitted signal is left-handed circular polarization, and the polarization mode of the $2^{nd}$ to-be-transmitted signal is right-handed circular polarization, or the polarization mode of the $1^{st}$ to-be-transmitted signal is right-handed circular polarization, and the polarization mode of the $2^{nd}$ to-be-transmitted signal is left-handed circular polarization.

Further, to eliminate cross-polarization interference, when the polarization mode of the $1^{st}$ to-be-transmitted signal is horizontal linear polarization and the polarization mode of the $2^{nd}$ to-be-transmitted signal is vertical linear polarization, a ratio of an amplitude A1 of the adjusted $1^{st}$ first signal to an amplitude B1 of the adjusted $2^{nd}$ first signal, and a difference between a phase α1 of the adjusted $1^{st}$ first signal and a phase β1 of the adjusted $2^{nd}$ first signal satisfy the following conditions:

$$\frac{A_1}{B_1} = \frac{A_{VV}}{A_{HV}}$$

$$\alpha_1 - \beta_1 = \theta_{VV} - \theta_{HV} + n*180°$$

where $A_{VV}$ is an amplitude of a vertically linearly polarized reference signal received by a first port of a receive end, $\theta_{VV}$ is a phase of the vertically linearly polarized reference signal received by the first port of the receive end, $A_{HV}$ is an amplitude of a horizontally linearly polarized reference signal received by the first port of the receive end, $\theta_{HV}$ is a phase of the horizontally linearly polarized reference signal received by the first port of the receive end, n is an odd number, the first port of the receive end is configured to receive a vertically linearly polarized signal, the vertically linearly polarized reference signal and the horizontally linearly polarized reference signal are reference signals sent by the apparatus, and the receive end is configured to receive the $1^{st}$ to-be-transmitted signal and the $2^{nd}$ to-be-transmitted signal, and a ratio of an amplitude A2 of the adjusted $1^{st}$ second signal to an amplitude B2 of the adjusted $2^{nd}$ second signal, and a difference between a phase α2 of the adjusted $1^{st}$ second signal and a phase β2 of the adjusted $2^{nd}$ second signal satisfy the following conditions:

$$\frac{A_2}{B_2} = \frac{A_{VH}}{A_{HH}}$$

$$\alpha_2 - \beta_2 = \theta_{VH} - \theta_{HH} + m*180°$$

where $A_{VH}$ is an amplitude of a vertically linearly polarized reference signal received by a second port of the receive end, $\theta_{VH}$ is a phase of the vertically linearly polarized reference signal received by the second port of the receive end, $A_{HH}$ is an amplitude of a horizontally linearly polarized reference signal received by the second port of the receive end, $\theta_{HH}$ is a phase of the horizontally linearly polarized reference signal received by the second port of the receive end, m is an odd number, and the second port of the receive end is configured to receive a horizontally linearly polarized signal.

Further, as shown in FIG. 23, the polarization reconfigurable apparatus 2200 may include N transmission modules 2230, and N processing modules 2230 in a one-to-one correspondence with the N transmission modules 2230, where N is an integer greater than or equal to 2. A phase difference between adjusted $1^{st}$ first signals obtained by any two adjacent processing modules 2220 is θ1, and a phase difference between adjusted $2^{nd}$ first signals obtained by any two adjacent processing modules 2220 is θ1, where θ1 is determined based on a beam direction of the $1^{st}$ to-be-transmitted signal. A phase difference between adjusted $1^{st}$ second signals obtained by any two adjacent processing modules 2220 is θ2, and a phase difference between adjusted $2^{nd}$ second signals obtained by any two adjacent processing modules 2220 is θ2, where θ2 is determined based on a beam direction of the $2^{nd}$ to-be-transmitted signal.

Specifically, in a scenario in which the transmission module 2230 includes a dual-polarized antenna and the dual-polarized antenna includes the first port and the second port, when N dual-polarized antennas in the N transmission modules 2230 form a uniformly spaced linear array, θ1 and θ2 satisfy the following formulas:

$$\theta 1 = k1 \times d \times \sin \varphi 1$$

$$\theta 2 = k2 \times d \times \sin \varphi 2$$

where k1 is a wave number of a carrier that carries the $1^{st}$ to-be-transmitted signal, d is a distance between two adjacent dual-polarized antennas, φ1 is an included angle between the beam direction of the $1^{st}$ to-be-transmitted signal and a normal direction of the linear array, k2 is a wave number of a carrier that carries the $2^{nd}$ to-be-transmitted signal, and φ2 is an included angle between the beam direction of the $2^{nd}$ to-be-transmitted signal and the normal direction of the linear array.

Figure 24:
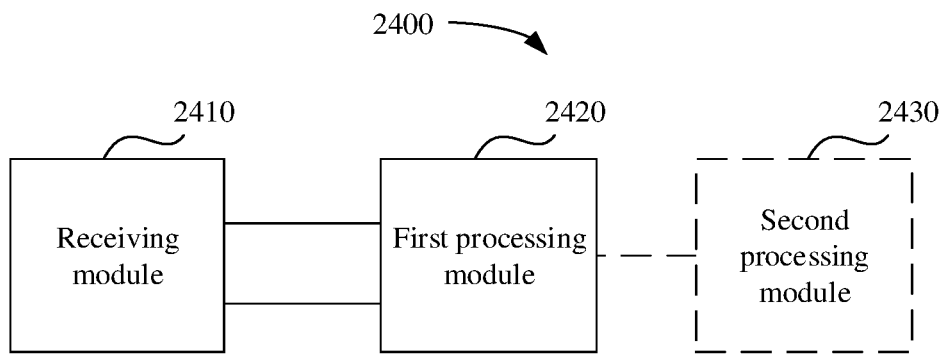
FIG. 24 is a first schematic structural diagram of a sixth polarization reconfigurable apparatus according to an embodiment of this application.

As shown in FIG. 24, this application further provides a polarization reconfigurable apparatus 2400. The polarization reconfigurable apparatus 2400 includes a receiving module 2410 and a first processing module 2420. The receiving module 2410 includes a first port and a second port. A signal received by the first port is orthogonal to a signal received by the second port.

In a possible implementation, the polarization reconfigurable apparatus 2400 has a function of the polarization reconfigurable apparatus 1400 shown in FIG. 14.

The receiving module 2410 is configured to receive a first signal by using the first port, and receive a second signal by using the second port. The first signal is a component of a third signal in a direction corresponding to the first port. The second signal is a component of the third signal in a direction corresponding to the second port.

The first processing module 2420 is configured to: determine a polarization mode of the third signal, where the polarization mode includes linear polarization, circular polarization, and elliptical polarization, adjust an amplitude and a phase of the fourth signal and an amplitude and a phase of the fifth signal based on the determined polarization mode, and combine an adjusted fourth signal and an adjusted fifth signal into a sixth signal.

The first processing module 2420 may specifically determine the polarization mode of the third signal based on preconfigured information about the polarization mode of the third signal, or obtain the polarization mode of the third signal by measuring a signal transmitted by a transmit end.

During specific implementation, when the polarization mode of the third signal is linear polarization at an angle of $\gamma_1$ ($\gamma_1 \in (-90°, 90)$, and $\gamma_3 != 0°$), a ratio of an amplitude A of the adjusted fourth signal to an amplitude B of the adjusted fifth signal is |tan γ₃|. When γ₁>0, a difference between a phase α of the adjusted fourth signal and a phase β of the adjusted fifth signal is an even multiple of 180°, or when γ₁<0, a difference between a phase α of the adjusted fourth signal and a phase β of the adjusted fifth signal is an odd multiple of 180°. γ₁ is an included angle between an electric field direction of the third signal and a horizontal direction on a plane perpendicular to a propagation direction of the third signal.

When the polarization mode of the third signal is circular polarization, a ratio of an amplitude A of the adjusted fourth signal to an amplitude B of the adjusted fifth signal is 1, and a difference between a phase α of the adjusted fourth signal and a phase β of the adjusted fifth signal is an odd multiple of 90°.

When the polarization mode of the third signal is elliptical polarization, α−β and a ratio A/B of an amplitude A of the adjusted fourth signal to an amplitude B of the adjusted fifth signal are determined based on γ₂ and a ratio AR(a/b) of a major axis to a minor axis of an ellipse corresponding to the elliptical polarization mode. γ₂ is an included angle between the major axis and a horizontal direction on a plane perpendicular to a propagation direction of the to-be-transmitted signal (namely, a tilt angle of the ellipse).

During specific implementation, as shown in FIG. 24, the polarization reconfigurable apparatus 2400 may further include a second processing module 2430, and the second processing module 2430 is configured to process the sixth signal.

Figure 25:
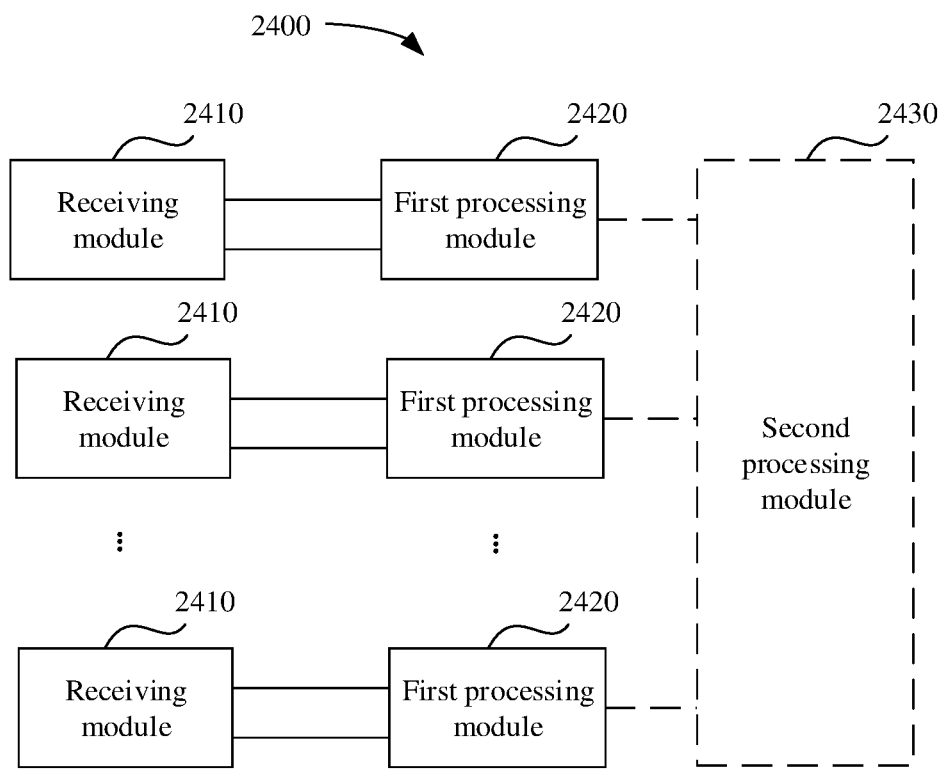
FIG. 25 is a second schematic structural diagram of a sixth polarization reconfigurable apparatus according to an embodiment of this application.

Further, as shown in FIG. 25, the polarization reconfigurable apparatus 2400 may include N receiving modules 2410, and N first processing modules 2420 in a one-to-one correspondence with the N receiving modules 2410, where N is an integer greater than or equal to 2. A phase difference between adjusted fourth signals obtained by any two adjacent first processing modules 2420 is θ, and a phase difference between adjusted fifth signals obtained by any two adjacent first processing modules 2420 is θ, where θ is determined based on a beam direction of the third signal. In other words, the polarization reconfigurable apparatus 2400 may further control the beam direction of the third signal.

In this case, the second processing module 2430 is further configured to combine N sixth signals obtained by the N first processing modules 2420 into a seventh signal, and process the seventh signal.

In a scenario in which the receiving module 2410 includes a dual-polarized antenna and the dual-polarized antenna includes the first port and the second port, when N dual-polarized antennas in the N receiving modules 2410 form a uniformly spaced linear array, θ satisfies the following formula:

θ=k×d×sin φ where k is a wave number of a carrier used to carry the third signal, d is a distance between two adjacent dual-polarized antennas, and φ is an included angle between the beam direction of the third signal and a normal direction of the linear array.

In another possible implementation, the polarization reconfigurable apparatus 2400 has a function of the polarization reconfigurable apparatus 1700 shown in FIG. 17.

The receiving module 2410 is configured to receive a first signal by using the first port, and receive a second signal by using the second port. The first signal is a sum of a component of a third signal in a direction corresponding to the first port and a component of a fourth signal in the direction corresponding to the first port. The second signal is a sum of a component of the third signal in a direction corresponding to the second port and a component of the fourth signal in the direction corresponding to the second port.

The first processing module 2420 is configured to: perform analog-to-digital conversion on the first signal to obtain a fifth signal, and perform analog-to-digital conversion on the second signal to obtain a sixth signal, determine a polarization mode of the third signal and a polarization mode of the fourth signal, where the polarization mode of the third signal includes linear polarization, circular polarization, and elliptical polarization, and the polarization mode of the fourth signal includes linear polarization, circular polarization, and elliptical polarization, divide the fifth signal into two fifth signals, and divide the sixth signal into two sixth signals, adjust an amplitude and a phase of a $1^{st}$ fifth signal and an amplitude and a phase of a $1^{st}$ sixth signal based on the polarization mode of the third signal, and combine an adjusted $1^{st}$ fifth signal and an adjusted $1^{st}$ sixth signal into a seventh signal, and adjust an amplitude and a phase of a $2^{nd}$ fifth signal and an amplitude and a phase of a $2^{nd}$ sixth signal based on the polarization mode of the fourth signal, and combine an adjusted $2^{nd}$ fifth signal and an adjusted $2^{nd}$ sixth signal into an eighth signal.

The first processing module 2420 may specifically determine the polarization mode of the third signal based on preconfigured information about the polarization mode of the third signal, and determine the polarization mode of the fourth signal based on preconfigured information about the polarization mode of the fourth signal, or obtain the polarization mode of the third signal and the polarization mode of the fourth signal by measuring a signal transmitted by a transmit end.

Further, as shown in FIG. 24, the polarization reconfigurable apparatus 2400 may further include a second processing module 2430, and the second processing module 2430 is configured to process the seventh signal and the eighth signal.

In a scenario in which the polarization reconfigurable apparatus 2400 includes one receiving module 2410, the polarization mode of the third signal is orthogonal to the polarization mode of the fourth signal. The polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Further, as shown in FIG. 25, the polarization reconfigurable apparatus 2400 may include N receiving modules 2410, and N first processing modules 2420 in a one-to-one correspondence with the N receiving modules 2410, where N is an integer greater than or equal to 2. A phase difference between adjusted $1^{st}$ fifth signals obtained by any two adjacent first processing modules 2420 is θ1, and a phase difference between adjusted $1^{st}$ sixth signals obtained by any two adjacent first processing modules 2420 is θ1, where θ1 is determined based on a beam direction of the third signal. A phase difference between adjusted $2^{nd}$ fifth signals obtained by any two adjacent first processing modules 2420 is θ2, and a phase difference between adjusted $2^{nd}$ sixth signals obtained by any two adjacent first processing modules 2420 is θ2, where θ2 is determined based on a beam direction of the fourth signal. In other words, the polarization reconfigurable apparatus 2400 may further separately control the beam direction of the third signal and the beam direction of the fourth signal.

In this case, the second processing module 2430 is further configured to combine N seventh signals obtained by the N first processing modules 2420 into a ninth signal, combine N eighth signals obtained by the N first processing modules 2420 into a tenth signal, and process the ninth signal and the tenth signal.

It should be noted that, in the scenario in which the polarization reconfigurable apparatus 2400 includes the N receiving modules 2410 and the N first processing modules 2420, conditions met by the amplitude and the phase of the adjusted $1^{st}$ fifth signal and the amplitude and the phase of the adjusted $1^{st}$ sixth signal when the polarization mode of the third signal is linear polarization, circular polarization, or elliptical polarization, and conditions met by the amplitude and the phase of the adjusted $2^{nd}$ fifth signal and the amplitude and the phase of the adjusted $2^{nd}$ sixth signal when the polarization mode of the fourth signal is linear polarization, circular polarization, or elliptical polarization are the same as the conditions met by the amplitude and the phase of the adjusted fourth signal and the amplitude and the phase of the adjusted fifth signal when the third signal in the polarization reconfigurable apparatus 2400 in the foregoing first possible implementation provided in this application is in the corresponding polarization mode. Details are not described herein again.

In a scenario in which the receiving module 2410 includes a dual-polarized antenna, and the dual-polarized antenna includes the first port and the second port, and is configured to receive the first signal by using the first port and receive the second signal by using the second port, when N dual-polarized antennas in the N receiving modules 2410 form a uniformly spaced linear array, θ1 and θ2 satisfy the following formulas:

$$\theta 1 = k1 \times d \times \sin \varphi 1$$

$$\theta 2 = k2 \times d \times \sin \varphi 2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the third signal, and φ2 is an included angle between the beam direction of the fourth signal and the normal direction of the linear array.

Figure 26:
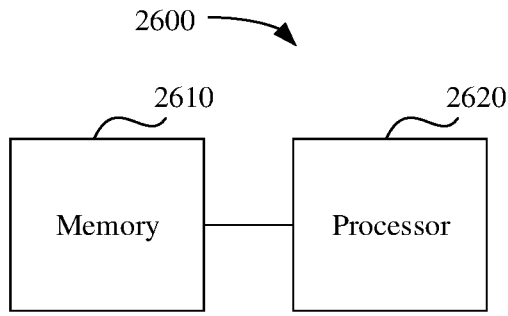
FIG. 26 is a second schematic structural diagram of still another communications device according to an embodiment of this application.

As shown in FIG. 26, this application further provides a communications device 2600. The communications device 2600 includes a memory 2610 and a processor 2620

The memory 2610 may include a volatile memory, for example, a random access memory (RAM), or the memory may include a non-volatile memory, for example, a flash memory, a hard disk drive (HDD), or a solid-state drive (SSD), or the memory 2610 may include a combination of the foregoing types of memories.

The processor 2620 may be a central processing unit (CPU), a network processor (NP), or a combination of a CPU and an NP. The processor 2620 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

In a first possible implementation, the communications device 2600 has a function of the polarization reconfigurable apparatus 600 shown in FIG. 6.

The memory 2610 stores code instructions.

The processor 2620 is configured to invoke the code instructions stored in the memory to perform the following operations: generating a first signal, determining a polarization mode of a to-be-transmitted signal, where the polarization mode includes linear polarization, circular polarization, and elliptical polarization, dividing the first signal into 2N first signals, where N is a positive integer, adjusting an amplitude and a phase of a $(2i-1)^{th}$ first signal and an amplitude and a phase of a $2i^{th}$ first signal based on the determined polarization mode, where i=1, . . . , N, and performing digital-to-analog conversion on an adjusted $(2i-1)^{th}$ first signal to obtain a $(2i-1)^{th}$ second signal, and performing digital-to-analog conversion on an adjusted $2i^{th}$ first signal to obtain a $2i^{th}$ third signal.

In this case, the $(2i-1)^{th}$ second signal is transmitted by using a $(2i-1)^{th}$ port of a transceiver in the communications device 2600, and the $2i^{th}$ third signal is transmitted by using a $2i^{th}$ port of the transceiver in the communications device 2600. The signal transmitted by the $(2i-1)^{th}$ port is orthogonal to the signal transmitted by the $2i^{th}$ port. The transceiver includes 2N ports.

Further, when N is greater than 1, a phase difference between the adjusted $(2i-1)^{th}$ first signal and an adjusted $(2i+1)^{th}$ first signal is θ, and a phase difference between the adjusted $2i^{th}$ first signal and an adjusted $(2i+2)^{th}$ first signal is θ, where θ is determined based on a beam direction of the to-be-transmitted signal. In other words, the processor 2620 may further control the beam direction of the to-be-transmitted signal.

Further, the transceiver in the communications device 2600 includes N dual-polarized antennas, and an $i^{th}$ dual-polarized antenna includes the $(2i-1)^{th}$ port and the $2i^{th}$ port. When the N dual-polarized antennas form a uniformly spaced linear array, θ satisfies the following formula:

$$\theta = k \times d \times \sin \varphi$$

where k is a wave number of a carrier used to carry the to-be-transmitted signal, d is a distance between two adjacent dual-polarized antennas, and φ is an included angle between the beam direction of the to-be-transmitted signal and a normal direction of the linear array.

During specific implementation, when the polarization mode is linear polarization at an angle of $\gamma_1$, a ratio of an amplitude of the adjusted $(2i-1)^{th}$ first signal to an amplitude of the adjusted $2i^{th}$ first signal is |tan γ1|, and a difference between a phase of the adjusted $(2i-1)^{th}$ first signal and a phase of the adjusted $2i^{th}$ first signal is an integer multiple of 180°. $\gamma_1$ is an included angle between an electric field direction of the to-be-transmitted signal and a horizontal direction on a plane perpendicular to a propagation direction of the to-be-transmitted signal.

When the polarization mode is circular polarization, a ratio of an amplitude of the adjusted $(2i-1)^{th}$ first signal to an amplitude of the adjusted $2i^{th}$ first signal is 1, and a difference between a phase of the adjusted $(2i-1)^{th}$ first signal and a phase of the adjusted $2i^{th}$ first signal is an odd multiple of 90°.

When the polarization mode is elliptical polarization, a ratio of an amplitude of the adjusted $(2i-1)^{th}$ first signal to an amplitude of the adjusted $2i^{th}$ first signal, and a difference between a phase of the adjusted $(2i-1)^{th}$ first signal and a phase of the adjusted $2i^{th}$ first signal are determined based on $\gamma_2$ and a ratio of a major axis to a minor axis of an ellipse corresponding to the elliptical polarization mode. $\gamma_2$ is an included angle between the major axis and a horizontal direction on a plane perpendicular to a propagation direction of the to-be-transmitted signal.

In a second possible implementation, the communications device has a function of the polarization reconfigurable apparatus 1000 shown in FIG. 10.

The memory 2610 stores code instructions.

The processor 2620 is configured to invoke the code instructions stored in the memory 2610 to perform the following operations: generating a first signal and a second signal, determining a polarization mode of each of two to-be-transmitted signals, where a polarization mode of a $1^{st}$ to-be-transmitted signal includes linear polarization, circular polarization, and elliptical polarization, and a polarization mode of a $2^{nd}$ to-be-transmitted signal includes linear polarization, circular polarization, and elliptical polarization, dividing the first signal into 2N first signals, and dividing the second signal into 2N second signals, where N is a positive integer, separately adjusting an amplitude and a phase of a $(2i-1)^{th}$ first signal and an amplitude and a phase of a $2i^{th}$ first signal based on the polarization mode of the $1^{st}$ to-be-transmitted signal, where i=1, . . . , N, separately adjusting an amplitude and a phase of a $(2i-1)^{th}$ second signal and an amplitude and a phase of a $2i^{th}$ second signal based on the polarization mode of the $2^{nd}$ to-be-transmitted signal, combining an adjusted $(2i-1)^{th}$ first signal and an adjusted $(2i-1)^{th}$ second signal into an $i^{th}$ third signal, and combining an adjusted $2i^{th}$ first signal and an adjusted $2i^{th}$ second signal into an $i^{th}$ fourth signal, and performing digital-to-analog conversion on the $i^{th}$ third signal to obtain an $i^{th}$ fifth signal, and performing digital-to-analog conversion on the $i^{th}$ fourth signal to obtain an $i^{th}$ sixth signal.

In this case, the $i^{th}$ fifth signal is transmitted by using a $(2i-1)^{th}$ port of a transceiver in the communications device, and the $i^{th}$ sixth signal is transmitted by using a $2i^{th}$ port of the transceiver in the communications device. The signal transmitted by the $(2i-1)^{th}$ port is orthogonal to the signal transmitted by the $2i^{th}$ port.

When N=1, the polarization mode of the $1^{st}$ to-be-transmitted signal is orthogonal to the polarization mode of the $2^{nd}$ to-be-transmitted signal. Specifically, the polarization mode of the $1^{st}$ to-be-transmitted signal is vertical linear polarization, and the polarization mode of the $2^{nd}$ to-be-transmitted signal is horizontal linear polarization, or the polarization mode of the $1^{st}$ to-be-transmitted signal is horizontal linear polarization, and the polarization mode of the $2^{nd}$ to-be-transmitted signal is vertical linear polarization, or the polarization mode of the $1^{st}$ to-be-transmitted signal is +45° linear polarization, and the polarization mode of the $2^{nd}$ to-be-transmitted signal is −45° linear polarization, or the polarization mode of the $1^{st}$ to-be-transmitted signal is −45° linear polarization, and the polarization mode of the $2^{nd}$ to-be-transmitted signal is +45° linear polarization, or the polarization mode of the $1^{st}$ to-be-transmitted signal is left-handed circular polarization, and the polarization mode of the $2^{nd}$ to-be-transmitted signal is right-handed circular polarization, or the polarization mode of the $1^{st}$ to-be-transmitted signal is right-handed circular polarization, and the polarization mode of the $2^{nd}$ to-be-transmitted signal is left-handed circular polarization.

Further, when the polarization mode of the $1^{st}$ to-be-transmitted signal is horizontal linear polarization and the polarization mode of the $2^{nd}$ to-be-transmitted signal is vertical linear polarization, a ratio of an amplitude A1 of an adjusted $1^{st}$ first signal to an amplitude B1 of an adjusted $2^{nd}$ first signal, and a difference between a phase $\alpha 1$ of the adjusted $1^{st}$ first signal and a phase $\beta 1$ of the adjusted $2^{nd}$ first signal satisfy the following conditions:

$$\frac{A_1}{B_1} = \frac{A_{VV}}{A_{HV}}$$

$$\alpha_1 - \beta_1 = \theta_{VV} - \theta_{HV} + n*180°$$

where $A_{VV}$ is an amplitude of a vertically linearly polarized reference signal received by a first port of a second communications device, $\theta_{VV}$ is a phase of the vertically linearly polarized reference signal received by the first port of the second communications device, $A_{HV}$ is an amplitude of a horizontally linearly polarized reference signal received by the first port of the second communications device, $\theta_{HV}$ is a phase of the horizontally linearly polarized reference signal received by the first port of the second communications device, n is an odd number, the first port of the second communications device is configured to receive a vertically linearly polarized signal, the vertically linearly polarized reference signal and the horizontally linearly polarized reference signal are reference signals sent by the first communications device, and the second communications device is configured to receive the $1^{st}$ to-be-transmitted signal and the $2^{nd}$ to-be-transmitted signal, and a ratio of an amplitude A2 of an adjusted $1^{st}$ second signal to an amplitude B2 of an adjusted $2^{nd}$ second signal, and a difference between a phase $\alpha 2$ of the adjusted $1^{st}$ second signal and a phase $\beta 2$ of the adjusted $2^{nd}$ second signal satisfy the following conditions:

$$\frac{A_2}{B_2} = \frac{A_{VH}}{A_{HH}}$$

$$\alpha_2 - \beta_2 = \theta_{VH} - \theta_{HH} + m*180°$$

where $A_{VH}$ is an amplitude of a vertically linearly polarized reference signal received by a second port of the second communications device, $\theta_{VH}$ is a phase of the vertically linearly polarized reference signal received by the second port of the second communications device, $A_{HH}$ is an amplitude of a horizontally linearly polarized reference signal received by the second port of the second communications device, $\theta_{HH}$ is a phase of the horizontally linearly polarized reference signal received by the second port of the second communications device, m is an odd number, and the second port of the second communications device is configured to receive a horizontally linearly polarized signal.

Further, when N is greater than 1, a phase difference between the adjusted $(2i-1)^{th}$ first signal and the adjusted $2i^{th}$ first signal is $\theta 1$, where $\theta 1$ is determined based on a beam direction of the $1^{st}$ to-be-transmitted signal, and a phase difference between the adjusted $(2i-1)^{th}$ second signal and the adjusted $2i^{th}$ second signal is $\theta 2$, where $\theta 2$ is determined based on a beam direction of the $2^{nd}$ to-be-transmitted signal.

Further, in a scenario in which the transceiver in the communications device 2600 includes N dual-polarized antennas and an $i^{th}$ dual-polarized antenna includes the $(2i-1)^{th}$ port and the $2i^{th}$ port, when the N dual-polarized antennas form a uniformly spaced linear array, θ1 and θ2 satisfy the following formulas:

$$\theta 1 = k1 \times d \times \sin \varphi 1$$

$$\theta 2 = k2 \times d \times \sin \varphi 2$$

where k1 is a wave number of a carrier that carries the $1^{st}$ to-be-transmitted signal, d is a distance between two adjacent dual-polarized antennas, φ1 is an included angle between the beam direction of the $1^{st}$ to-be-transmitted signal and a normal direction of the linear array, k2 is a wave number of a carrier that carries the $2^{nd}$ to-be-transmitted signal, and φ2 is an included angle between the beam direction of the $2^{nd}$ to-be-transmitted signal and the normal direction of the linear array.

In a third possible implementation, the communications device 2600 has a function of the polarization reconfigurable apparatus 1400 shown in FIG. 14.

The memory 2610 stores code instructions.

The processor 2620 is configured to invoke the code instructions stored in the memory 2610 to perform the following operations: performing analog-to-digital conversion on an $i^{th}$ first signal to obtain an $i^{th}$ second signal, where i=1, . . . , N, N is a positive integer, and the $i^{th}$ first signal is a component of a third signal in a direction corresponding to a $(2i-1)^{th}$ port, performing analog-to-digital conversion on an $i^{th}$ fourth signal to obtain an $i^{th}$ fifth signal, where the $i^{th}$ fourth signal is a component of the third signal in a direction corresponding to a $2i^{th}$ port, determining a polarization mode of the third signal, where the polarization mode includes linear polarization, circular polarization, and elliptical polarization, adjusting an amplitude and a phase of the $i^{th}$ second signal and an amplitude and a phase of the $i^{th}$ fifth signal based on the determined polarization mode, and combining an adjusted $i^{th}$ second signal and an adjusted $i^{th}$ fifth signal into an $i^{th}$ sixth signal.

The processor 2620 may specifically determine the polarization mode of the third signal based on preconfigured information about the polarization mode of the third signal, or obtain the polarization mode of the third signal by measuring a signal transmitted by a transmit end.

The $i^{th}$ first signal is received by a transceiver in the communications device by using the $(2i-1)^{th}$ port, and the $i^{th}$ fourth signal is received by the transceiver in the communications device by using the $2i^{th}$ port. The signal received by the $(2i-1)^{th}$ port is orthogonal to the signal received by the $2i^{th}$ port.

During specific implementation, when the polarization mode of the third signal is linear polarization at an angle of $\gamma_1$ ($\gamma_1 \in (-90°, 90°)$, and $\gamma_3 \neq 0°$), a ratio of an amplitude A of the adjusted $i^{th}$ second signal to an amplitude B of the adjusted $i^{th}$ fifth signal is $|\tan \gamma_3|$. When $\gamma_1 > 0$, a difference between a phase α of the adjusted $i^{th}$ second signal and a phase β of the adjusted $i^{th}$ fifth signal is an even multiple of 180°, or when $\gamma_1 < 0$, a difference between a phase α of the adjusted $i^{th}$ second signal and a phase β of the adjusted $i^{th}$ fifth signal is an odd multiple of 180°. $\gamma_1$ is an included angle between an electric field direction of the third signal and a horizontal direction on a plane perpendicular to a propagation direction of the third signal.

For example, when the polarization mode of the third signal is +45° linear polarization, the ratio of the amplitude A of the adjusted $i^{th}$ second signal to the amplitude B of the adjusted $i^{th}$ fifth signal is 1, and the difference between the phase α of the adjusted $i^{th}$ second signal and the phase β of the adjusted $i^{th}$ fifth signal is an even multiple of 180°, or when the polarization mode of the third signal is −45° linear polarization, the ratio of the amplitude A of the adjusted $i^{th}$ second signal to the amplitude B of the adjusted $i^{th}$ fifth signal is 1, and the difference between the phase α of the adjusted $i^{th}$ second signal and the phase β of the adjusted $i^{th}$ fifth signal is an odd multiple of 180°.

When the polarization mode of the third signal is circular polarization, a ratio of an amplitude A of the adjusted $i^{th}$ second signal to an amplitude B of the adjusted $i^{th}$ fifth signal is 1, and a difference between a phase α of the adjusted $i^{th}$ second signal and a phase β of the adjusted $i^{th}$ fifth signal is an odd multiple of 90°.

When the polarization mode of the third signal is elliptical polarization, a ratio A/B of an amplitude A of the adjusted $i^{th}$ second signal to an amplitude B of the adjusted $i^{th}$ fifth signal, and a difference α−β between a phase α of the adjusted $i^{th}$ second signal and a phase β of the adjusted $i^{th}$ fifth signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

Further, when N is greater than 1, a difference between a phase of the adjusted $i^{th}$ second signal and a phase of an adjusted $(i+1)^{th}$ second signal is θ, and a difference between a phase of the adjusted $i^{th}$ fifth signal and a phase of an adjusted $(i+1)^{th}$ fifth signal, where θ is determined based on a beam direction of the third signal. In other words, the communications device 2600 may further control the beam direction of the third signal.

In this case, the processor 2620 is further configured to combine N sixth signals into a seventh signal, and process the seventh signal.

In a scenario in which the transceiver in the communications device includes N dual-polarized antennas and an $i^{th}$ dual-polarized antenna includes the $(2i-1)^{th}$ port and the $2i^{th}$ port, when the N dual-polarized antennas form a uniformly spaced linear array, θ satisfies the following formula:

$$\theta = k \times d \times \sin \varphi$$

where k is a wave number of a carrier used to carry the third signal, d is a distance between two adjacent dual-polarized antennas, and φ is an included angle between the beam direction of the third signal and a normal direction of the linear array.

In a fourth possible implementation, the communications device 2600 has a function of the polarization reconfigurable apparatus 1700 shown in FIG. 17.

The memory 2610 stores code instructions.

The processor 2620 is configured to invoke the code instructions stored in the memory 2610 to perform the following operations: performing analog-to-digital conversion on an $i^{th}$ first signal to obtain an $i^{th}$ second signal, where the $i^{th}$ first signal is a sum of a component of a third signal in a direction corresponding to a $(2i-1)^{th}$ port and a component of a fourth signal in the direction corresponding to the $(2i-1)^{th}$ port, i=1, . . . , N, and N is a positive integer, performing analog-to-digital conversion on an $i^{th}$ fifth signal to obtain an $i^{th}$ sixth signal, where the $i^{th}$ fifth signal is a sum of a component of the third signal in a direction corresponding to a $2i^{th}$ port and a component of the fourth signal in the direction corresponding to the $2i^{th}$ port, determining a polarization mode of the third signal and a polarization mode of the fourth signal, where the polarization mode of the third signal includes linear polarization, circular polarization, and elliptical polarization, and the polarization mode of the fourth signal includes linear polarization, circular polarization, and elliptical polarization, dividing the $i^{th}$ second signal into two signals to obtain 2N second signals, and dividing the $i^{th}$ sixth signal into two signals to obtain 2N sixth signals, adjusting an amplitude and a phase of a $(2j-1)^{th}$ second signal and an amplitude and a phase of a $(2j-1)^{th}$ sixth signal based on the polarization mode of the third signal, and combining an adjusted $(2j-1)^{th}$ second signal and an adjusted $(2j-1)^{th}$ sixth signal into a $j^{th}$ seventh signal, where j=1, 2, . . . , N, and adjusting an amplitude and a phase of a $2j^{th}$ second signal and an amplitude and a phase of a $2j^{th}$ sixth signal based on the polarization mode of the fourth signal, and combining an adjusted $2j^{th}$ second signal and an adjusted $2j^{th}$ sixth signal into a $j^{th}$ eighth signal.

The processor 2630 may specifically determine the polarization mode of the third signal based on preconfigured information about the polarization mode of the third signal, and determine the polarization mode of the fourth signal based on preconfigured information about the polarization mode of the fourth signal, or obtain the polarization mode of the third signal and the polarization mode of the fourth signal by measuring a signal transmitted by a transmit end.

The $i^{th}$ first signal is received by a transceiver in the communications device 2600 by using the $(2i-1)^{th}$ port, and the $i^{th}$ fifth signal is received by the transceiver in the communications device 2600 by using the $2i^{th}$ port. The signal received by the $(2i-1)^{th}$ port is orthogonal to the signal received by the $2i^{th}$ port.

In a scenario in which the transceiver includes two ports, the polarization mode of the third signal is orthogonal to the polarization mode of the fourth signal. The polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Specifically, when the polarization mode of the third signal is vertical linear polarization, an amplitude A1 of an adjusted $1^{st}$ second signal is 0 (a phase α1 of the adjusted $1^{st}$ second signal does not exist), and an amplitude B1 and a phase β1 of an adjusted $1^{st}$ sixth signal may be any values, and when the polarization mode of the fourth signal is horizontal linear polarization, an amplitude A2 and a phase α2 of an adjusted $2^{nd}$ second signal are any values, and an amplitude B2 of an adjusted $2^{nd}$ sixth signal is 0 (a phase β2 of the adjusted $2^{nd}$ sixth signal does not exist).

When the polarization mode of the third signal is horizontal linear polarization, an amplitude A1 and a phase α1 of an adjusted $1^{st}$ second signal are any values, and an amplitude B1 of an adjusted $1^{st}$ sixth signal is 0 (a phase β1 of the adjusted $1^{st}$ sixth signal does not exist), and when the polarization mode of the fourth signal is vertical linear polarization, an amplitude A2 of an adjusted $2^{nd}$ second signal is 0 (a phase α2 of the adjusted $2^{nd}$ second signal does not exist), and an amplitude B2 and a phase β2 of an adjusted $2^{nd}$ sixth signal are any values.

When the polarization mode of the third signal is +45° linear polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is an even multiple of 180°, and when the polarization mode of the fourth signal is −45° linear polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is an odd multiple of 180°.

When the polarization mode of the third signal is −45° linear polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is an odd multiple of 180°, and when the polarization mode of the fourth signal is +45° linear polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is an even multiple of 180°.

When the polarization mode of the third signal is left-handed circular polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is 90°, and when the polarization mode of the fourth signal is right-handed circular polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is −90°.

When the polarization mode of the third signal is right-handed circular polarization, a ratio A1/B1 of an amplitude A1 of an adjusted $1^{st}$ second signal to an amplitude B1 of an adjusted $1^{st}$ sixth signal is 1, and a difference α1−β1 between a phase α1 of the adjusted $1^{st}$ second signal and a phase β1 of the adjusted $1^{st}$ sixth signal is −90°, and when the polarization mode of the fourth signal is left-handed circular polarization, a ratio A2/B2 of an amplitude A2 of an adjusted $2^{nd}$ second signal to an amplitude B2 of an adjusted $2^{nd}$ sixth signal is 1, and a difference α2−β2 between a phase α2 of the adjusted $2^{nd}$ second signal and a phase β2 of the adjusted $2^{nd}$ sixth signal is 90°.

Further, when N is greater than 1, a difference between a phase of the adjusted $(2j-1)^{th}$ second signal and a phase of the adjusted $(2j-1)^{th}$ sixth signal is θ1, and a difference between a phase of the adjusted $2j^{th}$ second signal and a phase of the adjusted $2j^{th}$ sixth signal is θ2, where θ1 is determined based on a beam direction of the third signal, and θ2 is determined based on a beam direction of the fourth signal. In other words, the communications device 2600 may further control the beam direction of the third signal and the beam direction of the fourth signal.

In this case, the processor 2630 is further configured to combine N seventh signals into a ninth signal, combine N eighth signals into a tenth signal, and process the ninth signal and the tenth signal.

In a scenario in which the transceiver in the communications device includes N dual-polarized antennas and an $i^{th}$ dual-polarized antenna includes the $(2i-1)^{th}$ port and the $2i^{th}$ port, when the N dual-polarized antennas form a uniformly spaced linear array, θ1 and θ2 satisfy the following formulas:

$$\theta1 = k1 \times d \times \sin\varphi1$$

$$\theta2 = k2 \times d \times \sin\varphi2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the third signal, and φ2 is an included angle between the beam direction of the fourth signal and the normal direction of the linear array.

Figure 27:
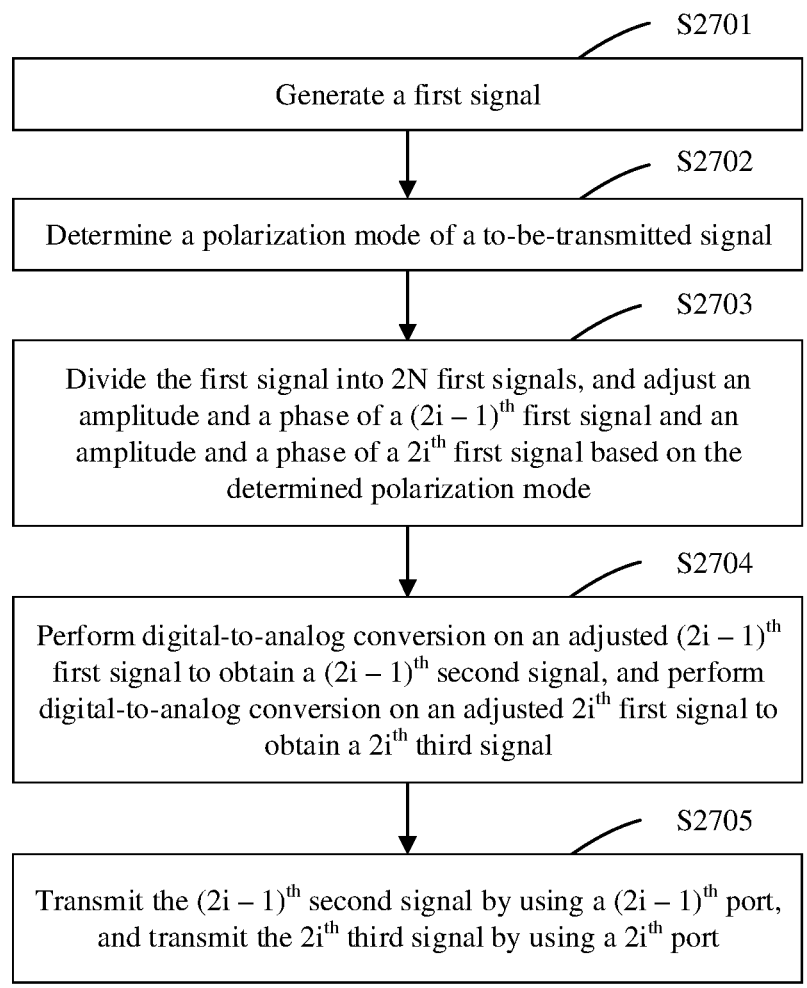
FIG. 27 is a schematic flowchart of a first polarization reconfiguration method according to an embodiment of this application.

As shown in FIG. 27, this application further provides a first polarization reconfiguration method, applied to a communications device. The communications device includes 2N ports, a signal transmitted by a $(2i-1)^{th}$ port is orthogonal to a signal transmitted by a $2i^{th}$ port, i=1, . . . , N, and N is a positive integer. The communications device has a structure and a function of the polarization reconfigurable apparatus 600 in any one of the foregoing possible implementations. The method includes the following steps.

S2701: Generate a first signal.

Specifically, the first signal may be a baseband signal or a digital intermediate-frequency signal.

S2702: Determine a polarization mode of a to-be-transmitted signal, where the polarization mode includes linear polarization, circular polarization, and elliptical polarization.

S2703: Divide the first signal into 2N first signals, and adjust an amplitude and a phase of a $(2i-1)^{th}$ first signal and an amplitude and a phase of a $2i^{th}$ first signal based on the determined polarization mode.

The communications device may specifically determine the polarization mode of the to-be-transmitted signal based on preconfigured information about the polarization mode of the to-be-transmitted signal, or obtain the polarization mode of the to-be-transmitted signal by measuring a signal transmitted by a receive end.

S2704: Perform digital-to-analog conversion on an adjusted $(2i-1)^{th}$ first signal to obtain a $(2i-1)^{th}$ second signal, and perform digital-to-analog conversion on an adjusted $2i^{th}$ first signal to obtain a $2i^{th}$ third signal.

S2705: Transmit the $(2i-1)^{th}$ second signal by using the $(2i-1)^{th}$ port, and transmit the $2i^{th}$ third signal by using the $2i^{th}$ port.

In step S2704, when the polarization mode of the to-be-transmitted signal is linear polarization at an angle of $\gamma_1 \in (\gamma_1 \in (-90°, 90°)$, and $\gamma_1 \neq 0°)$, a ratio of an amplitude A of the adjusted $(2i-1)^{th}$ first signal to an amplitude B of the adjusted $2i^{th}$ first signal is $|\tan\gamma_1|$. When $\gamma_1 > 0$, a difference between a phase α of the adjusted $(2i-1)^{th}$ first signal and a phase β of the adjusted $2i^{th}$ first signal is an even multiple of 180°, or when $\gamma_1 < 0$, a difference between a phase a of an adjusted $1^{st}$ first signal and a phase β of an adjusted $2^{nd}$ first signal is an odd multiple of 180°. $\gamma_1$ is an included angle between an electric field direction of the to-be-transmitted signal and a horizontal direction on a plane perpendicular to a propagation direction of the to-be-transmitted signal.

For example, when the polarization mode of the to-be-transmitted signal is +45° linear polarization, the ratio of the amplitude A of the adjusted $(2i-1)^{th}$ first signal to the amplitude B of the adjusted $2i^{th}$ first signal is 1, and the difference between the phase α of the adjusted $(2i-1)^{th}$ first signal and the phase β of the adjusted $2i^{th}$ first signal is an even multiple of 180°, or when the polarization mode of the to-be-transmitted signal is −45° linear polarization, the ratio of the amplitude A of the adjusted $(2i-1)^{th}$ first signal to the amplitude B of the adjusted $2i^{th}$ first signal is 1, and the difference between the phase α of the adjusted $(2i-1)^{th}$ first signal and the phase β of the adjusted $2i^{th}$ first signal is an odd multiple of 180°.

When the polarization mode of the to-be-transmitted signal is circular polarization, a ratio of an amplitude A of the adjusted $(2i-1)^{th}$ first signal to an amplitude B of the adjusted $2i^{th}$ first signal is 1, and a difference between a phase α of the adjusted $(2i-1)^{th}$ first signal and a phase β of the adjusted $2i^{th}$ first signal is an odd multiple of 90°.

When the polarization mode of the to-be-transmitted signal is elliptical polarization, a ratio A/B of an amplitude A of the adjusted $(2i-1)^{th}$ first signal to an amplitude B of the adjusted $2i^{th}$ first signal, and a difference α−β between a phase α of the adjusted $(2i-1)^{th}$ first signal and a phase β of the adjusted $2i^{th}$ first signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

When the polarization mode of the to-be-transmitted signal is elliptical polarization shown in FIG. 2c, the ratio A/B of the amplitude A of the adjusted $(2i-1)^{th}$ first signal to the amplitude B of the adjusted $2i^{th}$ first signal, and α−β between the phase α of the adjusted $(2i-1)^{th}$ first signal and the phase β of the adjusted $2i^{th}$ first signal satisfy the following formulas:

$$\tan 2\gamma_2 = \frac{2\left(\frac{A}{B}\right)\cos(\alpha-\beta)}{\left(\frac{A}{B}\right)^2 - 1}$$

$$AR = \sqrt{\frac{\left(\frac{A}{B}\right)^2 (\cos\gamma_2)^2 + \frac{A}{B}\sin 2\gamma_2 \cos(\alpha-\beta) + (\sin\gamma_2)^2}{\left(\frac{A}{B}\right)^2 (\sin\gamma_2)^2 - \frac{A}{B}\sin 2\gamma_2 \cos(\alpha-\beta) + (\cos\gamma_2)^2}}$$

Further, when N is greater than 1, a phase difference between the adjusted $(2i-1)^{th}$ first signal and an adjusted $(2i+1)^{th}$ first signal is θ, and a phase difference between the adjusted $2i^{th}$ first signal and an adjusted (2i+2)th first signal is θ, where θ is determined based on a beam direction of the to-be-transmitted signal. In other words, the communications device may further control the beam direction of the to-be-transmitted signal Further, the communications device includes N dual-polarized antennas, and an $i^{th}$ dual-polarized antenna includes the $(2i-1)^{th}$ port and the $2i^{th}$ port. When the N dual-polarized antennas form a uniformly spaced linear array, θ satisfies the following formula:

$$\theta = k \times d \times \sin\varphi$$

where k is a wave number of a carrier used to carry the to-be-transmitted signal, d is a distance between two adjacent dual-polarized antennas, and φ is an included angle between the beam direction of the to-be-transmitted signal and a normal direction of the linear array.

In addition, to satisfy a specific beamforming requirement, an amplitude ratio between the adjusted $(2i-1)^{th}$ first signal and the adjusted $2i^{th}$ first signal is determined based on the beam direction of the to-be-transmitted signal.

It should be noted that the uniformly spaced linear array is only a possible form of an array including the N dual-polarized antennas, and does not constitute a limitation on this embodiment of this application. Another array including the N dual-polarized antennas is also applicable to this embodiment of this application.

With the foregoing solution, the communications device may perform polarization reconfiguration based on the polarization mode of the to-be-transmitted signal in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

Figure 28:
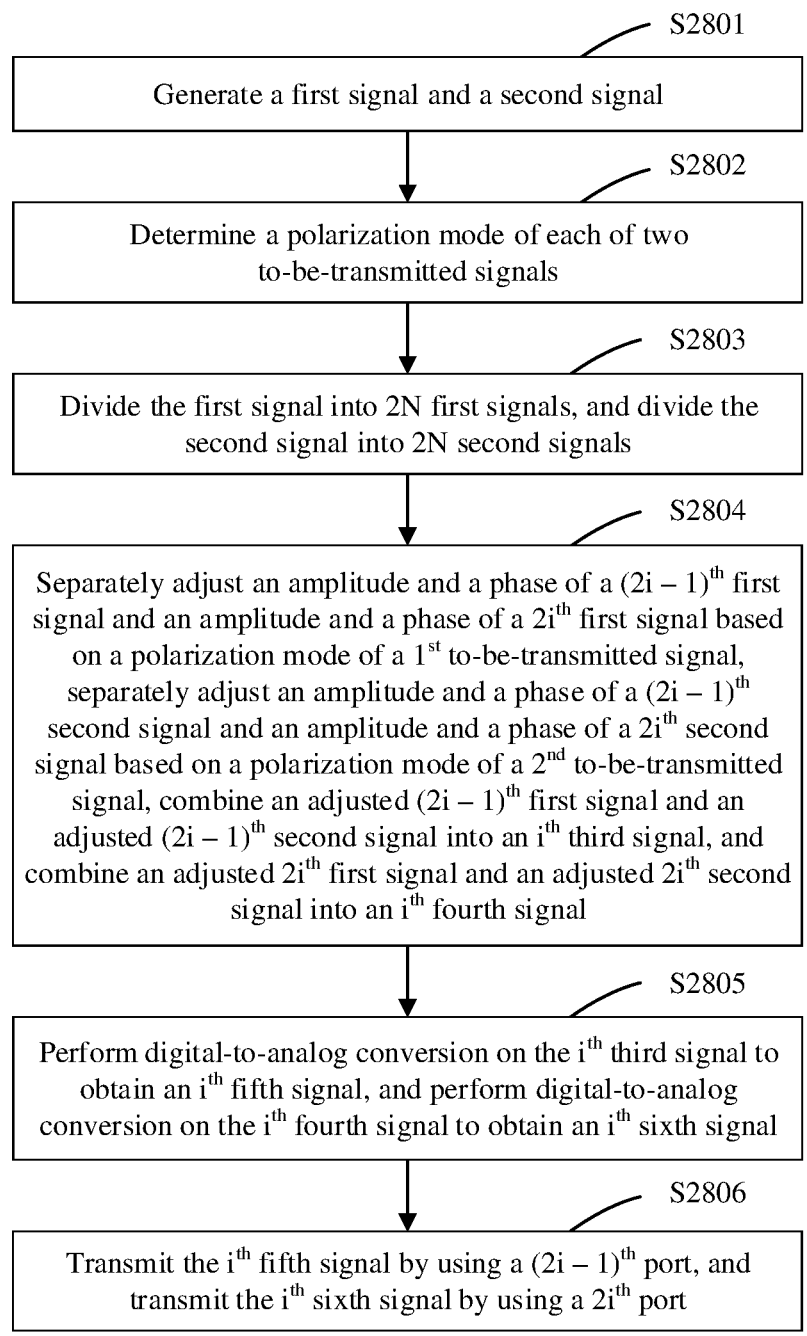
FIG. 28 is a schematic flowchart of a second polarization reconfiguration method according to an embodiment of this application.

As shown in FIG. 28, this application further provides a second polarization reconfiguration method, applied to a first communications device. The first communications device includes 2N ports, a signal transmitted by a $(2i-1)^{th}$ port is orthogonal to a signal transmitted by a $2i^{th}$ port, i=1, . . . , N, and N is a positive integer. The first communications device has a structure and a function of the polarization reconfigurable apparatus 1000 in any one of the foregoing possible implementations. The method includes the following steps.

S2801: Generate a first signal and a second signal.

The first signal and the second signal may be baseband signals, or the first signal and the second signal may be digital intermediate-frequency signals.

S2802: Determine a polarization mode of each of two to-be-transmitted signals. A polarization mode of a $1^{st}$ to-be-transmitted signal includes linear polarization, circular polarization, and elliptical polarization. A polarization mode of a $2^{nd}$ to-be-transmitted signal includes linear polarization, circular polarization, and elliptical polarization.

The first communications device may specifically determine the polarization mode of the $1^{st}$ to-be-transmitted signal and the polarization mode of the $2^{nd}$ to-be-transmitted signal based on preconfigured information about the polarization mode of the two to-be-transmitted signals, or obtain the polarization mode of the $1^{st}$ to-be-transmitted signal and the polarization mode of the $2^{nd}$ to-be-transmitted signal by measuring a signal transmitted by a receive end.

S2803: Divide the first signal into 2N first signals, and divide the second signal into 2N second signals.

S2804: Separately adjust an amplitude and a phase of a $(2i-1)^{th}$ first signal and an amplitude and a phase of a $2i^{th}$ first signal based on the polarization mode of the $1^{st}$ to-be-transmitted signal, separately adjust an amplitude and a phase of a $(2i-1)^{th}$ second signal and an amplitude and a phase of a $2i^{th}$ second signal based on the polarization mode of the $2^{nd}$ to-be-transmitted signal, combine an adjusted $(2i-1)^{th}$ first signal and an adjusted $(2i-1)^{th}$ second signal into an $i^{th}$ third signal, and combine an adjusted $2i^{th}$ first signal and an adjusted $2i^{th}$ second signal into an $i^{th}$ fourth signal.

S2805: Perform digital-to-analog conversion on the $i^{th}$ third signal to obtain an $i^{th}$ fifth signal, and perform digital-to-analog conversion on the $i^{th}$ fourth signal to obtain an $i^{th}$ sixth signal.

S2806: Transmit the $i^{th}$ fifth signal by using the $(2i-1)^{th}$ port, and transmit the $i^{th}$ sixth signal by using the $2i^{th}$ port.

When N=1, in step S2804, the polarization mode of the $1^{st}$ to-be-transmitted signal is orthogonal to the polarization mode of the $2^{nd}$ to-be-transmitted signal. Specifically, the polarization mode of the $1^{st}$ to-be-transmitted signal is vertical linear polarization, and the polarization mode of the $2^{nd}$ to-be-transmitted signal is horizontal linear polarization, or the polarization mode of the $1^{st}$ to-be-transmitted signal is horizontal linear polarization, and the polarization mode of the $2^{nd}$ to-be-transmitted signal is vertical linear polarization, or the polarization mode of the $1^{st}$ to-be-transmitted signal is +45° linear polarization, and the polarization mode of the $2^{nd}$ to-be-transmitted signal is −45° linear polarization, or the polarization mode of the $1^{st}$ to-be-transmitted signal is −45° linear polarization, and the polarization mode of the $2^{nd}$ to-be-transmitted signal is +45° linear polarization, or the polarization mode of the $1^{st}$ to-be-transmitted signal is left-handed circular polarization, and the polarization mode of the $2^{nd}$ to-be-transmitted signal is right-handed circular polarization, or the polarization mode of the $1^{st}$ to-be-transmitted signal is right-handed circular polarization, and the polarization mode of the $2^{nd}$ to-be-transmitted signal is left-handed circular polarization.

Specifically, when the polarization mode of the $1^{st}$ to-be-transmitted signal is vertical linear polarization, an amplitude A1 of the adjusted $(2i-1)^{th}$ first signal is 0 (a phase α1 of an adjusted $1^{st}$ first signal does not exist), and an amplitude B1 and a phase β1 of the adjusted $2i^{th}$ first signal may be any values, and when the polarization mode of the $2^{nd}$ to-be-transmitted signal is horizontal linear polarization, an amplitude A2 and a phase α2 of the adjusted $(2i-1)^{th}$ second signal are any values, and an amplitude B2 of the adjusted $2i^{th}$ second signal is 0 (a phase β2 of an adjusted $2^{nd}$ second signal does not exist).

When the polarization mode of the $1^{st}$ to-be-transmitted signal is horizontal linear polarization, an amplitude A1 and a phase α1 of the adjusted $(2i-1)^{th}$ first signal are any values, and an amplitude B1 of the adjusted $2i^{th}$ first signal is 0 (a phase 131 of an adjusted $2^{nd}$ first signal does not exist), and when the polarization mode of the $2^{nd}$ to-be-transmitted signal is vertical linear polarization, an amplitude A2 of the adjusted $(2i-1)^{th}$ second signal is 0 (a phase α2 of an adjusted $1^{st}$ second signal does not exist), and an amplitude B2 and a phase β2 of the adjusted $2i^{th}$ second signal are any values.

When the polarization mode of the $1^{st}$ to-be-transmitted signal is +45° linear polarization, a ratio A1/B1 of an amplitude A1 of the adjusted $(2i-1)^{th}$ first signal to an amplitude B1 of the adjusted $2i^{th}$ first signal is 1, and a difference α1−β between a phase α1 of the adjusted $(2i-1)^{th}$ first signal and a phase β1 of the adjusted $2i^{th}$ first signal is an even multiple of 180°, and when the polarization mode of the $2^{nd}$ to-be-transmitted signal is −45° linear polarization, a ratio A2/B2 of an amplitude A2 of the adjusted $(2i-1)^{th}$ second signal to an amplitude B2 of the adjusted $2i^{th}$ second signal is 1, and a difference α2−β2 between a phase α2 of the adjusted $(2i-1)^{th}$ second signal and a phase β2 of the adjusted $2i^{th}$ second signal is an odd multiple of 180°.

When the polarization mode of the $1^{st}$ to-be-transmitted signal is −45° linear polarization, a ratio A1/B1 of an amplitude A1 of the adjusted $(2i-1)^{th}$ first signal to an amplitude B1 of the adjusted $2i^{th}$ first signal is 1, and a difference α1−β1 between a phase α1 of the adjusted $(2i-1)^{th}$ first signal and a phase β1 of the adjusted $2i^{th}$ first signal is an odd multiple of 180°, and when the polarization mode of the $2^{nd}$ to-be-transmitted signal is +45° linear polarization, a ratio A2/B2 of an amplitude A2 of the adjusted $(2i-1)^{th}$ second signal to an amplitude B2 of the adjusted $2i^{th}$ second signal is 1, and a difference α2−β2 between a phase α2 of the adjusted $(2i-1)^{th}$ second signal and a phase β2 of the adjusted $2i^{th}$ second signal is an even multiple of 180°.

When the polarization mode of the $1^{st}$ to-be-transmitted signal is left-handed circular polarization, a ratio A1/B1 of an amplitude A1 of the adjusted $(2i-1)^{th}$ first signal to an amplitude B1 of the adjusted $2i^{th}$ first signal is 1, and a difference α1−β1 between a phase α1 of the adjusted $(2i-1)^{th}$ first signal and a phase β1 of the adjusted $2i^{th}$ first signal is 90°, and when the polarization mode of the $2^{nd}$ to-be-transmitted signal is right-handed circular polarization, a ratio A2/B2 of an amplitude A2 of the adjusted $(2i-1)^{th}$ second signal to an amplitude B2 of the adjusted $2i^{th}$ second signal is 1, and a difference α2−β2 between a phase α2 of the adjusted $(2i-1)^{th}$ second signal and a phase β2 of the adjusted $2i^{th}$ second signal is −90°.

When the polarization mode of the $1^{st}$ to-be-transmitted signal is right-handed circular polarization, a ratio A1/B1 of an amplitude A1 of the adjusted $(2i-1)^{th}$ first signal to an amplitude B1 of the adjusted $2i^{th}$ first signal is 1, and a difference α1−β1 between a phase α1 of the adjusted $(2i-1)^{th}$ first signal and a phase β1 of the adjusted $2i^{th}$ first signal is −90°, and when the polarization mode of the $2^{nd}$ to-be-transmitted signal is left-handed circular polarization, a ratio A2/B2 of an amplitude A2 of the adjusted $(2i-1)^{th}$ second signal to an amplitude B2 of the adjusted $2i^{th}$ second signal is 1, and a difference α2−β2 between a phase α2 of the adjusted $(2i-1)^{th}$ second signal and a phase β2 of the adjusted $2i^{th}$ second signal is 90°.

Further, in a scenario in which the polarization mode of the $1^{st}$ to-be-transmitted signal is orthogonal to the polarization mode of the $2^{nd}$ to-be-transmitted signal (for example, to fully utilize spectrum resources, orthogonal polarization for frequency reuse is generally used in satellite communication to provide double bandwidth on a given operating frequency band), due to impact of a depolarization effect, polarization deflection occurs during propagation of the $1^{st}$ to-be-transmitted signal and the $2^{nd}$ to-be-transmitted signal. When the $1^{st}$ to-be-transmitted signal and the $2^{nd}$ to-be-transmitted signal arrive at a second communications device at the receive end, orthogonality is damaged, causing cross-polarization interference to channels on the second communications device that are used to receive the two signals.

In a scenario in which the polarization mode of the $1^{st}$ to-be-transmitted signal is horizontal linear polarization and the polarization mode of the $2^{nd}$ to-be-transmitted signal is vertical linear polarization, a horizontally linearly polarized reference signal H and a vertically linearly polarized reference signal V that are transmitted by the first communications device, a horizontally linearly polarized reference signal H' received by the second communications device that corresponds to the horizontally linearly polarized reference signal H and that is affected by a depolarization effect, and a vertically linearly polarized reference signal V received by the second communications device that corresponds to the vertically linearly polarized reference signal V and that is affected by a depolarization effect satisfy the following relationship:

$$\begin{bmatrix} H' \\ V' \end{bmatrix} = \begin{bmatrix} A_{HH} * e^{j\theta_{HH}} & A_{HV} * e^{j\theta_{HV}} \\ A_{VH} * e^{j\theta_{VH}} & A_{VV} * e^{j\theta_{VV}} \end{bmatrix} \begin{bmatrix} H \\ V \end{bmatrix},$$

where $A_{VV}$ is an amplitude of a vertically linearly polarized reference signal received by a first port of the second communications device, $\theta_{VV}$ is a phase of the vertically linearly polarized reference signal received by the first port of the second communications device, $A_{HV}$ is an amplitude of a horizontally linearly polarized reference signal received by the first port of the second communications device, $\theta_{HV}$ is a phase of the horizontally linearly polarized reference signal received by the first port of the second communications device, $A_{VH}$ is an amplitude of a vertically linearly polarized reference signal received by a second port of the second communications device, $\theta_{VH}$ is a phase of the vertically linearly polarized reference signal received by the second port of the second communications device, $A_{HH}$ is an amplitude of a horizontally linearly polarized reference signal received by the second port of the second communications device, $\theta_{HH}$ is a phase of the horizontally linearly polarized reference signal received by the second port of the second communications device, the second port of the second communications device is configured to receive a horizontally linearly polarized signal, the first port of the second communications device is configured to receive a vertically linearly polarized signal, and the second communications device is configured to receive the $1^{st}$ to-be-transmitted signal and the $2^{nd}$ to-be-transmitted signal.

Specifically, the first communications device transmits the horizontally linearly polarized reference signal by using the following steps: 1. generating a first signal corresponding to the horizontally linearly polarized reference signal, 2. dividing the first signal corresponding to the horizontally linearly polarized reference signal into two signals, and adjusting amplitudes and phases of the two signals based on a horizontal linear polarization mode, where an amplitude and a phase of an adjusted $1^{st}$ signal may be any values, and an amplitude of an adjusted $2^{nd}$ signal is 0, 3. performing digital-to-analog conversion on the adjusted $1^{st}$ signal, 4. transmitting, by using a $1^{st}$ port, an analog signal corresponding to the adjusted $1^{st}$ signal.

The first communications device transmits the vertically linearly polarized reference signal by using the following steps: 1. generating a first signal corresponding to the vertically linearly polarized reference signal, 2. dividing the first signal corresponding to the vertically linearly polarized reference signal into two signals, and adjusting amplitudes and phases of the two signals based on a vertical linear polarization mode, where an amplitude of an adjusted $1^{st}$ signal is 0, and an amplitude and a phase of an adjusted $2^{nd}$ signal may be any values, 3. performing digital-to-analog conversion on the adjusted $2^{nd}$ signal, and 4. transmitting, by using a $2^{nd}$ port, an analog signal corresponding to the adjusted $2^{nd}$ signal.

Therefore, to eliminate cross-polarization interference, when the polarization mode of the $1^{st}$ to-be-transmitted signal is horizontal linear polarization and the polarization mode of the $2^{nd}$ to-be-transmitted signal is vertical linear polarization, a ratio of an amplitude A1 of an adjusted $1^{st}$ first signal to an amplitude B1 of an adjusted $2^{nd}$ first signal, and a difference between a phase at of the adjusted $1^{st}$ first signal and a phase β1 of the adjusted $2^{nd}$ first signal satisfy the following conditions:

$$\frac{A_1}{B_1} = \frac{A_{VV}}{A_{HV}}$$

$$\alpha_1 - \beta_1 = \theta_{VV} - \theta_{HV} + n*180°,$$

where n is an odd number, and a ratio of an amplitude A2 of an adjusted $1^{st}$ second signal to an amplitude B2 of an adjusted $2^{nd}$ second signal, and a difference between a phase $\alpha 2$ of the adjusted $1^{st}$ second signal and a phase $\beta 2$ of the adjusted $2^{nd}$ second signal satisfy the following conditions:

$$\frac{A_2}{B_2} = \frac{A_{VH}}{A_{HH}}$$

$$\alpha_2 - \beta_2 = \theta_{VH} - \theta_{HH} + m*180°,$$

where m is an odd number.

In addition, before the first communications device sends the horizontally linearly polarized reference signal and the vertically linearly polarized reference signal, the second communications device calculates and adjusts an azimuth angle, an elevation angle, and a polarization angle based on a location of the second communications device and a location of the first communications device, and aligns a beam to the first wireless communications device, where a polarization mode of the second communications device "matches" a polarization mode of the first communications device (the polarization modes are matched without considering a depolarization effect), to improve pre-compensation precision of the first communications device.

With the foregoing solution, in a scenario in which the polarization mode of the $1^{st}$ to-be-transmitted signal is horizontal linear polarization and the polarization mode of the $2^{nd}$ to-be-transmitted signal is vertical linear polarization, the first wireless device may pre-compensate for impact of a depolarization effect, so that the two signals received by the second communications device are orthogonal, and cross-polarization interference and a depolarization effect are eliminated. The foregoing solution is especially suitable for a scenario in which downlink transmission is mainly performed in wireless communication and a power and hardware resources of a base station are superior to those of a terminal device, without increasing complexity, costs, or power consumption of the terminal device.

When N is greater than 1, a phase difference between the adjusted $(2i-1)^{th}$ first signal and the adjusted $2i^{th}$ first signal is $\theta 1$, where $\theta 1$ is determined based on a beam direction of the $1^{st}$ to-be-transmitted signal, and a phase difference between the adjusted $(2i-1)^{th}$ second signal and the adjusted $2i^{th}$ second signal is $\theta 2$, where $\theta 2$ is determined based on a beam direction of the $2^{nd}$ to-be-transmitted signal. In this case, the first communications device may further separately control the beam direction of the $1^{st}$ to-be-transmitted signal and the beam direction of the $2^{nd}$ to-be-transmitted signal.

It should be noted that, when N is greater than 1, conditions met by the amplitude and the phase of the adjusted $(2i-1)^{th}$ first signal and the amplitude and the phase of the adjusted $2i^{th}$ first signal when the polarization mode of the $1^{st}$ to-be-transmitted signal is linear polarization, circular polarization, or elliptical polarization, and conditions met by the amplitude and the phase of the adjusted $(2i-1)^{th}$ second signal and the amplitude and the phase of the adjusted $2i^{th}$ second signal when the polarization mode of the $2^{nd}$ to-be-transmitted signal is linear polarization, circular polarization, or elliptical polarization are the same as the conditions met by the amplitude and the phase of the adjusted $(2i-1)^{th}$ first signal and the amplitude and the phase of the adjusted $2i^{th}$ first signal when the to-be-transmitted signal in the first polarization method provided in this application is in the corresponding polarization mode. Details are not described herein again.

Further, the first communications device includes N dual-polarized antennas, and an $i^{th}$ dual-polarized antenna includes the $(2i-1)^{th}$ port and the $2i^{th}$ port. When the N dual-polarized antennas form a uniformly spaced linear array, $\theta 1$ and $\theta 2$ satisfy the following formulas:

$$\theta 1 = k1 \times d \times \sin \varphi 1$$

$$\theta 2 = k2 \times d \times \sin \varphi 2$$

where k1 is a wave number of a carrier that carries the $1^{st}$ to-be-transmitted signal, d is a distance between two adjacent dual-polarized antennas, $\varphi 1$ is an included angle between the beam direction of the $1^{st}$ to-be-transmitted signal and a normal direction of the linear array, k2 is a wave number of a carrier that carries the $2^{nd}$ to-be-transmitted signal, and $\varphi 2$ is an included angle between the beam direction of the $2^{nd}$ to-be-transmitted signal and the normal direction of the linear array.

It should be noted that the uniformly spaced linear array is only a possible form of an array including the N dual-polarized antennas, and does not constitute a limitation on this embodiment of this application. Another array including the N dual-polarized antennas is also applicable to this embodiment of this application.

In addition, in the scenario in which N>1, the first communications device may generate three or more signals. In this case, processing processes of the first communications device are similar to the processing processes in the scenario in which the first communications device may generate two signals (the first signal and the second signal). Details are not described herein again.

With the foregoing solution, the first communications device may perform polarization reconfiguration based on a polarization mode of a received signal in digital domain, and polarization reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

Figure 29:
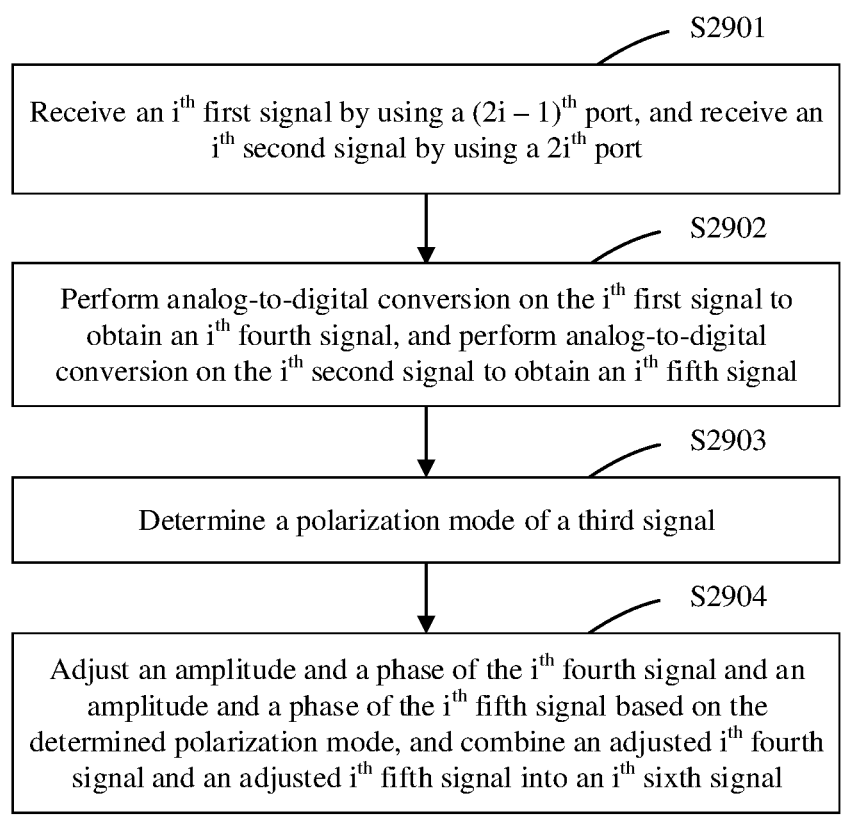
FIG. 29 is a schematic flowchart of a third polarization reconfiguration method according to an embodiment of this application.
Figure 30:
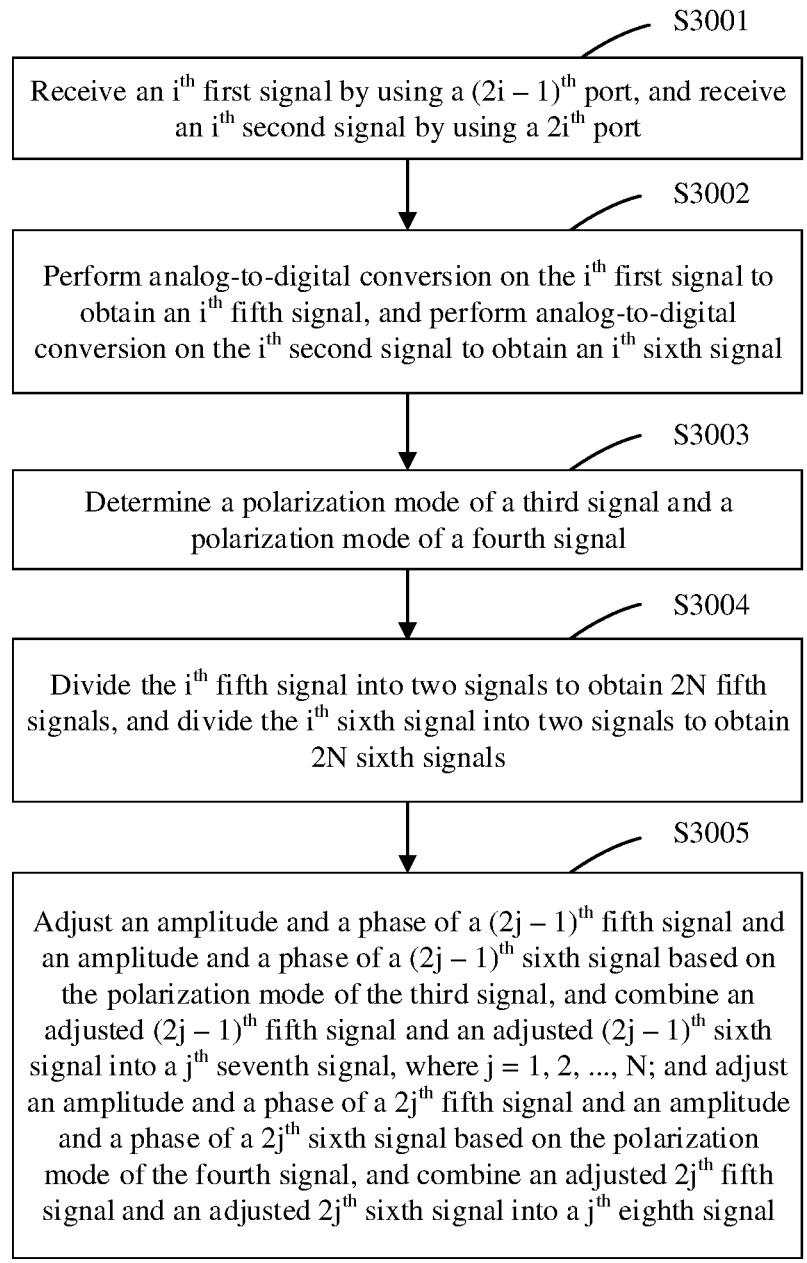
FIG. 30 is a schematic flowchart of a fourth polarization reconfiguration method according to an embodiment of this application.

As shown in FIG. 29, this application further provides a third polarization reconfiguration method, applied to a communications device. The communications device includes 2N ports, a signal received by a $(2i-1)^{th}$ port is orthogonal to a signal received by a $2i^{th}$ port, i=1, ..., N, and N is a positive integer. The communications device has a structure and a function of the polarization reconfigurable apparatus 1000 in any one of the foregoing possible implementations. The method includes the following steps.

S2901: Receive an $i^{th}$ first signal by using the $(2i-1)^{th}$ port, and receive an $i^{th}$ second signal by using the $2i^{th}$ port.

The $i^{th}$ first signal is a component of a third signal in a direction corresponding to the $(2i-1)^{th}$ port. The $i^{th}$ second signal is a component of the third signal in a direction corresponding to the $2i^{th}$ port.

S2902: Perform analog-to-digital conversion on the $i^{th}$ first signal to obtain an $i^{th}$ fourth signal, and perform analog-to-digital conversion on the $i^{th}$ second signal to obtain an $i^{th}$ fifth signal.

S2903: Determine a polarization mode of the third signal. The polarization mode includes linear polarization, circular polarization, and elliptical polarization.

The communications device may specifically determine the polarization mode of the third signal based on preconfigured information about the polarization mode of the third signal, or obtain the polarization mode of the third signal by measuring a signal transmitted by a transmit end.

S2904: Adjust an amplitude and a phase of the $i^{th}$ fourth signal and an amplitude and a phase of the $i^{th}$ fifth signal based on the determined polarization mode, and combine an adjusted $i^{th}$ fourth signal and an adjusted $i^{th}$ fifth signal into an $i^{th}$ sixth signal.

During specific implementation, in step S2904, when the polarization mode of the third signal is linear polarization at an angle of $\gamma_1$ ($\gamma_1 \in (-90°, 90°)$, and $\gamma_3 != 0°$), a ratio of an amplitude A of the adjusted $i^{th}$ fourth signal to an amplitude B of the adjusted $i^{th}$ fifth signal is $|\tan \gamma_3|$. When $\gamma_1 > 0$, a difference between a phase $\alpha$ of the adjusted $i^{th}$ fourth signal and a phase $\beta$ of the adjusted $i^{th}$ fifth signal is an even multiple of 180°, or when $\gamma_1 < 0$, a difference between a phase $\alpha$ of the adjusted $i^{th}$ fourth signal and a phase $\beta$ of the adjusted $i^{th}$ fifth signal is an odd multiple of 180°. $\gamma_1$ is an included angle between an electric field direction of the third signal and a horizontal direction on a plane perpendicular to a propagation direction of the third signal.

For example, when the polarization mode of the third signal is +45° linear polarization, the ratio of the amplitude A of the adjusted $i^{th}$ fourth signal to the amplitude B of the adjusted $i^{th}$ fifth signal is 1, and the difference between the phase $\alpha$ of the adjusted $i^{th}$ fourth signal and the phase $\beta$ of the adjusted $i^{th}$ fifth signal is an even multiple of 180°, or when the polarization mode of the third signal is −45° linear polarization, the ratio of the amplitude A of the adjusted $i^{th}$ fourth signal to the amplitude B of the adjusted $i^{th}$ fifth signal is 1, and the difference between the phase $\alpha$ of the adjusted $i^{th}$ fourth signal and the phase $\beta$ of the adjusted $i^{th}$ fifth signal is an odd multiple of 180°.

When the polarization mode of the third signal is circular polarization, a ratio of an amplitude A of the adjusted $i^{th}$ fourth signal to an amplitude B of the adjusted $i^{th}$ fifth signal is 1, and a difference between a phase $\alpha$ of the adjusted $i^{th}$ fourth signal and a phase $\beta$ of the adjusted $i^{th}$ fifth signal is an odd multiple of 90°.

When the polarization mode of the third signal is elliptical polarization, a ratio A/B of an amplitude A of the adjusted $i^{th}$ fourth signal to an amplitude B of the adjusted $i^{th}$ fifth signal, and a difference $\alpha - \beta$ between a phase $\alpha$ of the adjusted $i^{th}$ fourth signal and a phase $\beta$ of the adjusted $i^{th}$ fifth signal are determined based on $\gamma_2$ and a ratio AR(a/b) of a major axis to a minor axis of an ellipse corresponding to the elliptical polarization mode. $\gamma_2$ is an included angle between the major axis and a horizontal direction on a plane perpendicular to a propagation direction of the to-be-transmitted signal (namely, a tilt angle of the ellipse).

Further, when N is greater than 1, a difference between a phase of the adjusted $i^{th}$ fourth signal and a phase of an adjusted $(i+1)^{th}$ fourth signal is $\theta$, and a difference between a phase of the adjusted $i^{th}$ fifth signal and a phase of an adjusted $(i+1)^{th}$ fifth signal, where $\theta$ is determined based on a beam direction of the third signal. In other words, the communications device may further control the beam direction of the third signal.

In this case, the communications device further combines N sixth signals into a seventh signal, and processes the seventh signal.

In a scenario in which the communications device includes N dual-polarized antennas and an $i^{th}$ dual-polarized antenna includes the $(2i-1)^{th}$ port and the $2i^{th}$ port, when the N dual-polarized antennas form a uniformly spaced linear array, $\theta$ satisfies the following formula:

$$\theta = k \times d \times \sin \varphi$$

where k is a wave number of a carrier used to carry the third signal, d is a distance between two adjacent dual-polarized antennas, and $\varphi$ is an included angle between the beam direction of the third signal and a normal direction of the linear array.

It should be noted that the uniformly spaced linear array is only a possible form of an array including the N dual-polarized antennas, and does not constitute a limitation on this embodiment of this application. Another array including the N dual-polarized antennas is also applicable to this embodiment of this application.

With the foregoing solution, the communications device can perform polarization reconfiguration on a received signal in digital domain, and reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

As shown in FIG. 3o, this application further provides a fourth polarization reconfiguration method, applied to a communications device. The communications device includes 2N ports, a signal received by a $(2i-1)^{th}$ port is orthogonal to a signal received by a $2i^{th}$ port, i=1, ..., N, and N is a positive integer. The communications device has a structure and a function of the polarization reconfigurable apparatus 1700 in any one of the foregoing possible implementations. The method includes the following steps.

S3001: Receive an $i^{th}$ first signal by using the $(2i-1)^{th}$ port, and receive an $i^{th}$ second signal by using the $2i^{th}$ port.

The $i^{th}$ first signal is a sum of a component of a third signal in a direction corresponding to the $(2i-1)^{th}$ port and a component of a fourth signal in the direction corresponding to the $(2i-1)^{th}$ port. The $i^{th}$ second signal is a sum of a component of the third signal in a direction corresponding to the $2i^{th}$ port and a component of the fourth signal in the direction corresponding to the $2i^{th}$ port.

S3002: Perform analog-to-digital conversion on the $i^{th}$ first signal to obtain an $i^{th}$ fifth signal, and perform analog-to-digital conversion on the $i^{th}$ second signal to obtain an $i^{th}$ sixth signal.

S3003: Determine a polarization mode of the third signal and a polarization mode of the fourth signal. The polarization mode of the third signal includes linear polarization, circular polarization, and elliptical polarization. The polarization mode of the fourth signal includes linear polarization, circular polarization, and elliptical polarization.

The communications device may specifically determine the polarization mode of the third signal based on preconfigured information about the polarization mode of the third signal, and determine the polarization mode of the fourth signal based on preconfigured information about the polarization mode of the fourth signal, or obtain the polarization mode of the third signal and the polarization mode of the fourth signal by measuring a signal transmitted by a transmit end.

S3004: Divide the $i^{th}$ fifth signal into two signals to obtain 2N fifth signals, and divide the $i^{th}$ sixth signal into two signals to obtain 2N sixth signals.

S3005: Adjust an amplitude and a phase of a $(2j-1)^{th}$ fifth signal and an amplitude and a phase of a $(2j-1)^{th}$ sixth signal based on the polarization mode of the third signal, and combine an adjusted $(2j-1)^{th}$ fifth signal and an adjusted $(2j-1)^{th}$ sixth signal into a $j^{th}$ seventh signal, where j=1, 2, . . . , N, and adjust an amplitude and a phase of a $2j^{th}$ fifth signal and an amplitude and a phase of a $2j^{th}$ sixth signal based on the polarization mode of the fourth signal, and combine an adjusted $2j^{th}$ fifth signal and an adjusted $2j^{th}$ sixth signal into a $j^{th}$ eighth signal.

When N=1, the polarization mode of the third signal is orthogonal to the polarization mode of the fourth signal. The polarization mode of the third signal is vertical linear polarization, and the polarization mode of the fourth signal is horizontal linear polarization, or the polarization mode of the third signal is horizontal linear polarization, and the polarization mode of the fourth signal is vertical linear polarization, or the polarization mode of the third signal is +45° linear polarization, and the polarization mode of the fourth signal is −45° linear polarization, or the polarization mode of the third signal is −45° linear polarization, and the polarization mode of the fourth signal is +45° linear polarization, or the polarization mode of the third signal is left-handed circular polarization, and the polarization mode of the fourth signal is right-handed circular polarization, or the polarization mode of the third signal is right-handed circular polarization, and the polarization mode of the fourth signal is left-handed circular polarization.

Specifically, when the polarization mode of the third signal is vertical linear polarization, an amplitude A1 of an adjusted $1^{st}$ fifth signal is 0 (a phase $\alpha 1$ of the adjusted $1^{st}$ fifth signal does not exist), and an amplitude B1 and a phase $\beta 1$ of an adjusted $1^{st}$ sixth signal may be any values, and when the polarization mode of the fourth signal is horizontal linear polarization, an amplitude A2 and a phase $\alpha 2$ of an adjusted $2^{nd}$ fifth signal are any values, and an amplitude B2 of an adjusted $2^{nd}$ sixth signal is 0 (a phase $\beta 2$ of the adjusted $2^{nd}$ sixth signal does not exist).

When the polarization mode of the third signal is horizontal linear polarization, an amplitude A1 and a phase $\alpha 1$ of an adjusted $1^{st}$ fifth signal are any values, and an amplitude B1 of an adjusted $1^{st}$ sixth signal is 0 (a phase $\beta 1$ of the adjusted $1^{st}$ sixth signal does not exist), and when the polarization mode of the fourth signal is vertical linear polarization, an amplitude A2 of an adjusted $2^{nd}$ fifth signal is 0 (a phase $\alpha 2$ of the adjusted $2^{nd}$ fifth signal does not exist), and an amplitude B2 and a phase $\beta 2$ of an adjusted $2^{nd}$ sixth signal are any values.

When the polarization mode of the third signal is +45° linear polarization, a ratio A1/B1 of an amplitude A1 of an adjusted $1^{st}$ fifth signal to an amplitude B1 of an adjusted $1^{st}$ sixth signal is 1, and a difference $\alpha 1-\beta 1$ between a phase $\alpha 1$ of the adjusted $1^{st}$ fifth signal and a phase $\beta 1$ of the adjusted $1^{st}$ sixth signal is an even multiple of 180°, and when the polarization mode of the fourth signal is −45° linear polarization, a ratio A2/B2 of an amplitude A2 of an adjusted $2^{nd}$ fifth signal to an amplitude B2 of an adjusted $2^{nd}$ sixth signal is 1, and a difference $\theta 2-\beta 2$ between a phase $\alpha 2$ of an adjusted $2^{nd}$ fifth signal and a phase $\beta 2$ of an adjusted $2^{nd}$ sixth signal is an odd multiple of 180°.

When the polarization mode of the third signal is −45° linear polarization, a ratio A1/B1 of an amplitude A1 of an adjusted $1^{st}$ fifth signal to an amplitude B1 of an adjusted $1^{st}$ sixth signal is 1, and a difference $\alpha 1-\beta 1$ between a phase $\alpha 1$ of the adjusted $1^{st}$ fifth signal and a phase $\beta 1$ of the adjusted $1^{st}$ sixth signal is an odd multiple of 180°, and when the polarization mode of the fourth signal is +45° linear polarization, a ratio A2/B2 of an amplitude A2 of an adjusted $2^{nd}$ fifth signal to an amplitude B2 of an adjusted $2^{nd}$ sixth signal is 1, and a difference $\theta 2-\beta 2$ between a phase $\alpha 2$ of the adjusted $2^{nd}$ fifth signal and a phase $\beta 2$ of the adjusted $2^{nd}$ sixth signal is an even multiple of 180°.

When the polarization mode of the third signal is left-handed circular polarization, a ratio A1/B1 of an amplitude A1 of an adjusted $1^{st}$ fifth signal to an amplitude B1 of an adjusted $1^{st}$ sixth signal is 1, and a difference $\alpha 1-\beta 1$ between a phase $\alpha 1$ of the adjusted $1^{st}$ fifth signal and a phase $\beta 1$ of the adjusted $1^{st}$ sixth signal is 90°, and when the polarization mode of the fourth signal is right-handed circular polarization, a ratio A2/B2 of an amplitude A2 of an adjusted $2^{nd}$ fifth signal to an amplitude B2 of an adjusted $2^{nd}$ sixth signal is 1, and a difference $\alpha 2-\beta 2$ between a phase $\alpha 2$ of the adjusted $2^{nd}$ fifth signal and a phase $\beta 2$ of the adjusted $2^{nd}$ sixth signal is 90°.

When the polarization mode of the third signal is right-handed circular polarization, a ratio A1/B1 of an amplitude A1 of an adjusted $1^{st}$ fifth signal to an amplitude B1 of an adjusted $1^{st}$ sixth signal is 1, and a difference $\alpha 1-\beta 1$ between a phase $\alpha 1$ of the adjusted $1^{st}$ fifth signal and a phase $\beta 1$ of the adjusted $1^{st}$ sixth signal is −90°, and when the polarization mode of the fourth signal is left-handed circular polarization, a ratio A2/B2 of an amplitude A2 of an adjusted $2^{nd}$ fifth signal to an amplitude B2 of an adjusted $2^{nd}$ sixth signal is 1, and a difference $\alpha 2-\beta 2$ between a phase $\alpha 2$ of the adjusted $2^{nd}$ fifth signal and a phase $\beta 2$ of the adjusted $2^{nd}$ sixth signal is 90°.

Further, when N is greater than 1, a difference between a phase of the adjusted $(2j-1)^{th}$ fifth signal and a phase of the adjusted $(2j-1)^{th}$ sixth signal is $\theta 1$, and a difference between a phase of the adjusted $2j^{th}$ fifth signal and a phase of the adjusted $2j^{th}$ sixth signal is $\theta 2$, where $\theta 1$ is determined based on a beam direction of the third signal, and $\theta 2$ is determined based on a beam direction of the fourth signal. In other words, the communications device may further control the beam direction of the third signal and the beam direction of the fourth signal.

In this case, the processor 2730 is further configured to combine N seventh signals into a ninth signal, combine N eighth signals into a tenth signal, and process the ninth signal and the tenth signal.

It should be noted that, when N is greater than 1, conditions met by the amplitude and the phase of the adjusted $(2j-1)^{th}$ fifth signal and the amplitude and the phase of the adjusted $(2j-1)^{th}$ sixth signal when the polarization mode of the third signal is linear polarization, circular polarization, or elliptical polarization, and conditions met by the amplitude and the phase of the adjusted $2j^{th}$ fifth signal and the amplitude and the phase of the adjusted $2j^{th}$ sixth signal when the polarization mode of the fourth signal is linear polarization, circular polarization, or elliptical polarization are the same as the conditions met by the amplitude and the phase of the adjusted $i^{th}$ fourth signal and the amplitude and the phase of the adjusted $i^{th}$ fifth signal when the third signal in the third polarization method provided in this application is in the corresponding polarization mode. Details are not described herein again.

In a scenario in which the wireless communications device includes N dual-polarized antennas and an $i^{th}$ dual-polarized antenna includes the $(2i-1)^{th}$ port and the $2i^{th}$ port, when the N dual-polarized antennas form a uniformly spaced linear array, $\theta 1$ and $\theta 2$ satisfy the following formulas:

$$\theta 1 = k1 \times d \times \sin \varphi 1$$

$$\theta 2 = k2 d \times \sin \varphi 2$$

where k1 is a wave number of a carrier used to carry the third signal, d is a distance between two adjacent dual-polarized antennas, φ1 is an included angle between the beam direction of the third signal and a normal direction of the linear array, k2 is a wave number of a carrier used to carry the third signal, and φ2 is an included angle between the beam direction of the fourth signal and the normal direction of the linear array.

It should be noted that the uniformly spaced linear array is only a possible form of an array including the N dual-polarized antennas, and does not constitute a limitation on this embodiment of this application. Another array including the N dual-polarized antennas is also applicable to this embodiment of this application.

In addition, in the scenario in which N>1, the communications device may receive three or more signals. In this case, processing processes of the communications device are similar to the processing processes in the scenario in which the communications device may receive two signals (the first signal and the second signal). Details are not described herein again.

With the foregoing solution, the communications device may perform polarization reconfiguration based on a polarization mode of a received signal in digital domain, and polarization reconfiguration precision and flexibility are relatively high. A problem that polarization modes of a transmit end and a receive end do not match due to a depolarization effect can be resolved, thereby improving signal reception efficiency and increasing a signal-to-noise ratio of a signal received by the receive end.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clearly that persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A polarization reconfigurable apparatus, comprising:
a signal generation unit;
a signal adjustment unit;
a digital-to-analog conversion unit, and
a transmitter, wherein the signal generation unit, the signal adjustment unit, the digital-to-analog conversion unit and the transmitter are sequentially connected, wherein the transmitter comprises a first port and a second port, and wherein a signal transmitted by the first port is orthogonal to a signal transmitted by the second port;
wherein the signal generation unit is configured to generate a first signal;
wherein the signal adjustment unit is configured to:
determine a polarization mode of a to-be-transmitted signal, wherein the polarization mode comprises one of linear polarization, circular polarization, or elliptical polarization;
divide the first signal into two first signals; and
adjust, based on the determined polarization mode, an amplitude and a phase of a 1st first signal and an amplitude and a phase of a 2nd first signal;
wherein the digital-to-analog conversion unit is configured to perform digital-to-analog conversion on an adjusted 1st first signal to obtain a second signal, and perform digital-to-analog conversion on an adjusted 2nd first signal to obtain a third signal;
wherein the transmitter is configured to transmit the second signal by using the first port, and transmit the third signal by using the second port, wherein the to-be-transmitted signal is obtained by combining the second signal and the third signal; and
wherein a phase difference between the adjusted 1st first signal obtained by the signal adjustment unit and another adjusted 1st first signal obtained by another signal adjustment unit adjacent to the signal adjustment unit is θ, wherein a phase difference between the adjusted 2nd first signal obtained by the signal adjustment unit and another adjusted 2nd first signal obtained by the another signal adjustment unit θ, and wherein θ is determined based on a beam direction of the to-be-transmitted signal.

2. The apparatus according to claim 1, further comprising:
N transmitters comprising the transmitter;
N digital-to-analog conversion units comprising the digital-to-analog conversion unit and in a one-to-one correspondence with the N transmitters; and
N signal adjustment units comprising the signal adjustment unit and the another signal adjustment unit, wherein the N signal adjustment units are in a one-to-one correspondence with the N digital-to-analog conversion units, and wherein N is an integer greater than or equal to 2; and
wherein a phase difference between adjusted 1st first signals obtained by any two adjacent signal adjustment units of the N signal adjustment units is θ, wherein a phase difference between adjusted 2nd first signals obtained by any two adjacent signal adjustment units of the N signal adjustment units is θ, and wherein θ is determined based on the beam direction of the to-be-transmitted signal.

3. The apparatus according to claim 2, wherein each transmitter of the N transmitters comprises a dual-polarized antenna comprising the first port and the second port; and
wherein N dual-polarized antennas of the N transmitters form a uniformly spaced linear array, and wherein θ satisfies the following formula:

$$\theta = k \times d \times \sin\varphi,$$

wherein k is a wave number of a carrier associated with carrying the to-be-transmitted signal, d is a distance between two adjacent dual-polarized antennas, and φ is an included angle between the beam direction of the to-be-transmitted signal and a normal direction of the linear array.

4. The apparatus according to claim 1, wherein the polarization mode is linear polarization at an angle of γ1, wherein a ratio of an amplitude of the adjusted 1st first signal to an amplitude of the adjusted 2nd first signal is | tan γ1|;
wherein a difference between a phase of the adjusted 1st first signal and a phase of the adjusted 2nd first signal is an integer multiple of 180°, and wherein γ1 is an included angle between an electric field direction of the to-be-transmitted signal and a horizontal direction on a plane perpendicular to a propagation direction of the to-be-transmitted signal.

5. The apparatus according to claim 1, wherein the polarization mode is circular polarization, wherein a ratio of an amplitude of the adjusted 1st first signal to an amplitude of the adjusted 2nd first signal is 1, and wherein a difference between a phase of the adjusted 1st first signal and a phase of the adjusted 2nd first signal is an odd multiple of 90°.

6. The apparatus according to claim 1, wherein the polarization mode is elliptical polarization, wherein a ratio of an amplitude of the adjusted 1st first signal to an amplitude of the adjusted 2nd first signal is determined based on γ2 and a ratio of a major axis to a minor axis of an ellipse corresponding to the elliptical polarization mode, wherein a difference between a phase of the adjusted 1st first signal and a phase of the adjusted 2nd first signal is determined based on γ2 and the ratio of a major axis to the minor axis of the ellipse corresponding to the elliptical polarization mode, and wherein γ2 is an included angle between the major axis and a horizontal direction on a plane perpendicular to a propagation direction of the to-be-transmitted signal.

7. A communications device, comprising:
a processor; and
a non-transitory computer readable memory that stores code instructions for execution by the processor, the code instructions including instructions for:
generating a first signal;
determining a polarization mode of a to-be-transmitted signal, wherein the polarization mode comprises one of linear polarization, circular polarization, or elliptical polarization;
dividing the first signal into 2N first signals, wherein N is a positive integer;
adjusting, based on the determined polarization mode, an amplitude and a phase of a (2i−1)th first signal and an amplitude and a phase of a 2ith first signal, wherein i=1, . . . , N; and
performing digital-to-analog conversion on an adjusted (2i−1)th first signal to obtain a (2i−1)th second signal, and performing digital-to-analog conversion on an adjusted 2ith first signal to obtain a 2ith third signal;
wherein N is greater than 1, wherein a phase difference between the adjusted (2i−1)th first signal and an adjusted (2i+1)th first signal is θ, and wherein θ is determined based on a beam direction of the to-be-transmitted signal.

8. The device according to claim 7, wherein a phase difference between the adjusted 2ith first signal and an adjusted (2i+2)th first signal is θ.

9. A polarization reconfiguration method, applied to a communications device, wherein the communications device comprises 2N ports, a signal transmitted by a (2i−1)th port is orthogonal to a signal transmitted by a 2ith port, i=1, . . . , N, N is a positive integer, and the method comprises:
generating a first signal;
determining a polarization mode of a to-be-transmitted signal, wherein the polarization mode comprises one of linear polarization, circular polarization, or elliptical polarization;
dividing the first signal into 2N first signals;
adjusting, based on the determined polarization mode, an amplitude and a phase of a (2i−1)th first signal and an amplitude and a phase of a 2ith first signal;
performing digital-to-analog conversion on an adjusted (2i−1)th first signal to obtain a (2i−1)th second signal, and performing digital-to-analog conversion on an adjusted 2ith first signal to obtain a 2ith third signal; and
transmitting the (2i−1)th second signal by using the (2i−1)th port, and transmitting the 2ith third signal by using the 2ith port;
wherein N is greater than 1, and a phase difference between the adjusted (2i−1)th first signal and the adjusted 2ith first signal is θ, wherein θ is determined based on a beam direction of the to-be-transmitted signal.

10. The method according to claim 9, wherein a phase difference between the adjusted 2ith first signal and an adjusted (2i+2)th first signal is θ.

11. The method according to claim 10, wherein the communications device comprises N dual-polarized antennas, and wherein an ith dual-polarized antenna of the N dual-polarized antennas comprises the (2i−1)th port and the 2ith port; and
wherein the N dual-polarized antennas form a uniformly spaced linear array, and θ satisfies the following formula:

$$\theta = k \times d \times \sin\varphi,$$

wherein k is a wave number of a carrier used to carry the to-be-transmitted signal, d is a distance between two adjacent dual-polarized antennas, and φ is an included angle between the beam direction of the to-be-transmitted signal and a normal direction of the linear array.

12. The method according to claim 9, wherein the polarization mode is linear polarization at an angle of γ1, wherein a ratio of an amplitude of an adjusted 1st first signal to an amplitude of an adjusted 2nd first signal is |tan γ1|, wherein a difference between a phase of the adjusted 1st first signal and a phase of the adjusted 2nd first signal is an integer multiple of 180°, and wherein γ1 is an included angle between an electric field direction of the to-be-transmitted signal and a horizontal direction on a plane perpendicular to a propagation direction of the to-be-transmitted signal.

13. The method according to claim 9, wherein the polarization mode is circular polarization, wherein a ratio of an amplitude of the adjusted (2i−1)th first signal to an amplitude of the adjusted 2ith first signal is 1, and wherein a difference between a phase of the adjusted (2i−1)th first signal and a phase of the adjusted 2ith first signal is an odd multiple of 90°.

14. The method according to claim 9, wherein the polarization mode is elliptical polarization, wherein a ratio of an amplitude of the adjusted (2i−1)th first signal to an amplitude of the adjusted 2ith first signal is determined based on γ2 and a ratio of a major axis to a minor axis of an ellipse corresponding to the elliptical polarization mode, wherein a difference between a phase of the adjusted (2i−1)th first signal and a phase of the adjusted 2ith first signal is determined based on γ2 and the ratio of the major axis to the minor axis of the ellipse corresponding to the elliptical polarization mode, and wherein γ2 is an included angle between the major axis and a horizontal direction on a plane perpendicular to a propagation direction of the to-be-transmitted signal.

15. The apparatus of claim 1, wherein the signal adjustment unit being configured to adjust the amplitude and the phase of the 1st first signal and the amplitude and the phase of the 2nd first signal comprises the signal adjustment unit being configured to adjust at least one of the amplitude or the phase of the 1st first signal to be different than the amplitude or the phase of the 2nd first signal after adjustment of the amplitude or the phase of the 2nd first signal.

16. The apparatus of claim 1, wherein the 1st first signal and the 2nd first signal are each one of a baseband signal or a digital intermediate-frequency signal.

17. The device of claim 7, wherein the instructions for adjusting the amplitude and the phase of the 1st first signal and the amplitude and the phase of the 2nd first signal include instructions for adjusting at least one of the amplitude or the phase of the 1st first signal to be different than the amplitude or the phase of the 2nd first signal after adjustment of the amplitude or the phase of the 2nd first signal.

18. The device of claim 7, wherein the 1st first signal and the 2nd first signal are each one of a baseband signal or a digital intermediate-frequency signal.

19. The method of claim 9, wherein the adjusting the amplitude and the phase of the 1st first signal and the amplitude and the phase of the 2nd first signal comprises adjusting at least one of the amplitude or the phase of the 1st first signal to be different than the amplitude or the phase of the 2nd first signal after adjustment of the amplitude or the phase of the 2nd first signal.

20. The method of claim 9, wherein the 1st first signal and the 2nd first signal are each one of a baseband signal or a digital intermediate-frequency signal.

* * * * *